(12) United States Patent
Grawrock et al.

(10) Patent No.: US 7,197,638 B1
(45) Date of Patent: Mar. 27, 2007

(54) UNIFIED PERMISSIONS CONTROL FOR REMOTELY AND LOCALLY STORED FILES WHOSE INFORMATIONAL CONTENT MAY BE PROTECTED BY SMART-LOCKING AND/OR BUBBLE-PROTECTION

(75) Inventors: David Grawrock, Aloha, OR (US); Cameron W. Cotrill, Beaverton, OR (US); Paul R. Spear, Yamhill, OR (US); Paul Puttonen, Frisco, TX (US)

(73) Assignee: Symantec Corporation, Cupertino, CA (US)

( * ) Notice: Subject to any disclaimer, the term of this patent is extended or adjusted under 35 U.S.C. 154(b) by 889 days.

(21) Appl. No.: 09/934,926

(22) Filed: Aug. 21, 2001
(Under 37 CFR 1.47)

Related U.S. Application Data

(60) Provisional application No. 60/227,065, filed on Aug. 21, 2000.

(51) Int. Cl.
*H04L 9/00* (2006.01)
(52) U.S. Cl. ............... 713/165; 713/164; 713/166; 705/51; 726/27; 726/30
(58) Field of Classification Search ............ 705/51–58; 713/164–166, 200; 726/16, 21, 17, 27, 28, 726/26, 31, 30
See application file for complete search history.

(56) References Cited

U.S. PATENT DOCUMENTS 5,163,147 A * 11/1992 Orita ........................ 707/9
5,412,721 A * 5/1995 Rager et al. ............. 380/273

* cited by examiner

*Primary Examiner*—Emmanuel L. Moise
*Assistant Examiner*—Paul Callahan
(74) *Attorney, Agent, or Firm*—Fliesler Meyer LLP

(57) ABSTRACT

A machine system includes access-constraining mechanisms for protecting the information of certain classes of files from unauthorized intelligible access or from other kinds of access by way of requests supplied from unauthorized classes of programs which may be made at unauthorized periods of time and/or from unauthorized locations and/or under association with unauthorized users. Permission rules are provided for what constitutes an unauthorized access attempt for intelligible or another kind of access to the data of a given file. The given file may be a native one stored in a local machine or an external file stored in a remote server and/or on easily removable media. The machine system includes localizing means for Transparently and Temporarily Localizing (TTL'ing) external files and their respective access permission rules so that such may be processed within relatively physically-secure confines of the local machine. Such localized processing may include automatic decryption of confidential file data on a per-use basis and automatic later re-encrypting of modified data. Modified ones of TTL'ed files may be returned back to their non-local home after such processing.

17 Claims, 19 Drawing Sheets

Fig. 1D

FOLDER-USE RECORD — 60

- 61 — FULL PATHNAME OF LOCAL VERSION OF ACCESS-CONSTRAINED FOLDER (\\LMACHINE\VOLUME\DIR\......\SUBDIR) — 61a
  - 61b — ☐ NATIVE?   ☐ TEMPORARILY-LOCALIZED AND EXTERNAL ON-LINE? — 61c
  - 61d — FULL PATHNAME OF EXTERNAL, SOURCING ACCESS-CONSTRAINED FOLDER (\\SERVER\VOLUME\DIR\......\SUBDIR)
  - ☐ NATIVE & IN USE BY OUTSIDE MIRROR(S) — 61e

- 62 — TYPES OF ACCESS-CONSTRAINT APPLYING TO THIS FOLDER (AT LEAST ONE IS CHECKED)
  - ☐ ON-THE-FLY RECRYPTION (OTF)
  - ☐ BI-DIRECTIONAL BUBBLE PROTECTION
  - ☐ OTHER

- 63 — OTF CONTROL LIST(S)
  - 66 — ☐ EXCLUDED FILES LIST
  - 67 — ☐ EXCLUDED PROGRAMS LIST
  - 68 — ☐ OTHER CONTROL INFO FOR THIS OTF-COVERED FOLDER

- 65 — BUBBLE CONTROL LIST(S)
  - 96 — ☐ FILES APPROVAL SPECIFICATIONS
  - 97 — ☐ PROGRAMS APPROVAL SPECIFICATIONS
  - 98 — ☐ OTHER CONTROL INFO FOR THIS BUBBLE-COVERED FOLDER

- 93 — OTHER PERMISSION CONTROL LIST(S)

- 69 — AUTHORIZED USERS CONTROL LIST(S) FOR THIS ACCESS-CONSTRAINED FOLDER

- 99 — DIGITAL SIGNATURE FOR NATIVE VERSION OF THIS FOLDER-USE RECORD

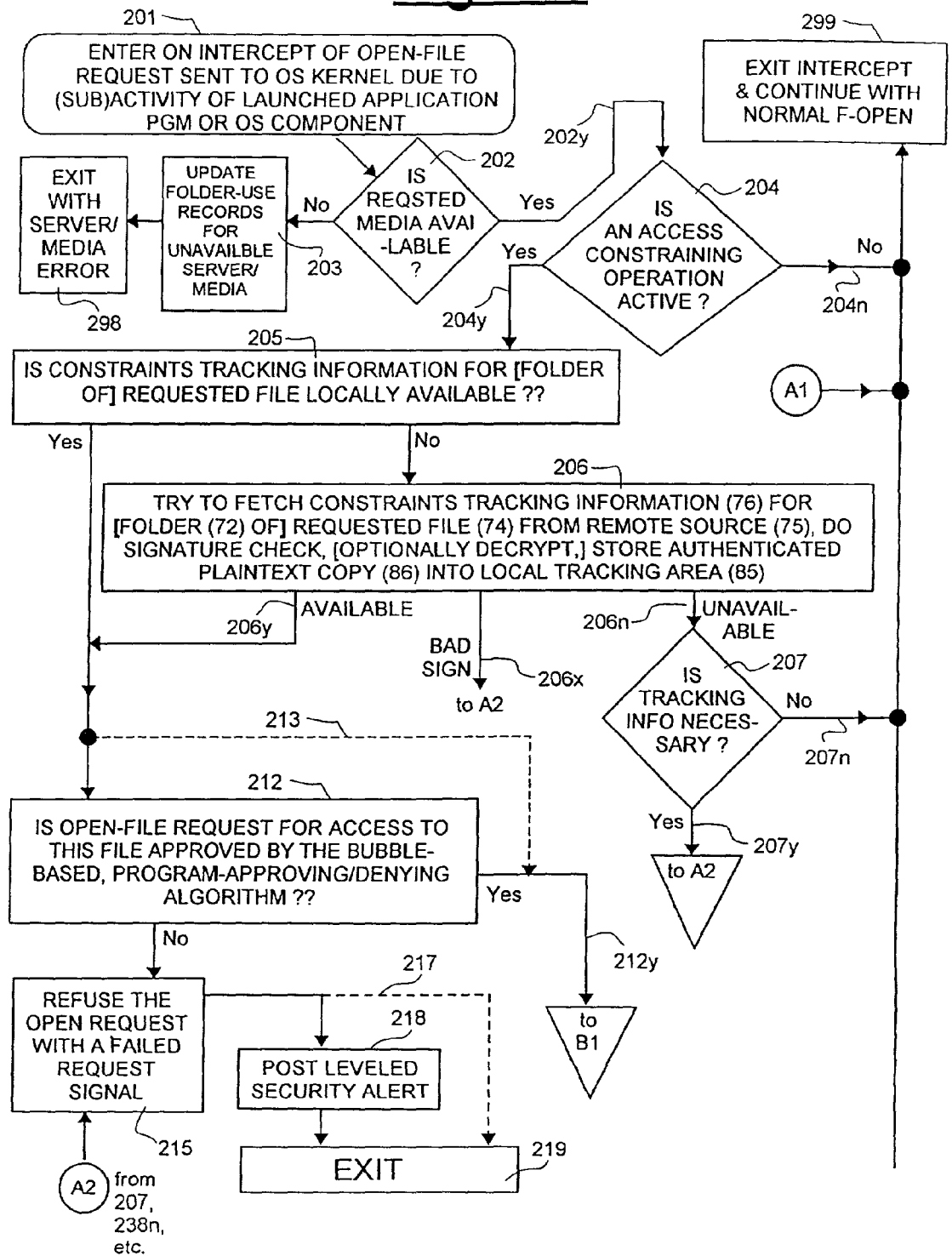

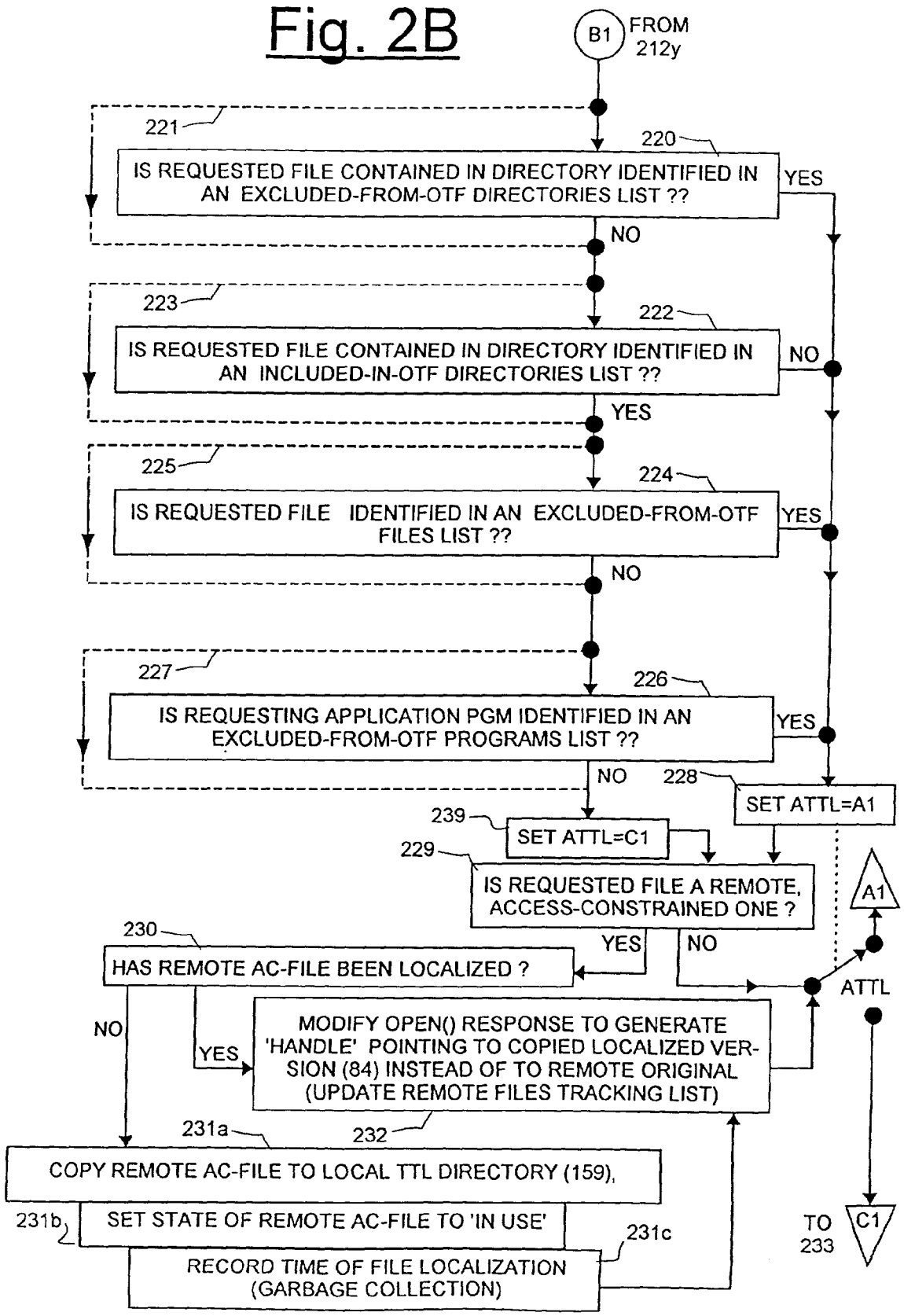

Fig. 3A

300 FILE-USE RECORD

310 — ORIGINAL PATHNAME OF LOCAL VERSION OF OTF-COVERED FILE

320 — CURRENT STATE OF THE LOCAL FILE

- 321 —
  - ☐ BEING PROCESSED BY LOCAL OTF ?
    - ☐ RENAME STILL IN PROGRESS
    - ☐ DECRYPT STILL IN PROGRESS
    - ☐ RE-ENCRYPT STILL IN PROGRESS
    - ☐ SCORCH OF PLAINTEXT STILL IN PROGRESS
    - ☐ UPDATE OF DIR ATTRIBUTES STILL IN PROGRESS
    - ☐ OTF HANDLING COMPLETE

- (322) —
  - ☐ FILE LABEL PRESENT & VALID
    - ☐ ACCESS RIGHTS HAVE BEEN CHECKED
    - ☐ RULES FILE MATCHES FILE LABEL

- 323 —
  - ☐ PLAINTEXT MODIFIED BY USER ?

330 — USAGE TRACKING

- 331 — ☐ USE-COUNT: (IN-USE BY 1+ LOCAL APP PROGRAMS?)
- (332) — ☐ POINTER TO BIDIRECTIONALLY LINKED LIST OF PATHNAMES OF APPLICATIONS (LOCAL) STILL 'USING' THE PLAINTEXT FILE AND 'IDLE TIME' OF EACH SUCH APP
- (333) — ☐ IDLE TIME LOCKOUT ACTIVE ?
- (334) — ☐ DELAY OF POST-CLOSE DECRYPTION REQUESTED BY LOCAL APPLICATION?
- (335) — ☐ POINTER TO BIDIRECTIONALLY LINKED LIST OF POST-CLOSE EVENTS TO WAIT FOR

340 — ORIGIN TRACKING

- 341 — ☐ NEW NAME OF RENAMED & (NATIVE OR LOCALIZED) FILE
- 342 — ☐ ORIGINAL REMOTE PATHNAME OF LOCALIZED FILE
- 343 — ☐ TYPE OF MEDIA ON WHICH RENAMED & (NATIVE OR LOCALIZED) FILE ORIGINALLY SAT ON
  - ☐ NATIVE VS. REMOTE     ☐ FIXED VS. REMOVABLE
  - ☐ RW VS. READ-ONLY      ☐ IN VS. REMOVED
- 344 — ☐ STATUS OF CHANNEL TO MEDIA ON WHICH RENAMED & LOCALIZED FILE ORIGINALLY SAT ON
  - ☐ TRUSTED VS. UNTRUSTED
  - ☐ UP VS. DOWN

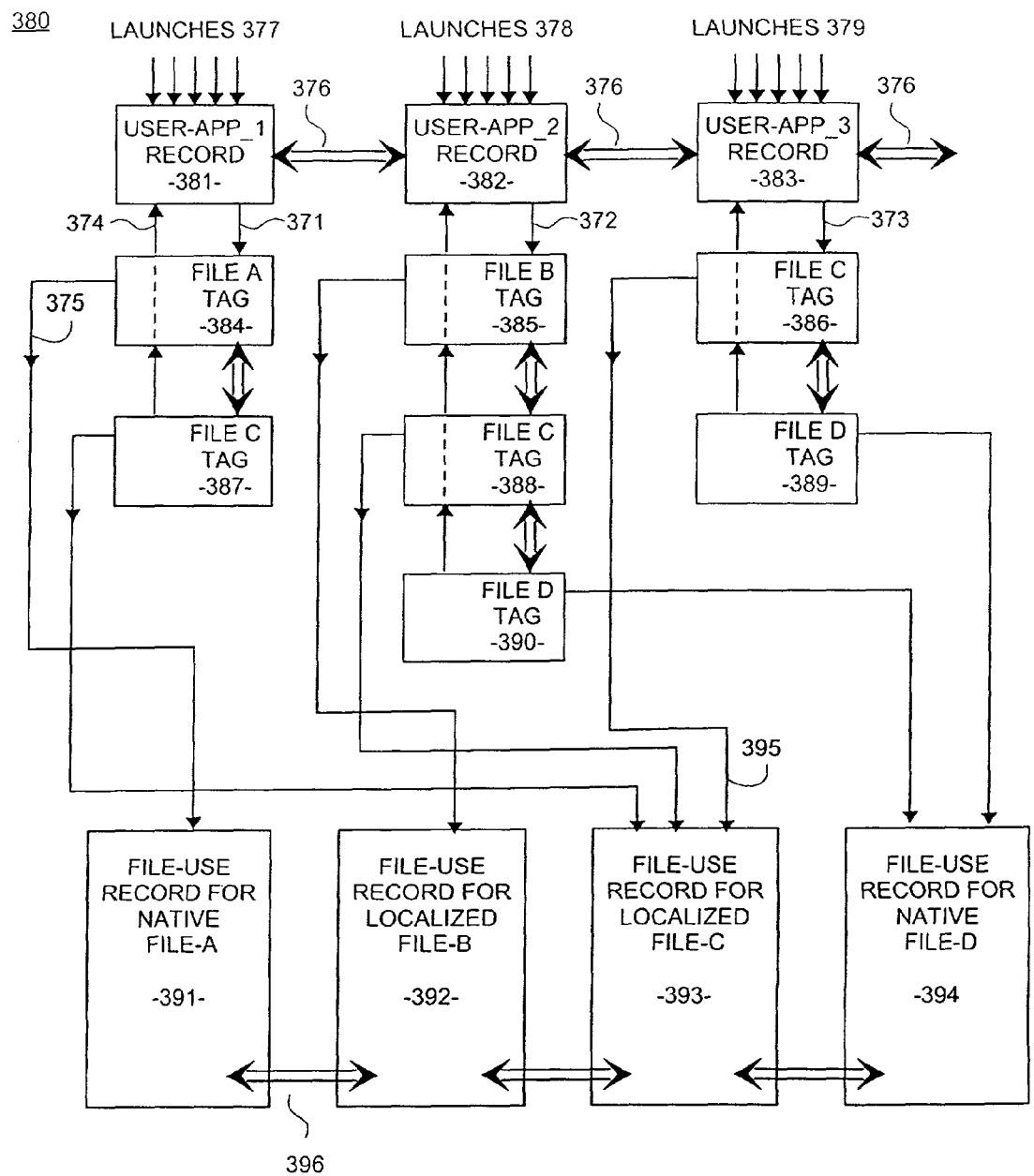

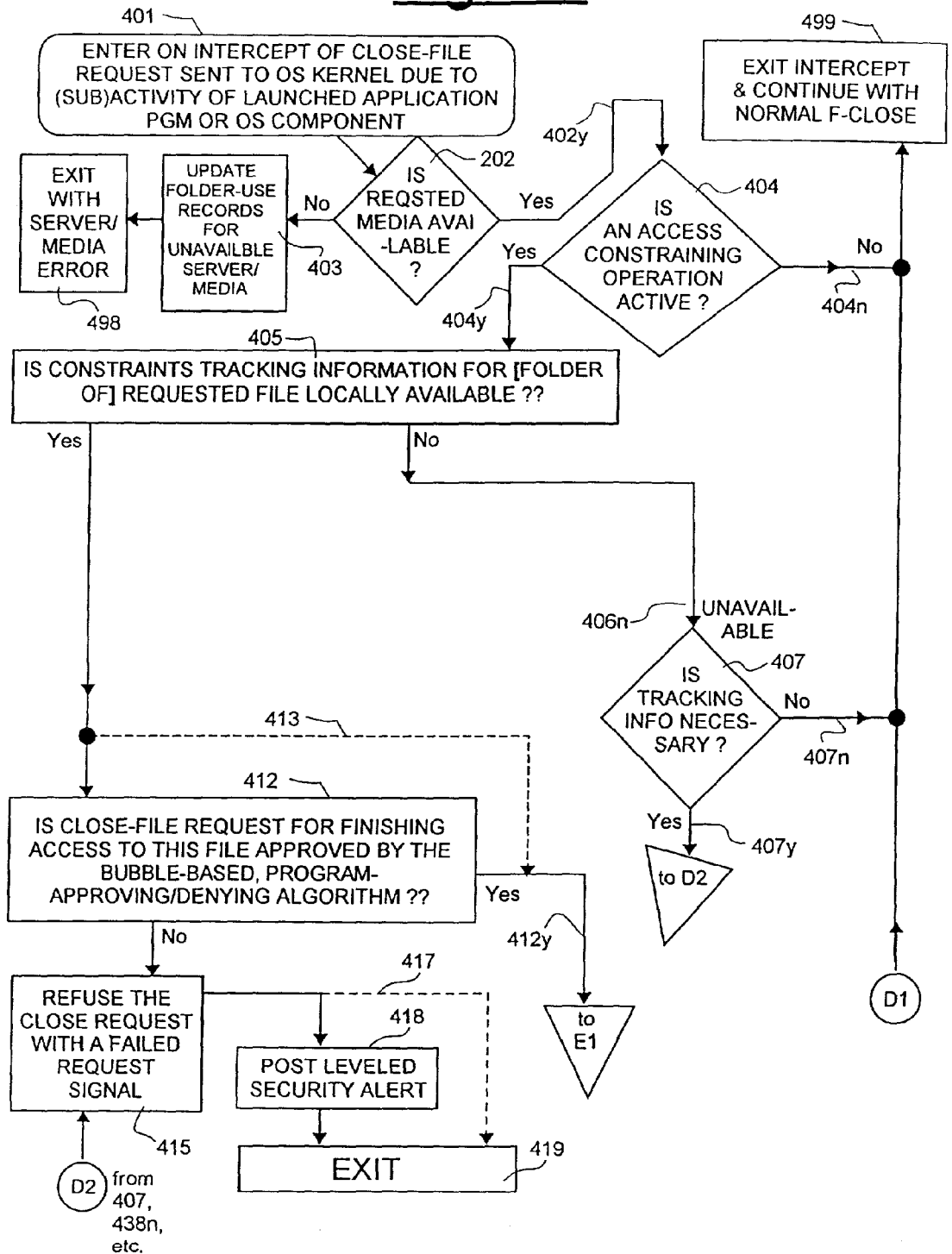

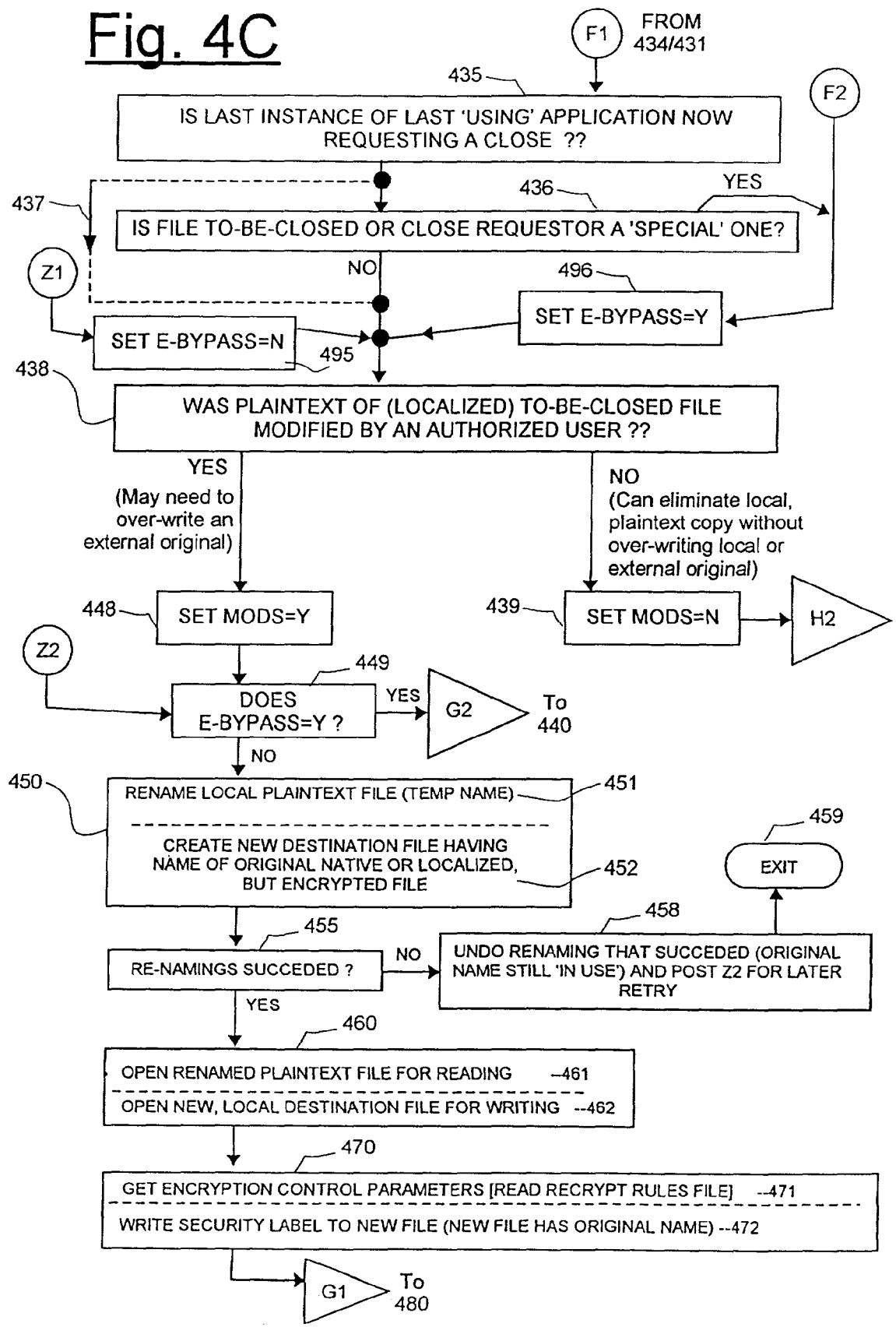

UNIFIED PERMISSIONS CONTROL FOR REMOTELY AND LOCALLY STORED FILES WHOSE INFORMATIONAL CONTENT MAY BE PROTECTED BY SMART-LOCKING AND/OR BUBBLE-PROTECTION

This application continues-in-part from U.S. provisional application No. 60/227,065, filed Aug. 21, 2000, now abandoned. The disclosure of said provisional application is incorporated herein by reference.

BACKGROUND

1. Field of Disclosure

The present disclosure relates generally to the field of securing stored digital data from unauthorized use.

The present disclosure relates more specifically to the problem of providing an easily usable computer system that provides features such as automatic data decryption and automatic data re-encryption (SmartLocking™) and/or bubble protection and/or other kinds of like-constraints to access while operating within the context of an operating system that allows files to be transferred over an unsecured network link or between easily-removable forms of storage media.

2a. Cross Reference to Related Patents

The disclosures of the following U.S. patents are incorporated herein by reference:

(A) U.S. Pat. No. 5,699,428 issued Dec. 16, 1997 to W. McDonnal et al and entitled, SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL-TIME;

(B) U.S. Pat. No. 5,796,825 issued Aug. 18, 1998 to W. McDonnal et al and entitled, SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL-TIME;

(C) U.S. Pat. No. 5,953,419 issued Sep. 14, 1999 to S. Lohstroh et. al. and entitled, CRYPTOGRAPHIC FILE LABELING SYSTEM FOR SUPPORTING SECURED ACCESS BY MULTIPLE USERS; and (D) U.S. Pat. No. 5,812,848 issued Sep. 22, 1998 to Leonardo Cohen and entitled, SUBCLASSING SYSTEM FOR COMPUTER THAT OPERATES WITH PORTABLE-EXECUTABLE (PE) MODULES.

2b. Cross Reference to Co-Pending Applications

The following co-pending U.S. patent applications are owned by the owner of the present application, and their disclosures are incorporated herein by reference:

(A) Ser. No. 09/047,316 filed Mar. 24, 1998 by David Grawrock and originally entitled, BUBBLE-PROTECTED SYSTEM FOR AUTOMATIC DECRYPTION OF FILE DATA ON A PER-USE BASIS AND AUTOMATIC RE-ENCRYPTION, and re-filed Jun. 14, 2001 under 37 CFR 1.53(d) as a CPA with the same title, naming David Grawrock et al. as inventors, now abandoned; and (B) U.S. Ser. No. 09/564,672 filed May 3, 2000, now U.S. Pat. No. 6,339,828 as a divisional of U.S. Ser. No. 08/864,297, now U.S. Pat. No. 6,081,893 May 28, 1997 by David Grawrock et al and originally entitled, SYSTEM FOR SUPPORTING SECURED LOG-IN OF MULTIPLE USERS INTO A PLURALITY OF COMPUTERS USING COMBINED PRESENTATION OF MEMORIZED PASSWORD AND TRANSPORTABLE PASSPORT RECORD.

2c. Reservation of Extra-Patent Rights and Resolution of Conflicts

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or artworks or other works provided herein, and to trademark or trade dress rights that may be associated with coined terms or artworks provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

3. Description of Related Art

As time passes, public knowledge about computers grows; and use of networked computers and of digital data proliferates throughout society. At the same time, a danger grows that unauthorized persons will learn how to gain useful (e.g., intelligible) access to confidential, digitized information and/or how to maliciously destroy or tamper with digitized data; particularly as digitized data and data-manipulating programs are allowed to flow in and out through unsecured transmission channels.

A wide variety of materials may be stored in the form of digitized data and there may be many reasons for keeping in confidence, the information represented by such stored data, and for avoiding unauthorized changes to such data.

By way of example, stored digital data may represent financial records of one or more private persons or other legal entities (e.g., companies). The latter records may be stored as digital data in a computer that is operatively coupled to a network (e.g., the Internet). Each private entity (person or company) may wish to have his or her or its financial records kept in confidence such that the records are intelligibly or otherwise accessible only to a select group of people. The method of access may be through a local keyboard and monitor, or remotely via a communications network (e.g., LAN or WAN). The latter case may allow remotely located, authorized persons to quickly access the data when needed.

The above-identified U.S. Pat. No. 5,699,428 of W. McDonnal et. al. provides an On-The-Fly decryption and re-encryption system (OTF-recryption system) which conveniently decrypts and automatically re-encrypts local file data for authorized users on an as-needed basis, thereby reducing risk that plaintext data will be exposed in a nontemporary manner; say because an authorized but forgetful user failed to re-encrypt a decrypted file.

The above-identified U.S. application Ser. No. 09/047,316 and its CPA counterpart of Jun. 14, 2001, which were originally entitled, "BUBBLE-PROTECTED SYSTEM FOR . . ." provide a system that can co-exist with OTF-recryption and can further protect files from attack by Trojan-horse applets.

The systems of both of the above-identified U.S. Pat. No. 5,699,428 and the above-identified U.S. application Ser. No. 09/047,316 are designed to work primarily with locally-stored files. Unfortunately, in networked systems, in addition to being stored locally; file data may often be stored on one or more remote file servers and transferred over potentially-nonsecured links to the location of a local user. Security may be inadvertently breached if a plaintext version of confidential information is sent over a nonsecured link. On the other hand, network response speed may suffer if resources are wasted to non-selectively encrypt all information including non-confidential information before transmitting its representative data over the non-secured link. As such, it would be advantageous to have a selective method that can further co-exist with one or both of the OTF-recryption method of U.S. Pat. No. 5,699,428 and the Bubble-protection (and volume encryption) methods of U.S. application Ser. No. 09/047,316.

The problem of files being moved from remote to local sites is not limited to telecommunication networks. The so-called sneaker-net is a further part of the problem. There is a continuing proliferation of use of high-density removable media such as removable hard disks or Re-Writable Compact Disks (CD-RW's or DVD-RW's) or the like which makes it easier for unauthorized persons to potentially intercept an unguarded one of such high-density removable media and steal it or copy its contents into a portable notebook computer. Then, if any confidential information was left in plaintext form on such intercepted media, its confidentiality may be compromised. Moreover, even non-confidential information may be tampered with or destroyed.

It is desirable to have a ubiquitous system that allows for telecommunicative networking, and even sneaker-networking while at the same time providing the safeguards and conveniences of On-The-Fly decryption and re-encryption (OTF recryption) and/or Bubble-protection for such specific files as may need such protection.

SUMMARY

The methods and structures summarized here may be made backward-compatible with OTF recryption systems such as described in the above-cited, U.S. Pat. No. 5,699,428, and/or with file-labeling systems such as described in the above-cited, U.S. Pat. No. 5,953,419 and/or with bubble-protection and/or volume-encryption systems such as described in the above-cited, U.S. application Ser. No. 09/047,316. Unless explicitly stated herein no one step or structure or function is to be deemed critical or essential to practice in accordance with the invention.

Improved, machine-implemented methods and apparatus may be provided in accordance with the disclosure for use with remotely-stored files and/or portable files, where the latter are stored on easily-removable media.

More specifically, a Transparent and Temporary Localizing (TTL'ing) process may be carried out in accordance with the disclosure for assuring secured transfer of access constrained information from a remote site, or from external portable media, to the interior of a local machine; and for simplifying and speeding operations that use permissions-controlled exposure of such data within the local machine. The latter permissions-controlled operations can include automatic, on-the-fly decryption of remotely-sourced and confidential information on a per-use basis and automatic (optionally-delayed) re-encryption and transfer back of the covered data to the remote site or external source. The latter permissions-controlled operations can alternatively or additionally include bubble-protection and/or volume encryption protection. These access-controlled operations may be provided within the context of a multi-threaded operating system under which applications run in real-time.

Various features that may conform individually or collectively with the disclosure are listed below.

(1) Permissions-Control Data is Covered by Digital Signature and Follows Controlled Files from Site to Site One aspect that may be practiced in accordance with the disclosure is that of having permissions-control data shadow its corresponding, access-constrained folders or files as those folders or files move non-transparently from site to site; or as those folders or files are copied transparently during a Transparent and Temporary Localizing process. In other words, information such as that for tracking which files or folders are Smart-Locked™ (protected by OTF-recryption), is held in each machine storage (e.g., the same remote server, or on the same remote or removable media) that stores those files and/or folders on a relatively permanent basis (residential basis, home basis). Such access-constraint confidential information follows the files as those files or copies of them hop from machine to machine, or from storage media to storage media. A local version of the folder/file-shadowing, permissions-control data is accessed locally when it comes time to determine whether permissions-control rules are satisfied or not. To reduce the risk that such permissions-control data will be tampered with during hops, the permissions-control data is preferably covered by a digital signature, and the signature is tested during permissions-controlled, access constraining operations. The in-transit, permissions-control information does not need to be encrypted.

(2) Standardized Location for Holding Permissions Control Information at Each Site Smart-Locked™ folders are those which contain Smart-Locked™ files (OTF-recryption protected files). In accordance with one embodiment of the invention, a means for identifying and/or tracking Smart-Locked™ folders remains in a predefined, logical location on the same media or within the same remote server that stores the respective Smart-Locked™ files. Thus, all accessing clients have a centralized, logical location (e.g., the root directory) to go to for obtaining whatever OTF tracking and managing information may be needed to carry out their localized OTF-recryption operations.

In one embodiment, the centralized means for identifying Smart-Locked™ files includes a root directory file with a unique file name such as, for example, 'SmartLocked.fid' (which unique name may be an abbreviation for Smart-Locked™ Folders Identifier). This Smart-Locked™ Folders Identifier file contains pointers to (or other identifiers of) all Smart-Locked™ Folders in the storage volume of the corresponding root. Each local client may use this centrally-located means to determine if a to-be-accessed, remote file is a Smart-Locked™ file or not. The file may be deemed to be Smart-Locked™ if it is contained within a folder that is pointed to by the SmartLocked.fid file (or so-identified by other, generally equivalent means). The Smart-Locked™ Folders Identifier file is preferably covered by a digital signature so that it is resistant to being tampered with by unauthorized users.

Files that are NOT so-identified by an accompanying means for identifying and/or tracking may be generally treated as non-Smart-Locked™ files.

(3) Secured Transfer of Confidential Information

In accordance with the disclosure, Smart-Locked™ files that are to be remotely-stored or stored in easily-removable media, should, in general, be automatically encrypted upon their creation by an authorized user inside a local machine before being sent either across a transmission channel for storage at the remote site or for storage onto the removable media. Thereafter, each already-encrypted, Smart-Locked™ file (or respective parts of such files) is first transmitted in its encrypted form to a more-secured storage means inside the local machine of an authorized user before confidential parts of its information are exposed in plaintext form.

Once received inside the more-secured storage means of the local machine of the authorized user, the copied or moved file information is thereafter automatically decrypted at the local client site as needed on a per-use basis. If one or more parts of the Smart-Locked™ file are modified by an authorized user, the file's plaintext is re-encrypted before being returned to the remote site for storage therein (or being stored in its modified form onto a removable, computer-readable media).

(4) Secured Transfer of Bubble-Protected Information

Another aspect that may be practiced in accordance with the disclosure is that of secured transfer of access constraining rules for so-called, Bubble-protected files. Like the Smart-Lock™ identifying and/or tracking information, the information for controlling Bubble-protection operations should remain on the same media or within the same remote server that stores the respective Bubble-protected files. Thus, all accessing clients have a centralized site to go to obtain the type of Bubble-protection tracking and managing information they need to carry forward with their local, Bubble-protection operations.

(Briefly, Bubble-protection tries to prevent rogue programs such as Trojan-horse applets from gaining read or write access to files that they apparently have no business accessing. Bubble-protection tracking and managing information indicates what type of programs are entitled to access what type of files. For example a spreadsheet program should have apparent entitlement to access a file with a .XLS extension (an extension commonly used for Microsoft Excel™ compatible files). On the other hand, an e-mail reply applet may not have apparent entitlement to access such a file with a .XLS extension. Bubble-protection may be provided in overlap with or independently of OTF-recryption protection. More details about Bubble-protection may be found in the above-cited, U.S. application Ser. No. 09/047, 316.)

In one embodiment, the centralized means for identifying Bubble-protected files includes a root directory file with a unique file name such as, for example, 'Bubbled.fid' (which unique name may be an abbreviation for Bubble-protected Folders Identifier). This Bubble-protected Folders Identifier file contains pointers to (or other identifiers of) all Bubble-protected folders in the storage volume and to the Bubble-protection rules lists for each of those folders. Each local client may use this means to determine if a to-be-accessed, remote file is a Bubble-protected file or not. It is if it is contained within a folder that is pointed to by the Bubbled.fid file.

Each local client may further use the Bubble-protected Folders Identifier file to navigate to the Bubble-protection rules lists that control the Bubble-protection operations for those files. The Bubble-protected Folders Identifier file is preferably covered by a digital signature so that it cannot be easily tampered with by unauthorized users.

Remote files or files on easily-removable media that are NOT identified to a local client by an accompanying Bubble-protected identifier means (which means is in the same remote site or on the same easily-removable media), are generally treated as ordinary files rather than Bubble-protected files.

The concept of Smart-Locking™ so as to limit intelligible access to confidential information and the concept of Bubble-protecting so as to limit generic access based on what program is asking for access (and/or what machine is executing that access-requesting program and/or what time the request is made) may be merged into a more generalized concept of access constraining control. It is within the contemplation of the disclosure to have a unified, access constraint managing file that is digitally signed to inhibit tampering therewith where such an access constraint managing file is stored in a prespecified standard location and shadows a corresponding, access constrained file or folder as the latter moves or is copied from site to site.

(5) Intercept {Remote File}-OPEN and {Remote File}-CLOSE Requests

Other features that may be practiced in accordance with the disclosure include that of first-time encryption of new file data that is to be stored remotely (or on easily-removable media), and subsequent file re-encryptions, which are preferably performed in response to intercepted and corresponding file-CLOSE requests rather than in response to each intercepted and corresponding file-WRITE request. This shifts the work load of performing time-consuming, encryption operations to the less frequent file-CLOSE requests and away from the more frequent file-WRITE requests. It also reduces the number of transmissions of encrypted data that will be conducted over either the communications channel that links the remote and local sites or to the media drive that couples to the easily-removable media. System response time is thereby improved.

Similarly, file decryptions are preferably performed locally in response to intercepted and corresponding file-OPEN requests issued by an authorized, local source (e.g., an authorized user) rather than in response to each intercepted and corresponding file-READ request. Again, this shifts the work load of performing time-consuming, decryption operations to the less frequent file-OPEN requests and away from the more frequent file-READ requests. System response time is thereby improved. Also, since decryption happens inside the generally-more-secure local machine rather than in a generally-less-secure remote machine or on a generally-less-secure easily-removable media, security is improved. And because plaintext versions of confidential information are not transmitted numerous times between the local and remote sites; or between inside the local machine and the easily-removable media, security is better maintained.

A further facet of this optional and conforming feature of the disclosure is that interception of file-CLOSE and file-OPEN requests can be carried out not only for single-threaded operating systems such as MS-DOS™ or MS-Windows 3.x™, but also for multi-threaded operating systems such as Windows95™, Windows98™, and NT 4.0™ (each of which is a trademarked product of Microsoft Corp. of Redmond, Wash.). To that end, the technique disclosed in the above-cited U.S. Pat. No. 5,812,848, entitled, SUBCLASSING SYSTEM FOR COMPUTER THAT OPERATES WITH PORTABLE-EXECUTABLE (PE) MODULES may be employed to intercept calls to kernel services such as the file-CLOSE and file-OPEN functions of the Win32 kernel in Windows95™ or a another like multi-threaded operating system.

Other features and aspects that may be practiced in accordance with the disclosure will become apparent from the below detailed description.

BRIEF DESCRIPTION OF THE DRAWINGS

The below detailed description makes reference to the accompanying drawings, in which:

FIG. 1D shows a data structure of a Folder-Use record in accordance with the disclosure that may be used for shadowing folders whose files are subject to permissions-controlled, access constraining operations such as one or more of OTF-recryption protection, Bubble protection and Volume encryption;

FIGS. 2A–2C form a first flow chart showing how a file-OPEN intercept operates in accordance with the disclosure;

FIGS. 3A–3B show a data structure of a File-Use record in accordance with the disclosure that may be used for tracking OTF-usage of both remotely originated and local-native files;

FIG. 3D shows a sample logical interconnect that may be created between the file tracking information maintained by the File-Use records and the application tracking information maintained by the User-Application records when File-tag records are added to respective lists of each User-application record;

FIGS. 4A–4E form a second flow chart showing how a file-CLOSE intercept may operate in accordance with the disclosure;

DETAILED DESCRIPTION

Figure 1A:
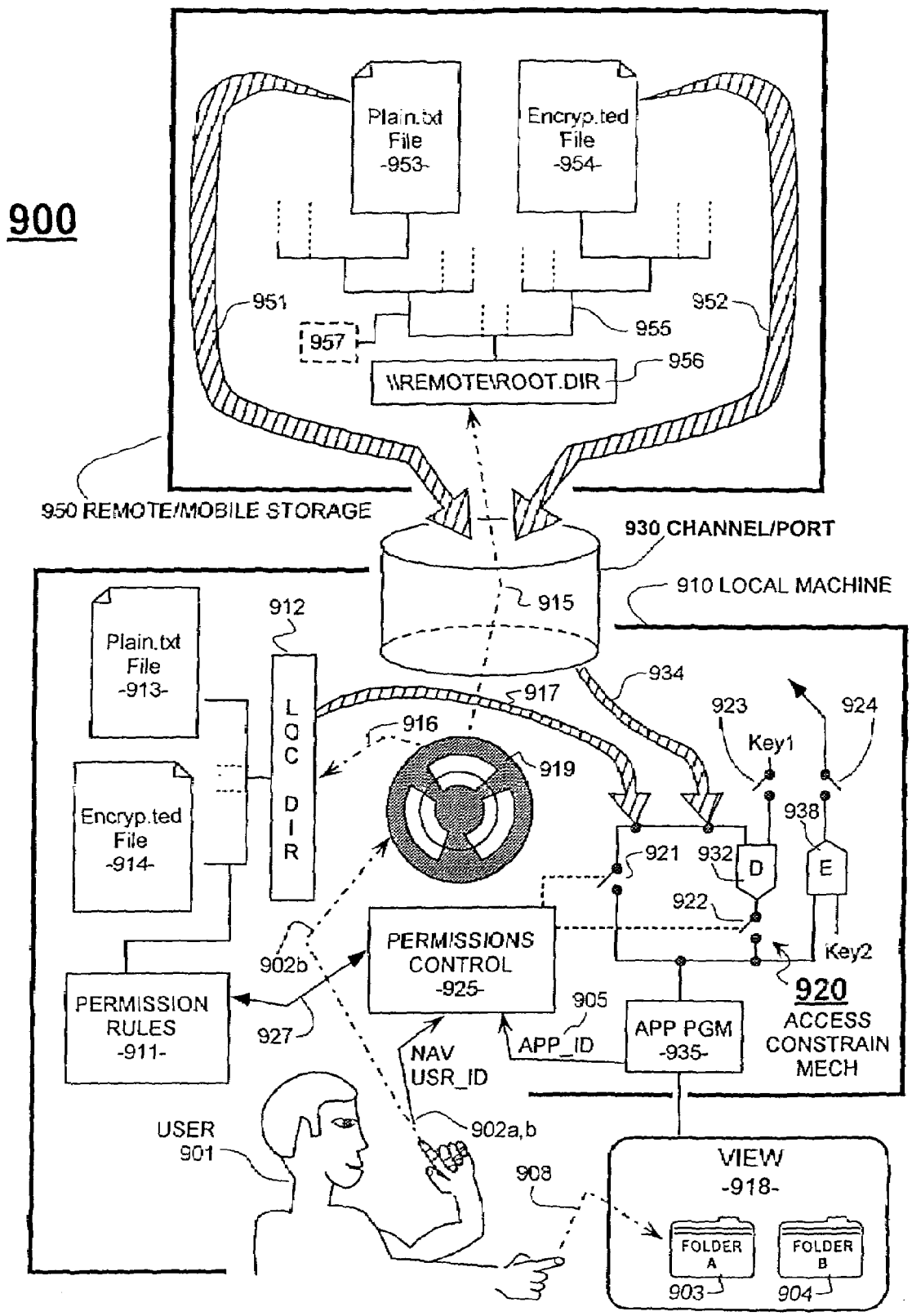
FIG. 1A is a schematic diagram which is used to explain problems that may arise when remote or mobile storage media is to be accessed by a local machine, where the local machine comprises an access constraining mechanism.

FIG. 1A is a schematic diagram of a computer system 900 having a local machine 910 with which a user 901 interacts. It will be seen in more detail below that the user often expects to interact with a ubiquitous navigating mechanism 919 (schematically shown as a steering wheel), where such a ubiquitous navigating mechanism can seamlessly point to external files stored on a network (or on externalizable media), as easily as it can point to locally stored files. This ubiquitous form of navigation can create security problems.

To understand this problem, one needs to better appreciate certain, locally-based security features of the local machine (local workstation) 910. Besides having the usual program-executing processor (not shown), local storage (912), and a result displaying means (VIEWer 918), as may any conventional workstation computer, the illustrated local machine 910 has one or more of a telecommunications channel and a port or drive for receiving mobile storage-media. The latter channel and/or port are generically referenced as 'channel/port 930' for reasons that will become apparent shortly.

External data may be brought into the local machine 910 by way of the channel/port 930. For example, a remote file server may link through the channel/port 930 to the local machine 910. Additionally, or alternatively, portable media such as that in the form of easily removable magnetic and/or optical disk may link to the local machine 910 by way of the channel/port 930. The remote file server and/or portable storage media are generically referenced as a 'remote/mobile storage means 950' for reasons that will become apparent below.

A first directional path 951 is schematically drawn in FIG. 1A to represent a corresponding first transmission of data from an external plaintext file 953 that is located within the remote/mobile storage 950 into the local machine 910 by way of the channel/port 930. A second directional path 952 is similarly drawn to represent a second transmission of data from a respective, external, and encrypted (and/or otherwise protected) file 954 that is located within the remote/mobile storage 950 into the local machine 910 by way of the channel/port 930. It is assumed here that the channel/port 930 may be unsecured (open to public access), and as a result, unauthorized persons may intercept transmissions moving through the channel/port 930 and/or may try to insert additional transmissions in hopes of fooling (spoofing) the local machine 910 into believing the additional transmissions legitimately came from a trusted source (e.g., 950) when in fact they did not.

Each of the first and second illustrated transmissions (951 & 952) may occur in response to a data access request 915 that originated from within the local machine 910. It is understood that within such a data access request 915, there will be an implicit or explicit identification of a target file or folder from which the data is to be fetched. The identification will typically be in the form of a navigation through a directory structure 955 of the remote/mobile storage means 950. This navigational identification will typically refer to a root node 956 (e.g., "\\REMOTE\ROOT.DIR") of the directory structure 955 (or a deeper node if Unix or a like OS is being used) and it will specify a particular navigation path from the base node to a desired folder or to a desired file such as 953 or 954 that is uniquely placed somewhere within the remote/mobile storage means 950.

In FIG. 1A, a third directional path 934 is schematically drawn to represent a continued flow of the requested data from the external channel/port 930 and into a physically-secured and internal part of local machine 910. Data flow 934 is submitted to an access constraining mechanism 920 before being allowed to continue to a data-requesting program 935. The access constraining mechanism 920 comprises at least one of flow-blocking switches 921 and 922 as well as a switch-controlling permissions module 925. It should be apparent from the series/parallel construct in the illustration that if the permissions-control module 925 actuates both of the flow-blocking switches 921 and 922 into respective open positions, then data flow 934 is blocked from reaching application program 935. Such an activity corresponds to a bi-directional Bubble-protection blockage wherein a given program (e.g., 935) is blocked, for one reason or another, from having any kind of access to the data of a targeted file (e.g., 953, 954). It is within the contemplation of the disclosure to also provide for uni-directional Bubble-protection blockage wherein a given program (e.g., 935) is blocked, for one reason or another, from having a selected one of read and write access to the data of a targeted file (e.g., 953, 954).

If the permissions-control module 925 closes first switch 921 while keeping open second switch 922, then the requesting program (935) will be blocked from having "intelligible" read access to the encryption-covered information of file 954 if the data flow 934 is coming from there. On the other hand, if the data flow 934 is coming from plaintext file 953, the requesting program (935) will have have intelligible read access to the informational content of such a plaintext file 953. This switched combination (921 closed, 922 open) corresponds to a Smart-Locked™ blockage (OTF blockage) wherein a given program (e.g., 935) is blocked, for one reason or another, from having intelligible read access to information of a targeted, but encryption-covered file such as 954 even though the program can nonetheless fetch the file data in its encrypted form.

If the permissions-control module 925 closes second switch 922 while keeping open first switch 921, then data flow 934 will be able to pass through decryption unit 932 before reaching application program 935. Such an activity corresponds to an OTF recryption process and can allow application program 935 to have intelligible read access to the plaintext information of an encryption-covered file such as 954. Of course, an appropriate decryption key (e.g., Key1) may have to be released to an appropriate decryption unit 932 for such intelligible access. In one embodiment, the illustrated key-releasing switch 923 may be further controlled by the permissions-control module 925 such that Key1 is blocked from being released if a requesting user 901 fails to properly authenticate his or her right to having "intelligible" access to the encryption-covered information of file 954. The key management systems disclosed in one or both of the above cited U.S. Ser. No. 08/864,297 and U.S. Pat. No. 5,953,419 may be used for such authenticating of a user's rights to (a) use a particular workstation such as 910 at a particular time, and to (b) have intelligible access to specific files based on embedded file labels or the like. In the same or an alternate embodiment, the illustrated write-blocking switch 924 may be further controlled by the permissions-control module 925 such that modified data is blocked from being written or overwritten to the source file (e.g., 953 or 954).

After application program 935 processes a plaintext file such as 953 or the uncovered information of an encrypted file such as 954, it may be desirable to encrypt the resulting workproduct. Encrypting unit 938 may be used in combination with an appropriate encryption key (Key2) for carrying out such a protective covering of the workproduct. If the write-enabling switch 924 is closed, the encrypted result may then be transmitted by way of the external channel/port 930 for storage in the remote/mobile storage means 950. This return data path is not fully shown in FIG. 1A so that illustrative simplicity may be preserved.

Permissions-control module 925 may respond to a variety of environmental conditions and inputs in determining whether to close any one or more of switches 921, 922, 923 and 924. In the course of responding to such environmental conditions and inputs, permissions-control module 925 applies corresponding permission rules derived from a permission rules file such as 911 before deciding how to actuate the read/write access-granting switches 921, 922, 923 and/or 924. In FIG. 1A, the permission rules file 911 is shown disposed in a local storage of machine 910, close by to the permissions-control module 925. The permission rules file \911 is navigated-to by way of a local directory 912. Unlike file security labels, permission rules are not embedded on a file-by-file basis in the information files which have their accessibility governed by the permission rules.

The environmental conditions which may affect the behavior of permissions-control module 925 can include time of day or week (for effecting temporal constraints), geographic locations of one or more of the user 901, machine 910 and/or remote/mobile storage means 950 (for effecting spatial constraints) and/or serial numbers or names given to the machine 910 and/or to remote/mobile storage means 950 (for effecting user-independent identity constraints) and/or biometric data (e.g., fingerprints, iris scans, etc., for effecting user-dependent identity constraints).

Additionally or alternatively, the inputs which may affect the behavior of permissions-control module 925 can include: (a) a user password and/or user ID (902a) provided by the user (for further effecting user-dependent identity constraints); (b) directory navigation instructions (902b) provided by the user or by another entity (for effecting navigation-based constraints); and/or (c) an identification 905 of an application program that is causing the access request 915 to be made (for effecting user-independent, requestor-based constraints).

It is the reliance of certain permission rules (911) on the inputted navigation instructions (902b) which creates a problem. The operating system (OS) of the local machine 910 may be viewed as having a ubiquitous navigating mechanism 919. For ease of understanding, this navigating mechanism 919 is schematically shown as a steering wheel. Data access requests may be steered to an external data source (e.g., 950) such as is indicated by dashed pointer 915, or such requests may be as easily steered to an internal data source. The latter activity is indicated by dashed pointer 916. Locally-stored files 913 and 914 are respectively analogous to externally-sourced files 953 and 954. A user 901 may interact with application program 935 at a relatively high, abstract level wherein the specific locations of files is not routinely worried about or displayed. For example, in the displayed VIEW 918, user 901 may simply see two folder icons 903 and 904 that are respectively labeled, FOLDER-A and FOLDER-B. The local machine OS and/or application program 935 may be responsible for keeping track of exactly where, internally or externally, the actual folders are stored. The user 901 can merely point 908 (e.g., with a mouse & cursor means, not shown) to a desired one of folder icons 903 and 904 (or to files icons therein, not shown) in order to invoke a data-accessing operation that may request the reading of data from, and/or the writing of data to any correspondingly mapped one of internal files 913, 914 or external files 953, 954. It is understood that such an abstract actuation 902b of the navigating mechanism 919 can come from a program as well as from a human user 901.

If the data-access request is steered as indicated by pointer 916 to a local file, then the corresponding data flow 917 will be presented to the access constraining mechanism 920 in the same way as flow 934 is presented, before being allowed to continue to the access-requesting program 935. And, if indeed the data flow that is presented to the access constraining mechanism 920 is the 917 one which comes from locally internal and physically secured storage (912), then it is fairly straightforward that the associated permission rules should come from a likewise, locally internal, and physically secured file or folder 911 within local machine 910.

Several problems arise, however, if the data flow that is presented to the access constraining mechanism 920 is the 934 one which comes from an external source 950 and arrives by a route 930 that is typically not secured. First, the local permission rules file 911 cannot anticipate what specific directory structure 955 and/or files (953, 954) will be present in the external source 950 and thus may not have permission rules that are tailored for such an external source 950. Second, even if the local permission rules file 911 of a first workstation 910 were tailored to handle a specific external source 950, that would not provide efficient help to a next workstation 910' (not shown, see instead client 20 of FIG. 1B) which has its own, internally isolated and physically-secured rules file 911' (not shown).

In view of this, it may be thought that the better design approach is to have a respective permission rules file 957 (shown as dashed box) provided in the respective directory structure 955 of each remote file server or mobile storage means 950. However, problems may arise from this approach as well. Each time the permissions-control module 925 has to scan a set of rules that are not nearby (as is set 911), module 925 must wait for the corresponding data (957) to move from remote/mobile storage means 950, and through the external channel/port 930 for receipt by module 925. Also, in order to fetch the external rules 957, the permissions-control module 925 will have to know where in the external directory structure 955 to find such a rules set 957. Moreover, the data of the external rules set 957 might be tampered with as it passes through an unsecured channel (e.g., 930). This may allow an unauthorized user to bypass constraints within the original version of the external rules set 957. Also, repeated movements of data through a telecommunications channel (e.g., 930) may disadvantageously add to traffic congestion on the channel as well as repeatedly exposing data to security dangers.

A solution in accordance with the disclosure is to transparently copy targetted external files (953, 954, and/or folders) into the more secured internal storage (912) of the local workstation 910 and to also transparently copy their corresponding permission rules 957 into the more secured internal storage of the local workstation 910. This is referred to herein as a Transparent and Temporary Localizing (TTL) of the targeted external files/folders. The data-requesting, application program 935 can remain unaware of this TTL action. The data-requesting, application program 935 may continue to believe that the sought-after data is arriving by way of path 934 when in actuality; after the TTL action occurs, the sought-after data is arriving by way of path 917. The permissions-control module 925 can more quickly and securely scan all permission rules (911 and the TTL'ed 957) by way of a nearby, local and internal path 927 instead of having to go out seeking permission rules over a possibly-unsecured, external channel/port 930. To minimize the danger of tampering, the external permission rules should be digitally signed and locally verified before being accepted locally during the TTL action.

In one embodiment, rather than separating permission rules such that instances of them may occur on a file by file, or higher resolution basis, permission rules are limited to applying to no greater a resolution than on the per folder basis (where a 'folder' can contain zero or one, but more typically contains many more files or records). This allows a same set of permission rules to apply over many files or many database records, thereby limiting memory consumption. It is however, within the contemplation of the disclosure to let a given set of one or more permission rules apply at a higher resolution, such as on a per-file basis or on a per-record basis.

Figure 1B:
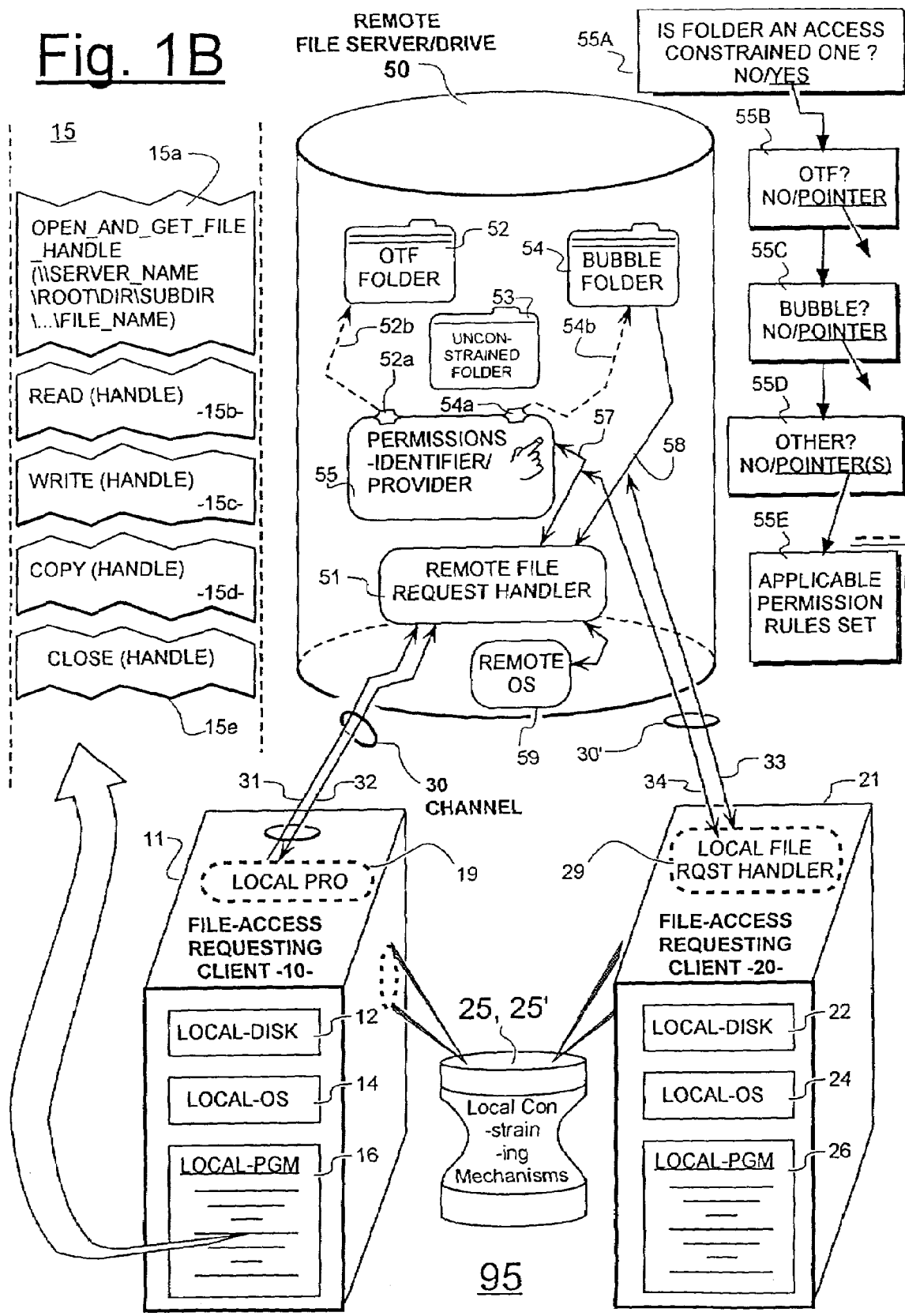
FIG. 1B is a block diagram of a networked computer system in accordance with the disclosure that includes a remote file server and a plurality of local client computers.

FIG. 1B is a block diagram of a client/server computer network system 95 in accordance with the disclosure wherein permission rules are limited to applying to no greater a resolution than on the per folder basis. Computer network system 95 includes at least one file server 50 and at least one client computer 10. The client computer 10 is operatively coupled to the server 50 by way of a communications link (channel) 30. Communications link 30 may be any of a wide variety of such links, including but not limited to LAN (Local Area Network, e.g. Ethernet), WAN (Wide Area Network) and Internet (TC/IP protocols). Communications link (channel) 30 can be trusted (secured) or open (unsecured). Unless otherwise stated for a particular discussion herein, the link 30 will be assumed to open (unsecured).

Because operations described herein will be viewed primarily from the perspective of a client computer such as 10, the client computer 10 will be termed as a 'local' client and the server 50 will be termed as a 'remote' server. This does not mean, however, that in every instance server 50 is positioned far away from client 10, although generally that will be the case (as for example when link 30 is the Internet or an Intranet). Instead, the term 'remote' implies here that server 50 may be subject to different, and in some sense less stringent, kinds of security measures than client computer 10 may be subject to.

For example, the client computer 10 will generally have a housing 11 that is easily-viewable to authorized users (e.g., 901 of FIG. 1A). Such a housing 11 will typically, physically-secure a local disk subsystem 12 and system memory (e.g., SRAM, not shown) of the local client 10. The local disk subsystem 12 and system memory are generally used to support operations of a locally-executing operating system 14 and of a locally-executing application program 16. A user-accessible keyboard (or other user-interface means, not shown) and a user-accessible display unit (monitor, not shown) will generally be provided a short distance (e.g., less than 3 meters) away from and connected to the housing 11. Housing 11 can be that of a desk-side or desk-top computer unit or that of a laptop computer or palm-held computer. There is a wide variety of configurations possible.

Because authorized users or other office personnel will generally work close to (e.g., within sight on the computer housing 11, unauthorized users or intruders will be deterred by the actual or potential presence of such people from trying to break into the local client computer 10 and from trying to compromise confidential information that is immediately stored within the local client computer 10 or displayed on a display subunit (e.g., 918 of FIG. 1A) thereof.

The server 50, on the other hand, may be situated in a back room or even much further away. Such a server 50 may be connected to the local client computer 10 by way of an unsecured (untrusted) communications link 30. An intruder (unauthorized user) may have a much easier time of intercepting and trying to compromise confidential data that passes through the client-server communications link 30. Such an intruder may further have a much easier time of copying and/or tampering with confidential data that is stored volatilely (e.g., in SRAM) or nonvolatilely (e.g., on removable, mass storage media) at the site of the server 50.

Also, if an authorized user places confidential information on an easily-removable media such a floppy diskette or a CD-ROM platter, an intruder may gain temporary or permanent custody of that media and might be thereby able to gain access to confidential information that is left in plain-text format on that media.

As such, and in accordance with the disclosure, when confidential information either resides within a remote file server 50 or within easily removable media (e.g., a removable hard disk or floppy disk) or when such confidential information is in-transit along an untrusted (not-secure) communications link 30; that confidential information is kept essentially and consistently in encrypted format. Confidential information is preferably exposed in plaintext form on an as-needed and as-authorized basis, essentially only when within a local client computer such as 10 or within another like client such as the illustrated second client computer 20. This plaintext exposure should be allowed to occur only after an authorized user validates his or her authorization to access the information at the local client computer (e.g., 10 or 20) and, again, only on an as-needed basis. By way of example, key management systems such as disclosed in one or both of the above cited U.S. Ser. No. 08/864,297 and U.S. Pat. No. 5,953,419 may be used for the authenticating of a user's rights to (a) use a particular workstation such as 10 or 20 at a particular time, and to (b) have intelligible access to specific files based on passwords, embedded file labels, or the like.

Like the first-described computer 10, the second local client computer 20 has a respective housing 21, local disk 22, local-OS 24 and locally-running program 26. The second local client computer 20 is also coupled to the remote file server 50 by way of a respective communications link 30'.

While it is beneficial to maintain confidential information as confidential by using a basic security measure such as keeping its respective data in encrypted form, such a security measure; if overly-applied, may be detrimental to the speed of system operations. For example, certain automated operations that use nonconfidential information may be unnecessarily slowed if the correspondingly used data is encrypted. As such, and in further accordance with the disclosure, the representative data of information that does not have to be confidential, which data either resides within the remote file server 50 or is in-transit along a given communications link (30 and/or 30') may be consistently kept in plaintext format so that operating speed is not slowed by unnecessary decryption and re-encryption operations. By way of example, folder 53 of server 50 contains a group of one or more files, where each file contains only nonconfidential information. In accordance with the disclosure, any file of folder 53 can be sent in unencrypted (plaintext) format across any channel (e.g., 30 or 30') or stored on easily-removable media in unencrypted (plaintext) format and processed by any client (e.g., 10 or 20) without use of any access-constraining measures such as OTF-recryption operations or Bubble-protection and without worry that confidential information will be compromised.

By way of a contrasting example, folder 52 of server 50 contains a group of one or more files, where at least one of the files, but generally all files of that folder contain confidential information. In accordance with the disclosure, no file of folder 52 should be sent in unencrypted (plaintext) format across an unsecured channel (e.g., 30 or 30') or stored on easily-removable media in unencrypted (plaintext) format. Further in accordance with the disclosure, no file of folder 52 should be processed by a contents-processing application program (e.g., wordprocessor, spreadsheet processor) of any client (e.g., 10 or 20) without use of OTF-recryption operations unless that file is permissively excused from such OTF processing by way of an OTF-exclusion list or by way of a like permission means for specifically and affirmatively excusing the file from being processed by OTF-recryption operations. Folder 52 is accordingly referred to herein as an OTF-covered folder (or OTF folder for short). Folder 53 is contrastingly referred to herein as an unconstrained folder.

The divergent goals for speeding processing of nonconfidential information and for protecting confidential information are therefore met by the above described arrangement. However, a further problem emerges if OTF-recryption operations are to be hidden from authorized users (kept transparent). The problem evolves from the fact that modern software designs encourage the provision of at least an illusion that there is a ubiquitous storage space. Under this illusion, users are presented with the appearance of a seamless and relatively unlimited file storage space. Files may be stored not only on a local disk subsystem 12 which is secured inside the user's local machine 10 but also at many other places such as at remote sites of a network (30) to which the local machine 10 is connected, or even on removable media (e.g., a floppy diskette or removable hard disk, not shown) that is arbitrarily and easily movable overtime from one media-using drive to another as desired by the possessor of the removable media.

According to the ubiquitous storage paradigm, it should appear to make no difference to each authorized user whether his/her files are stored locally within, say local client computer 10 or stored within another client 20, or stored within easily-removable media that is presently coupled to the local client computer 10, or stored remotely within, say file server 50 (or within another file server or peripheral, not shown, of the network). Each authorized user should be able to easily, and with apparent seamlessness, move a file about the network from a first client computer 10 to a first remote file server 50, and from there to a second client computer 20, and from there to a second remote file server (like 50 but not shown) and/or to removable media and so forth. Each authorized user should be given the illusion that he or she can read and modify each given file no matter where it is located in this ubiquitous storage space.

At the same time, and in accordance with the disclosure, OTF-recryption operations should be transparent to authorized users. Confidential ones of ubiquitously-located files should be kept in encrypted, confidential format no matter where they appear to be nonvolatilely stored. And nonconfidential ones of such ubiquitously-located files should be allowed to remain in plaintext form no matter where they appear to be stored.

Further, at the same time, and in accordance with the disclosure, adherence should be maintained to standard application program interfaces (API's), and to standard interfaces with resident operating systems and to standard communication protocols (e.g., TC/IP). This adherence should be maintained while an appearance is given to authorized users that both nonconfidential and confidential files can freely move about or be copied within the metaphor of a ubiquitous or seamless storage space.

The above means that, in general, when a user tries to click on an "OPEN file" icon of his or her screen, even if the targeted file is located remotely, the contents of the targeted file should appear to open as if they were available and stored directly inside the user's machine. However, to access a remote file, the user's, local client computer, say 10, will send a corresponding access request 31 of one form or another to the remote file server 50 for opening and reading from the remotely-stored file. The server 50 will respond and send something back. The user may then locally process the returned information using an appropriate application program or other tool.

Later the user may try to "SAVE" the processed information, if any changes have been made. It should appear that the changed information is being written into the remotely-located file (52 or 53). The SAVE-data request 31 will conventionally pass from the local OS 14, through the respective communications link 30 to the OS 59 of the target server 50. The server's OS 59 will then conventionally process the request and instruct the local client computer 10 to send the to-be-SAVED data by the same path for storage in the remote file server 50.

In one embodiment of the disclosure, the OPEN-file request 31 that is generated locally in say local client computer 10, is intercepted by a combination of a local protocol handler 19 and a remotely-located and intelligent file-request handler such as 51 before the request 31 can be conventionally processed by the server's OS 59. In this embodiment, the intelligent file-request handler 51 is located within the server 50 and configured to perform certain pre-processing operations before the OPEN-file request 31 is forwarded to the server's OS 59 and before the remote OS responds by sending back the data of the requested file. While handler 51 is pre-processing the file request 31 from client 30, handler 51 may also pre-process other, similarly-intercepted requests from other clients (not shown). Local protocol handler 19 does not need to alter the outgoing, file request 31, but does need to interact with the remote file handler 51 when corresponding data is sent back by way of path 32.

If the file requested by request 31 is in-use by another process, the type of returned access 32 that will be granted by the combination of the intelligent file-request handler 51 and the remote OS 59 may be of a pre-locally-constrained, 'Read-Only' type (plc-RO). If the requested file is not in-use by another process, the granted access 32 may be of a pre-locally-constrained, 'Write-Enabled' type (plc-R/W). As is schematically indicated in FIG. 1B, each of clients 10 and 20 has a respective one of local access constraining mechanisms 25 and 25' disposed and physically secured within its respective housing 11 and 21.

When the latter, plc-R/W case (write-enabled access-granted upstream) occurs, the user may be given to believe that he/she is able to modify a file while the file resides in remote file server 50; provided of course that rights-demoting constraints are not locally-imposed further downstream in access constraining mechanism 25 to reduce the R/W access rights granted at the upstream server level. When the former case of Read-Only plc access-grant occurs upstream, the user may be given to believe that he/she is able to read the plaintext of the requested file while the file resides in remote file server 50; provided again that further constraints are not locally-imposed downstream of the server, in access constraining mechanism 25 for reducing the plc-RO access rights given at the upstream server level. In both cases such a belief by the user will be wrong if the accessed file is identified in the server as a 'permissions-controlled' file. A permissions-controlled file is one whose access rights are demotable by locally-imposed restrictions due to a permissions constraining operation that occurs further downstream in the respective, local access-constraining mechanism 25 or 25' the local client (10, 20). The reasons why such demotions may occur, will become apparent shortly.

In an alternate or further embodiment, instead of having the intelligent file-request handler 51 intercept access requests at the site of the remote server 50, the intercept task is given to a locally-resident, file-request handler 29 such as that found within the illustrated second client computer 20. The local, file-request handler 29 is somewhat more intelligent than the local protocol handler 19 in that file-request handler 29 needs to know details about locations within server 50 of a permission-rules identifier/provider 55. File-request handler 29 will intercept and pre-process each remote-access request (file-OPEN request) from a locally-executing application program 26 before the actual request (33) is conventionally acted on by the local OS 24 and sent to the remote OS 59 for further, conventional handling.

Each pre-process operation (either that which is carried out by the remote handler 51 or that which is carried out by local handler 29) interacts with the permission-rules identifier/provider 55. The identifier/provider 55 resides within the remote file server 50.

In the case where the local, file-request handler 29 is used, the pre-process operation flows through illustrated path 34 and then through path 57 to connect to the permissions identifier/provider 55. In the case where the intelligent file-request handler 51 is used, the pre-process operation flows through illustrated connection 31, through the handler 51, and then on path 57 to connect to the permissions identifier/provider 55.

Identifier/provider 55 may either identify the location of certain file-tracking and/or permissions managing information or it may provide that information or both. Parts of the permission-rules identifier/provider 55 may be embedded in the directory structure (not shown) of the remote file server 50 if desired. For example, for each folder, a specific directory bit may be used to flag whether the folder is an access constrained one or not. This approach is illustrated at 55A in FIG. 1B. If the answer is NO, then the intelligent file-request handler 51 can simply pass the file request 31 directly onto remote OS 59 because no special handling will be needed.

If the answer to query 55A is instead YES, then the intelligent file-request handler 51 may have to probe deeper into a further embedded part of the folder's specification in the directory, or in another prescribed location, to determine if the folder (52, 53 or 54) that contains the desired file is an OTF-covered folder. If the answer to query 55B is yes, then a respective POINTER may be followed to a storage location in remote server 50 that holds corresponding permission rules for controlling OTF-recryption.

The intelligent file-request handler 51 may be able to stop its query there, or it may have to probe yet deeper into a further embedded part of the folder's specification in the directory, or in another prescribed location, to determine if the folder (52, 53 or 54) that contains the desired file is also or alternatively a bidirectionally Bubble-protected folder. If the answer to the corresponding query 55C is yes, then a respective POINTER may be followed to a storage location in remote server 50 that holds corresponding permission rules for controlling such bidirectional Bubble-protection. ("Bidirectional" Bubble-protection works to block both read and write access at the local constraining level, 25 or 25'. By contrast, a "unidirectional" Bubble-protection may work to block only one or the other of read and write access at the local constraining level. This definition may apply in next query box 55D.)

The intelligent file-request handler 51 may be able to stop its query there, or it may have to probe yet deeper into a further embedded part of the folder's specification in the directory, or in another prescribed location, to determine if the folder (52, 53 or 54) that contains the desired file is also or alternatively subject to permissions-controlled constraining (25 or 25') in the local client (10 or 20) on some other basis besides OTF-recryption and bidirectional Bubble-protection. One of those other bases can be the above mentioned, unidirectional Bubble-protection. Another such permissions-controlled constraint might be the turning on or off of Volume encryption operations such that sector by sector (or cluster by cluster) decryption and automatic re-encryption does or does not happen as each disk sector is respectively read from or over-written to. If the answer to the corresponding query 55D is yes, then a respective one or more POINTER(S) may be followed to respective storage locations in the remote server 50 that hold corresponding permission rules for controlling such other, permissions-controlled constraining (25 or 25') in the local client (10 or 20). The corresponding permission rules are schematically shown at 55E.

For purpose of simplified illustration it will be assumed here that identifier/provider 55 itself stores in a first region 52a, both a logical linkage 52b to an OTF-covered folder 52 and all the corresponding permission rules for that folder. (It is within the contemplation of the disclosure that parent folders may be linked with general permission rules for their children folders while the children folders are further linked to more specific permission rules for their respectively-contained files.) The exemplary file-tracking/managing information 52a is understood therefore to identify one or more specific folders of remote file server 50 that are OTF-covered folders and to specify or identify the corresponding OTF permission rules for those OTF-covered folders. Thus, the exemplary file-tracking/managing information 52a will identify (by way for example of pointer 52b) folder 52 as being an OTF folder. No part of the permission-rules identifier/provider 55 will identify folder 53 as being either an OTF-covered folder and/or a Bubble-protected folder. This will imply that folder 53 is an unconstrained folder in so far as the permissions-controlled and local constraining mechanism (25 or 25') of the file-requesting, local client (10 or 20) is concerned.

Each piece of file-tracking/managing information (e.g., 52a) may optionally provide further information about files within the respective OTF folder (e.g., 52) that it identifies as being an OTF folder. Such additional information may indicate how many client processes are currently accessing each given file within folder 52. Other relevant file-tracking/managing information may be included as desired.

The main concept being presented here is that the place of primary residence for a given file, in other words, the primary storage means (e.g., 50) which holds a primary version (e.g., 52) of the given file also maintains a tracking means (e.g., 52a) for indicating whether the respective primary file is OTF-covered or not. The same or a like second tracking means (e.g., 54a again in the illustration) may be provided for indicating whether the respective primary file is under Bubble-protection or not.

Each client (e.g., 10, 20, etc.) that wants to use the data of a permissions-controlled, primary file (e.g., a file inside folder 52 or 54) will first cause an access to be made to the corresponding file-tracking/managing information (e.g., 52a) to determine how the permissions-controlled data is to be managed. For example, the client may want to know if the requested file is OTF-covered and/or Bubble-protected or not. If the file is OTF-covered, the client (e.g., 10, 20, etc.) may choose to handle the data returned from the file in one way (by invoking OTF-recryption processes). If the file is Bubble-protected, the client (e.g., 10, 20, etc.) may choose to handle the data returned from the file in a corresponding way (by invoking Bubble-protection processes). If the sought file is not a permissions-controlled one, the client will generally choose to instead handle the file in a more conventional manner, in other words, as being a plaintext file whose data is accessible at any time from any machine and under the operations of any application program.

Accordingly, when a file-OPEN request (15a) is intercepted (by handler 51 or 29), the provided/identified, tracking/managing information 52a for the requested file will generally be routed back to the requesting client (10 or 20) during the pre-processing operations so that the client can use the so-routed, permissions-control information 52a locally for determining if the requested file is OTF-covered or not; and/or for determining if the requested file is under Bubble-protection or not; and for thereafter respectively supporting one or both of OTF (Smart-Lock™) local operations and Bubble-protection local operations according to file-related, permission rules.

Different pieces of tracking/managing information may be associated with different ones of the files or folders that are stored in remote file server 50. As such, for each file or folder whose contents are to be subject to OTF protection (that is to be kept Smart-Locked™) and/or to Bubble protection, the respective pieces of tracking/managing information 52a, 54a, etc., need to be identified and the respective permission rules (or tokens for them) need to be downloaded (32, 34) back to the requesting client 10/20. That is one of the jobs of the utilized one of intelligent file-request handler 51 or local file-request handler 29.

For purposes of providing OTF protection, the downloaded permission rules can comprise file exclusion and/or inclusion lists that specify which files are to be respectively excluded from or included in OTF operations. For purposes of providing Bubble protection, the downloaded permission rules can comprise program exclusion and/or inclusion algorithm specifiers that specify which programs (e.g., applets) are to be permitted to access a corresponding file or folder, and to what extent.

In order to quickly provide and route back the desired permissions control information to the requesting client, the permission-rules identifier/provider 55 should be easily-and-quickly locatable so that the intercept and pre-process operation (as performed by either handlers 19/51 or by handler 29) can quickly and easily locate this identifier/provider 55, and thereafter query (e.g., search through) the identifier/provider 55 for permissions tracking/managing information, or for pointers to the same. The sought-after tracking/managing information (e.g., 52a) will correspond to the folder (e.g., 52) whose contents have been requested by the access-requesting client 10/20.

As will be shortly seen, the root directory of the targeted volume in the remote server 50 is preferably used as the easily-and-quickly locatable region in which the OTF/Bubble-tracking information (e.g., 52a) is stored. However, there may be instances in which the sought-after tracking/managing information (e.g., 52a) will already be available in the requesting client, 10 or 20 because another, local process has already caused it (52a) to be previously downloaded to the client. In such a case, it is preferable for the request handler 51/29 to know this and to skip the search-and-download part of the pre-process operation (see step 205 of FIG. 2A) when the latter operation is not truly needed.

If the sought-after tracking/managing information (e.g., 52a) is not already available in the requesting client 10/20, and it is found in the remote file server 50, then this tracking/managing information (e.g., 52a) is downloaded over the appropriate link 30/30' and copied into local storage (e.g., 12, 22) within the requesting client 10/20 for use by a locally-executing, OTF-recryption or Bubble-protecting, or other access constraining algorithm of the client.

The downloaded permission rules information should be at least digitally-signed at its point of origin (e.g., server 50) and after its transmission, it should be checked for authenticity at the point of receipt (10/20) so that it cannot be easily tampered with (e.g. spoofed) while it is in transit over an unsecured link (e.g., 30). Optionally, the downloaded permission rules information may be also encrypted. However the latter precaution is often not needed and can disadvantageously slow system response speed. The digital-signature technique that covers the downloaded tracking/managing information (e.g., 52*a*) can be any effective one such as RSA public-key signature, or DSA (Digital Signature Authentication), or MAC (Message Authenticating Code) or one based on elliptic curves. The point is that spoofers/intruders will not be able to easily intercept the downloading, control information (e.g., 52*a*) and alter it without detection. If they were able to tamper with such download data (52*a*), they might be able to fool the permissions-controlled and local constraining mechanism (25 or 25') in the local client 10/20 into performing operations other than those intended by authorized users or administrators of the system 95.

In one embodiment, if the sought-after tracking/managing information (e.g., 52*a*) is not found at the primary storage location (e.g., 50) of the correspondingly sought-after file, then it may be assumed that the requested file is an unconstrained file (e.g., one in folder 53) rather than one protected by one or more of OTF-recryption, Bubble-protection and/or other access constraining operations (see step 207*n* of FIG. 2A). In such a case, the request handler 51/29 may simply end its intercept and hand over control to conventional parts of the resident operating system 59/24 for completing the processing of the file-access request (e.g., file-OPEN request, see also step 299 of FIG. 2A). Further in such a case, the plaintext of the requested, non-OTF file (e.g., inside folder 53) may simply flow through an unsecured communications link 30/30' between server 50 and a respective client 10/20 for direct use (without recryption) by the requesting, local program (e.g., 16/26).

On the other hand, if the sought-after tracking/managing information (e.g., 52*a*) is successfully found and downloaded (or deemed to be already present locally), and the desired file is an OTF-covered one, only the encrypted version of the requested, OTF file (e.g., inside folder 52) will flow through an unsecured communications link such as 30/30' between server 50 and client 10/20. Thus, when request handling is so practiced in accordance with the disclosure, and the requested, remote file is a Smart-Locked™ (OTF-covered) file, the belief by a user that the user is able to directly modify the plaintext of the requested file while the file remains resident (at home) in the remote file server 50 is merely an illusion. The alternative or further belief of the user that the user can directly read the plaintext of the requested file while the file resides in remote file server 50 is also merely an illusion. Actual plaintext of a confidential file is not passed over an unsecured link such as 30 or 30' but is instead provided only within the confines of the more-secure client machine 10/20.

Smart-Locked™ (OTF-covered) files should always be kept in encrypted format while they reside at a remote site 50 or on a removable media (e.g., floppy diskette) or while they are in-transit over an unsecured link (e.g., 30). The encrypted data of such remote Smart-Locked™ files should be first copied in accordance with the disclosure to the more-secure, internal parts of the local client computer 10 and decrypted therein (using OTF-recryption) before being operated on locally.

Irrespective of whether a source file is access constrained or not, all client requests should be pre-processed quickly to determine if the source file is covered by one or more access constraints such as Smart-Locking™ and Bubble-protection. In one embodiment, the permission-rules identifier/provider 55 comprises a uniquely-named file which is digitally-signed and preferably resides in the root directory of its respective server 50 or of its respective storage volume. A unique file name such as, for example, 'SmartLocked.fid' (which unique name may be an abbreviation for Smart-Locked™ Folders IDentifier) may be used. Other examples of unique file names that may be so used are: (a) 'OTFolders.sid' (which unique name may be an abbreviation for OTF-covered folders, Smart-Lock IDentifier); or (b) NortonProtected.sli (which unique name may be an abbreviation for Norton™ Protected Smart-Lock Information, where like Smart-Locked™, Norton™ may be a trademark of Symantec Corp. and where said trademarks each exists as an independent entity separate and apart from any patent rights provided hereby); or (c) NPD.npf (which unique name may be an abbreviation for Norton™ Protected Directory and Norton™ Protected Files). Other variations or recombinations of the above are possible.

The pre-process request handlers (19/51 or 29) can quickly search the root directory of the external and/or remote volume that holds the requested file for such a uniquely named root file (e.g., 'SmartLocked.fid') and then read the contents of this centrally-located means 55. The data that is read out may be used for quickly determining whether the requested, remote file is Smart-Locked™ or not. The same or another root file may be used for similarly determining whether the requested, remote file is covered by Bubble-protection and/or is otherwise access constrained or not.

Operations performed by the pre-process request handlers (19/51 or 29) should be transparent to the locally-executing application program 16/26. In other words, a locally-executing application program such as 16 of client 10 will usually not itself need to know that the file it has requested is Smart-Locked™ and/or Bubble-protected and/or otherwise access constrained or not. The program 16 may not even be internally aware that the requested file is remotely-stored. Instead, as seen within the depiction in FIG. 1B of a local execution stream 15, in a first time slot 15*a* the application program 16 or a precursor thereof will blindly send a service request of a form such as:

OPEN_AND_GET_HANDLE(named_file)

to the locally-executing operating system 14. The local OS 14 will return a corresponding 'HANDLE' parameter to the program 16. The local program 16 will thereafter use the returned HANDLE parameter rather than the full file pathname for performing reads-from (15*b*) or writes-to (15*c*) the targeted file.

When it is finished using the file, the application program 16 or a precursor thereof that sent the OPEN-file request to the OS 14 should send a corresponding CLOSE(HANDLE) request to the OS as is shown at 15*e*. Conventionally, such a CLOSE request will end the usage of the targeted file and its HANDLE. However, as explained in the above-cited, U.S. Pat. No. 5,699,428, if other processes are still processing a version of the same file under OTF, the CLOSE operation might be delayed until all local processes have finished using that OTF-covered file. In accordance with the present disclosure, that concept of realizing that concurrent, other application programs may be making use of a locally-exposed version of the to-be-CLOSED file is preferably extended to all Transparently and Temporarily Localized versions of access-constrained files. In other words, a TTL'ed file is kept as Temporarily Localized even after a given, first application program (e.g., 16) issues a CLOSE (HANDLE) request 15*e* to the OS if a second application program (not shown) that is executing within that same machine 10 is found to still be using that same TTL'ed file.

In the example of the local OPEN request 15*a*, the full file pathname is shown as having the exemplary form:

'\\SERVER_NAME\VOLUME_ROOT\DIR\
    SUBDIR\..........\FILE_-NAME'.

This form may vary from OS to OS. For example, in UNIX, devices are treated the same way as folders rather than being given special '\\' prefixes in their designations. The file pathname may specify a particular server such as 50, and then a particular volume and its root (inherent), and then a particular directory found within the root, and then a subdirectory, and so on, until, at or about the end of the pathname, a specific file is specified. One or more of the specified directory or its subdirectories may be identified by the permission-rules identifier/provider means 55 as being a Smart-Locked™ folder (as being an OTF folder) and/or as being otherwise access-constrained.

Figure 2C:
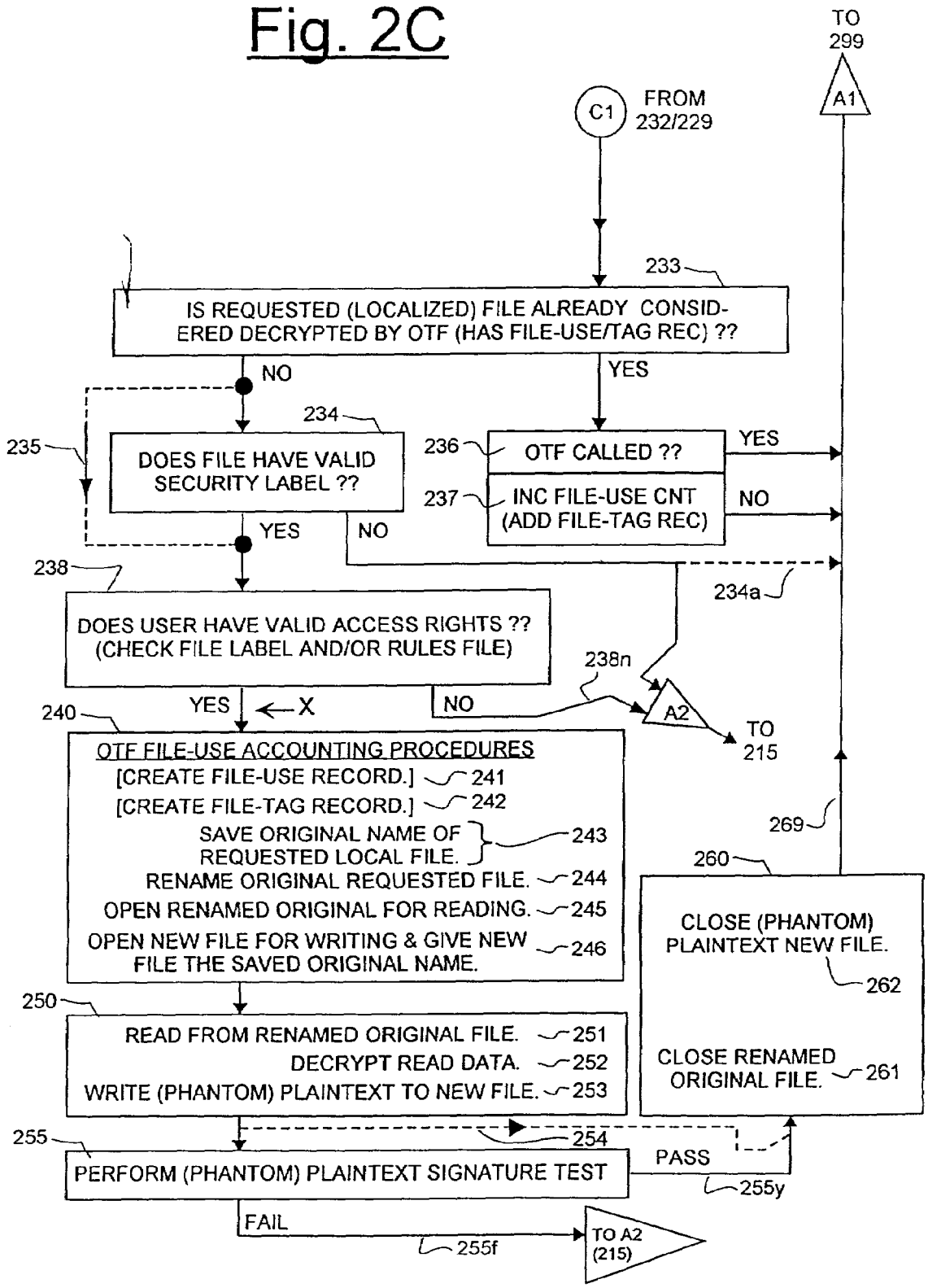

In a preferred embodiment, targeted files are identified as being Smart-Locked™ and/or as being otherwise access-constrained at the folder level (directory or subdirectory level) rather than at the FILE_NAME level. This approach helps to keep the size of the permission-rules identifier/provider 55 relatively small and helps to keep the time short for the identification step. If the targeted file of the OPEN request is identified by the permission-rules identifier/provider 55 as being Smart-Locked™, certain security-supporting operations should take place in the background. The background operations should be transparent to the locally-executing application program 16. When control returns to it, program 16 will merely think that a conventional OPEN function has been carried out. READ's (15*b*) and WRITE's (15*c*) will appear to be operating on a plaintext version of the remote file even though in reality that will not be true. The security-supporting operations will be detailed when FIGS. 2A–2C are described.

READ and WRITE are examples of operations wherein actual access to the intelligible information (plaintext information) of a file is expected. There are other kinds of file-using service requests that do not need to have actual access to the intelligible information of the file. Examples include COPY(named_source_file, new_destination_name) and MOVE(named_source_file, new_destination_name). A COPY( . . . ) command, such as shown at 15*d*, generally implies that a duplicative copy of the named_source_file will be created at the time of execution and identified by the specified new_destination_name. The MOVE( . . . ) command generally implies that the named_file will be moved to the specified new_location without leaving behind a duplicative copy.

In accordance with one embodiment of the disclosure, if the COPYed or MOVEd file is Smart-Locked™ and/or otherwise access-constrained, then it is left to the application program and/or other entity (e.g., user) which gave the COPY or MOVE command to assure that the destination folder (possibly in a new media) is identified as a Smart-Locked™ and/or otherwise access-constrained folder and that a corresponding permission-rules identifier/provider (55', not shown) identifies, or is made to identify the destination folder (52', not shown) as being correspondingly Smart-Locked™ and/or otherwise access-constrained. If the destination folder is not so-identified as being correspondingly Smart-Locked™ and/or otherwise access-constrained, then the COPYed or MOVEd file might end up being treated as if it were an unconstrained, plaintext file. In other words, OTF-recryption operations will generally not be invoked and as a result, no plaintext will be derived from the COPYed or MOVEd file even though the original is covered by OTF-recryption. Thus, the confidentiality of the contents of the original file will be preserved even if such a mistake is made by the entity which gave the COPY or MOVE command.

In identifying targeted files as being Smart-Locked™ and/or otherwise access-constrained, or not, at the folder level, there are several possibilities. In the preferred embodiment, the identification is done only at the most adjacent subdirectory level in the pathname of the file, where that most adjacent subdirectory level immediately precedes the filename. In other words, a permission-rules identifying pointer such as 52*b* points to the subdirectory which immediately contains the targeted file therein. Such a lowest level subdirectory can be contained in yet higher-level directories (up to the root directory). Under this approach, OTF/Bubble control and/or other access-constraining information 52*a* can be copied and fined-tuned or tailored as appropriate for each of the lowest level subdirectories. This gives users the greatest flexibility without having to specify individual controls for each of what could be thousands of individual files in each of the lowest level subdirectories.

An alternative approach causes each next lower, subdirectory to inherit the OTF/Bubble control information 52*a* of its next higher-level folder, where the latter folder contains that next lower, subdirectory. The amount of memory space that may need to be consumed by the OTF/Bubble control information 52*a* can be lessened if this alternative approach is used. However, this alternative approach may create complications if the OS allows for aliases (nicknames) in the file pathname. Also, scanning through the permission-rules identifier/provider 55 for a match with any of all possible components of a long pathname may lengthen pre-processing time disadvantageously.

Before proceeding to the detailed, operational flow charts such as the OPEN sequence found in FIGS. 2A–2C, a more detailed description will be provided of structures that may be found in each local client computer such as 10 and 20.

Figure 1C:
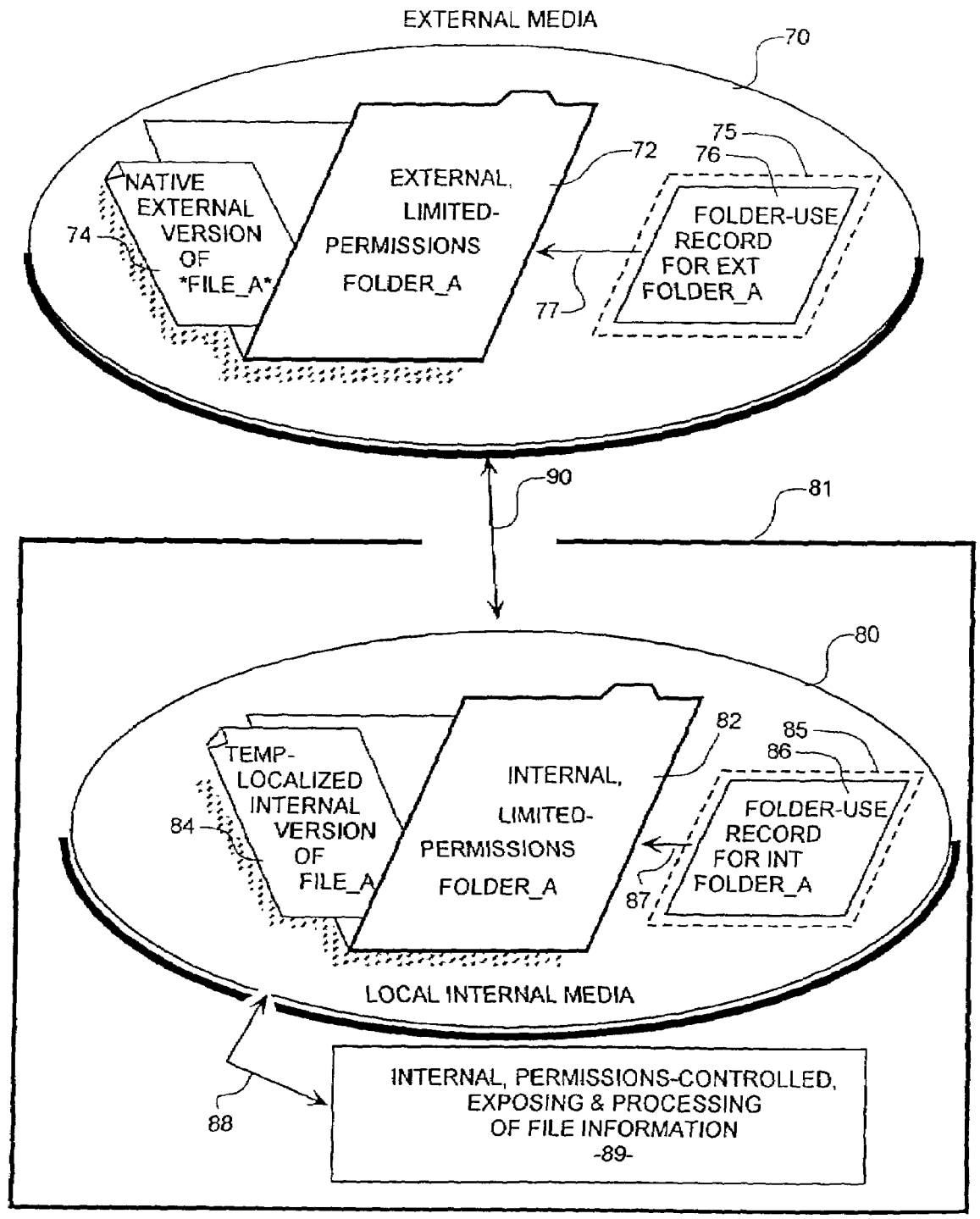
FIG. 1C is a simplified schematic of a Transparent and Temporary Localizing (TTL) process in accordance with the disclosure.
Figure 1E:
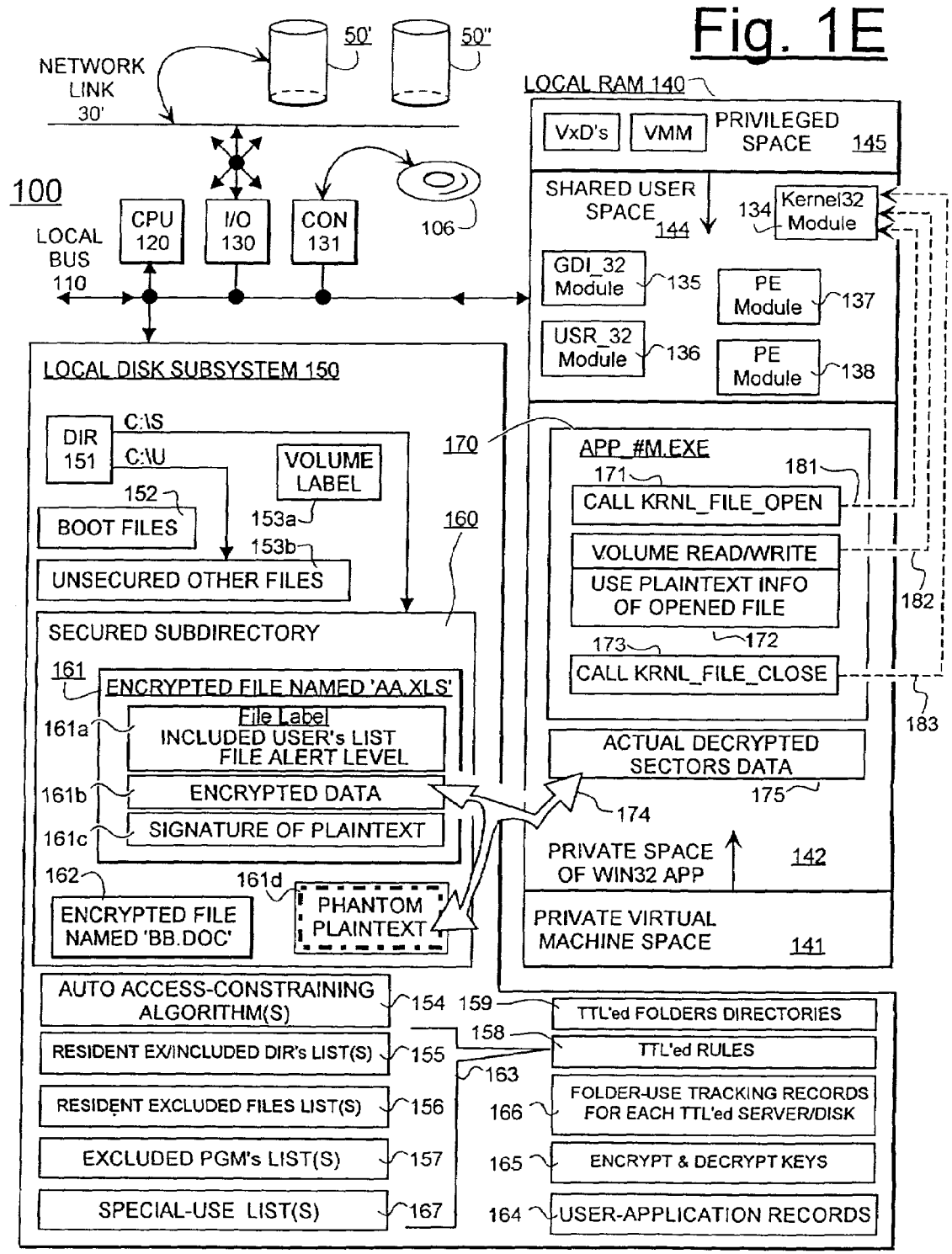
FIG. 1E is a block diagram of a local client computer that is configured in accordance with the disclosure.

FIG. 1E is a block diagram of a representative, client computer system 100 that may be used in accordance with the disclosure. Client computer 100 includes a local system bus 110 coupling a local system memory 140 such as a random access memory (RAM) to a plurality of other local system resources including a system CPU 120, system I/O module 130, an intersystem data conveyance (CON) means 131, and a nonvolatile memory subsystem 150. System I/O module 130 allows for bidirectional interconnection to a network link 30" and/or to other data input and output resources. The network link 30" may couple to one or more remote servers such as 50' and 50". Network link 30" and remote server 50' may of course correspond to elements 30 and 50 of FIG. 1B.

The system memory 140 may comprise one or more of assorted types of high-speed random access devices into which immediately executable code may be stored. System memory 140 can include one or more of static RAM (SRAM), dynamic RAM (DRAM), and other like devices. Typically at least part of the system memory 140 is volatile, meaning data is lost and must be rewritten when power is discontinued, although it is not outside the contemplation of the disclosure to have system memory 140 being at least partly defined by non-volatile random access memory devices such as flash EEPROM. (However, in the later case, special scorching may be required to delete leftover plaintext during power shutdown so that confidential information is not left exposed.)

Often the local computer system 100 will include a small boot ROM (Read Only Memory) coupled to the CPU 120 for power-up and other basic re-bootings of the system. For sake of simplicity, the boot-ROM (e.g., BIOS) is not shown. Data within the BIOS and/or within another in-system ROM may specify an OS-readable, unique serial number for the local computer 100. The local computer system 100 may also include a real-time clock (not shown) that keeps track of actual time. In one embodiment, the real-time clock is not adjustable through normal software manipulation (e.g. access to it may be password-protected). This secured real-time clock may be used for determining whether a temporal portion of an access constraining, permission rule is satisfied or not.

When the local system 100 boots-up, various files may be automatically loaded from the disk subsystem 150 or from elsewhere (e.g., from system I/O 130) into system memory 140 to thereby create a collection of data structures within system memory 140. These data structures normally include executable instruction code that can be immediately and usefully executed by a responsive data processing unit such as the illustrated central processing unit (CPU) 120 of FIG. 1E or by non-centralized multiple data processing units (not shown) that may be further or alternatively coupled to local bus 110.

The system I/O module 130 may use local bus 110 for transferring data between one or more of the illustrated portions of system 100 and the network link 30" or external devices (e.g., remote server 50' or portable media 106). In one embodiment, the system I/O module 130 may couple the illustrated system bus 110 to a variety of external resources such as a user terminal (e.g., keyboard and monitor), a local area network (LAN), a wide area network (WAN) and/or to other external data transceiving and processing means.

The data conveyance means 131 can be defined by data transfer devices such as floppy diskette drives, tape drives, CD-ROM drives, CD-RW drives, DVD-RW drives, and other such magnetic, optical or other signal-recording means by way of which data recorded on transportable media 106 can be brought into system 100 or copied or moved and carried away from local system 100. Transportable media 106 may be viewed as another data-moving channel that, in addition to network link 30" and server 50', allows file data to be moved in or out of the locally-secured confines (e.g., locally housed confines) of local computer 100. Software for causing computer system 100 to perform various operations described herein may be pre-recorded partially or fully on a transportable media such as 106 and thereafter installed into system 100 or it may be conveyed partially or fully into system 100 by a manufactured data signal that comes in by way of system I/O module 130, such as over an external communications link 30".

The disk subsystem 150 typically includes a drive (not separately shown) and a data storage medium (not separately shown) onto which data may be stored and from which data may be retrieved. The disk's data storage medium may be in the form of a magnetic hard disk, or a floppy diskette, or a re-writeable optical disk, or other such non-volatile, randomly accessible, re-writeable media. ROM and/or Flash EEPROM and/or the like may be used in carrying out some or all of the nonvolatile data storing functions of the disk subsystem 150.

One item of data that is often recorded into the disk subsystem 150 is that which defines a directory structure 151 and a plurality of directory-defined, files (not all shown). Examples of files include automatic boot-control files 152, and other local files such as 153*b*. The group of files referenced as 153*b* are referred to herein as 'unsecured other' files 153*b* for reasons that will become apparent shortly. An optional, volume label is defined by region 153*a*.

Directory structure 151 points to, and defines the storage organization of each of the locally stored files. By way of example, the boot-control files 152 may be defined as being contained in a root directory (such as C:\in MS-DOS™ parlance). The unsecured other files 153*b* may be defined as being contained in a first subdirectory (such as C:\U in MS-DOS™ parlance). Yet other files such as the illustrated local files 161 and 162 may be defined as being contained in a second subdirectory 160 (such as C:\S in MS-DOS™ parlance).

The illustrated second subdirectory 160 is referred to herein as a locally secured subdirectory 160 for reasons that will become apparent shortly. One or more of the files such as 161 and 162 that are contained in the locally secured subdirectory 160 are referred to herein as secured or encrypted files. The secured subdirectory 160 may contain other types of files such 'hidden' files. The term 'hidden' means here that such files are not listed when a simple list-directory-contents command such as DIR (in MS-DOS™ parlance) is executed. Although not shown, the secured subdirectory 160 may temporarily contain plaintext file copies derived from one or more of its encrypted files, 161–162 by way of decryption. Storage of such plaintext and confidential data in nonvolatile form is undesirable in accordance with a volume encryption feature described in the above-cited, U.S. application Ser. No. 09/047,316, but may nonetheless occur in some embodiments of the present disclosure.

Each of secured files 161–162 has a name by which it is identified in the directory structure 151. By way of example, file 161 is given the name 'AA.XLS'. The last characters after the last period in the name are referred to as the name extension. A name extension such as 'XLS' may indicate that the file 161 contains spreadsheet data such as that usable by the Microsoft Excel™ spreadsheet program. It may alternatively signify different kind of data. This is just an example.

By way of further example, file 162 is given the name 'BB.DOC'. The 'DOC' name extension may indicate that the file 162 contains word processing data such as that usable by the Microsoft Word™ program. It may signify other kinds of data. Again, this is just an example.

As seen in FIG. 1E, each secured file such as 161 has a respective, secured data section 161*b* that contains encrypted data. The encrypted data of secured data section 161*b* is generally unintelligible until it is appropriately decrypted.

Each secured file such as 161 preferably has a respective file label section 161*a* that contains various kinds of encrypted and plaintext data. Part of that data may represent a list of authorized users (INCLUDED USER's LIST). Another part of that label data may define one or more alert responses to be taken if an access attempt is detected by an unauthorized program or user (FILE ALERT LEVEL). One possible embodiment for the file label section 161*a* is that which conforms with the above cited, U.S. Pat. No. 5,953, 419 (CRYPTOGRAPHIC FILE LABELING SYSTEM FOR SUPPORTING SECURED ACCESS BY MULTIPLE USERS).

Each secured file such as 161 preferably also has a respective digital signature section 161*c* that protects plaintext parts of the file's data, such as part 161*a* from unauthorized tampering, this protection may be provided by way of digital signature technology. One possible embodiment for the digital signature section 161c is that which conforms with the above cited, U.S. Pat. No. 5,953,419.

A plaintext version of the file's encrypted-data 161b is shown in dashed box 161d. If volume-encryption is being utilized, such a plaintext version 161d will generally not actually exist in the nonvolatile disk subsystem 150. However, application programs may be fooled into believing that the plaintext data of dashed box 161d does reside in subsystem 150 because of transparent intercept operations performed automatically by a volume-encryption action 172. In such volume encryption cases, the plaintext version 161d is referred to as phantom plaintext. If volume-encryption is not being utilized, then the plaintext version 161d will actually exist temporarily in the nonvolatile disk subsystem 150 and will be deleted (scorched) when all authorized use of that file ends. A description of a volume-encryption mechanism may be found in the above-cited, U.S. application Ser. No. 09/047,316.

Although not shown, secured file 162 preferably has a corresponding structure with a respective label section 162a, encrypted data section 162b, signature section 162c, and real or phantom plaintext version 162d. Secured subdirectory 160 may have many more like files in addition to the illustrated, locally-secured files, 161 and 162.

As further seen in FIG. 1E, the illustrated disk subsystem 150 stores: (a) one or more, automatic access-constraining algorithms 154; where such algorithms 154 may include OTF-recryption and/or a bidirectional bubble-based protection algorithm for providing access approval or denial to access requests presented via various kinds of programs, where such programs may include via-the-Internet, downloaded applets (e.g., Trojan horses).

Disk subsystem 150 may further store: (b) one or more 'locally-resident' lists 155 identifying local directories whose non-hidden files are to be included in, or excluded from; list-associated, and thus respective access-constraining algorithms 154. The term, 'locally-resident' implies here that the respective list is resident within system 100 on a basis that is more permanent than that of like lists (158) which are Transparently and Temporarily Localized (TTL'ed) into disk subsystem 150. The term, 'respective access-constraining algorithms' implies here that a corresponding one or more, of the automatic access-constraining algorithms such as OTF-recryption and Bubble-protection follow permission rules defined by the associated list or lists.

Disk subsystem 150 may further store: (c) one or more locally-resident lists 156 identifying locally-resident, specific at-home files that are to be excluded from the respective access-constraining algorithm or algorithms.

Disk subsystem 150 may further store: (d) one or more locally-resident lists 157 identifying 'to-be-excluded' file-using programs for which the respective, access-constraining algorithm (e.g., OTF recryption) is to be suppressed within the local machine 100.

Disk subsystem 150 may further store: (e) one or more locally-resident lists 167 identifying 'special' file-using programs or 'special' local files for which the re-encryption portion of 'on-the-fly recryption' is to be delayed until after a prespecified post-CLOSE event takes place.

If a given, external file is Transparently and Temporarily Localized (TTL'ed) into local system 100 from an external source (e.g., 50', 50", 106), then in accordance with the disclosure, the corresponding permission rules of that TTL'ed file are also Transparently and Temporarily Localized, and thereby stored in a disk region such as 158 (TTL'ed Rules). The TTL'ed Rules 158 may be defined by lists of a same form as lists 155, 156, 157 and 167. This symmetry is represented by inheritance symbol 163.

Of course, the TTL'ed Rules 158 will apply to folders stored within a special, TTL'ed Folders directory 159. As its name implies, the TTL'ed Folders region 159 has one or more directories that each stores copies of external folders where the copies are Transparently and Temporarily Localized incarnations of folders found in an external storage. The TTL'ed incarnations 159 do not have to be full and complete duplicates of their originals, they merely need to hold copies of corresponding files that are Transparently and Temporarily Localized.

The above may seem too abstract. So let us consider a more concrete example. Suppose that inside first server 50' there resides an access constrained folder named: '\\Serv50\path1\OTF-covered-1'. Suppose that inside the latter folder there are hundreds of files, but that a particular one is named, 'OTF-covered-file99'. Suppose further that local system 100 requests access to the remotely-resident, 'OTF-covered-file99'. In accordance with the disclosure, there will be created within local region 159, a folder named, 'OTF-covered-1'. There will be copied into this local, 'OTF-covered-1' folder, a Transparently and Temporarily Localized version of 'OTF-covered-file99'. There is no need to copy into the local, 'OTF-covered-1' folder (159) all the others of the hundreds of files in the remote and original, 'OTF-covered-1' folder (in 50 of FIG. 1E). So that won't be done. The local, 'OTF-covered-1' folder (159) will be a partial replica of its remote parent (in 50').

Further in accordance with the disclosure, there will be copied into local region 158, the remote permission rules from first server 50' that apply to the remote and original, 'OTF-covered-1' folder (in 50'). Because the local, 'OTF-covered-1' folder (159) is named the same as is its remote parent, the TTL'ed rules (158) may apply to this TTL'ed, 'OTF-covered-1' folder (159) in a similar way as the corresponding remote rules apply to the corresponding remote folder. More specifically, the remote rules may say: "If day of week is weekend, then all files immediately stored in a folder named OTF-covered-1* are excluded from OTF-recryption, otherwise they are subject to OTF-recryption". (This is just an illustrative example.) The TTL'ed rules (158) will then say the same thing and will apply as such to the 'OTF-covered-file99' that was copied into the local, 'OTF-covered-1' folder within region 159. (Note that the asterisk (*) in the exemplary rule is a wildcard query string.)

After local system 100 finishes using the Transparently and Temporarily Localized version of 'OTF-covered-file99', the correspondingly TTL'ed version of the permission rules (in region 158) may be erased.

The above is a simple example that assumes there is only one server 50' on the network 30'. Suppose however, that there are hundreds and any two or more such servers (say 50' and 50" of FIG. 1E) can have same named, internal folders but different permission rules applying to such, same named folders. Now there is a need to keep track of which external server each TTL'ed folder (159) came from, and which external server each TTL'ed permission rule (158) came from.

As a first step towards reaching this goal, local region 159 may be subdivided into a set of directories named, 'External-Source-1', 'External-Source-2', 'External-Source-3', etc. The directory named 'External-Source-1' may be temporarily associated with remote server 50' when local system 100 sends an access request to the first such remote server 50'. Similarly, the directory named 'External-Source-2' may be temporarily associated with the second remote server 50"

when local system 100 sends an access request to the second such remote server 50". And so on.

Unfortunately that is not the end of the problem. Each of servers 50', 50"; etc. may contain many same-named folders which are respectively held in different super-directories. It would be inefficient to try and recreate in system 100 the entire directory structure (955 of FIG. 1A) of each of a large number of remote servers or transportable media (106). Instead, it is better to directly track where a sampled subsection of such a remote directory came from and to keep track of which permission rules apply to that sampled subsection.

Therefore, in further accordance with the disclosure, disk subsystem 150 should store: (f) one or more Folder-Use Tracking records 166, where each is preferably formed for a respective server or removable media and is used for keeping track of which access constrained folders in region 159 (TTL'ed folders) come from which respective server or removable media and which of these TTL'ed folders contain TTL'ed files that are still being used under a locally-administered one or more of the access-constraining algorithms 154. An example of a folder-use record is shown in FIG. 1D and will be discussed below.

In addition to regions which hold TTL'ed folders 159 and correspondingly TTL'ed permission rules 158, disk subsystem 150 may store: (g) a collection 165 of encryption and decryption keys and corresponding cipher algorithms. These may be managed in accordance with conventional key management techniques for implementing OTF-recryption, volume encryption, file encryption, digital signature checking, and so forth. Different cipher algorithms and/or keys may be used for implementing respective ones of the encryption and decryption schemes as appropriate for the circumstances involved. Of course, those skilled in the art appreciate that symmetric cipher algorithms should be used where fast response speed is desired and/or voluminous amounts of data are being processed. And contrastingly, asymmetrical cipher algorithms (e.g., public/private keys) may be used where slower response time is tolerable, higher levels of security are desired and substantially smaller amounts of data are being processed.

Additionally, disk subsystem 150 may store: (h) a set 164 of User-Application records for keeping track of how many instances of each application program are still using a given, locally-stored and access constrained, information file, where the latter information file can be a TTL'ed one (in region 159) or a local resident (in region 160). The data in the User-Application records 164 may be used to prevent premature re-encryption of a still in-use, information file and/or premature erasing of TTL'ed rules (158) and TTL'ed folders (159) in response to a given application program flagging that is finished using a certain information file (e.g., by issuing a CLOSE file message (15e in FIG. 1B). Other application programs may still be using the same information file.

Although not specifically shown in FIG. 1E, it is to be understood that disk subsystem 150 may further store: (i) instruction code for instructing the CPU 120 (or a like processor means that is operatively coupled to the system local bus 110) to carry out various automated operations in accordance with the herein described disclosure. Moreover, even though it is not expressly shown in FIG. 1E, it is to be understood that aside from the on-local-disk permission rules (155–157, 158, 167), the on-disk access-constraining algorithms 154 can be constructed to permanently define certain classes of files such as executables (e.g., '*.exe', '*.com', etc.) and dynamic link-loadables (e.g., '*.DLL') as being permanently excluded from one or more specific ones of the access-constraining operations based on the file name extensions of such permanently excluded files.

Although further not detailed in FIG. 1E, it is to be understood that disk subsystem 150 can store many other types of data structures, including but not limited to: (aa) device drivers (e.g., the 'virtual device drivers' or VxD's such as extracted into area 145 of system memory 140); (bb) a disk-image of an OS kernel module (KRNL32.DLL, whose RAM-resident image is shown at 134 in area 144 of system memory 140); (cc) a disk-image of a graphical device interface module (GDI32.DLL, whose RAM-resident image is shown at 135); (dd) a disk-image of a user interface module (USR32.DLL, whose RAM-resident image is shown at 136); (ee) and further disk-images of other link-loadable modules (e.g., PE_MOD1.DLL, PE_MOD2.DLL, APP#M.EXE, whose respective RAM-resident images are respectively shown at 137, 138 and 170).

All or various parts of the data recorded in the local disk subsystem 150 may be brought into subsystem 150 or copied out from subsystem 150 through a variety of data conveying means 131 or I/O means 130. The latter means 131 and 130 may include but are not limited to: floppy diskettes, compact-disks (CD-ROM), compact-rewritable disks (CD-RW), DVD disks, tape, and over-a-network downloading from a file server computer such as 50', 50" or the like.

Given that data in stored files such as encrypted files, 161–162 may become available to unauthorized users through a variety of ways, it is desirable to keep as much of this stored data in an encrypted form (ciphertext form) except for times and/or places when it is being legitimately used by authorized users. When exposure does happen, the actually decrypted data 175 should be kept only in volatile memory as indicated by the placement of box 175 in private space area 142 of system RAM. Alternatively, but less preferred, a plaintext version of an in-use and OTF-covered file might be temporarily held in what otherwise is phantom plaintext portion 161d of the disk subsystem 150.

Power-up or later initialization of computer system 100 may proceed as follows. In a Windows95™ environment for example, an initial operating system such as MS-DOS™ resides nonvolatilely on the disk subsystem 150 and is initially loaded into system memory 140 at power-up or re-boot time. Thereafter, additional data structures are loaded into the system memory 140 using the initial system operating system (MS-DOS™) as springboard booter. The later-booted OS can define a dynamically-linked loaded system such as the Microsoft Windows95™ operating system.

It is generally not desirable to store in an encrypted format, those files 152 that are involved with the loading of the initial system operating system (e.g., MS-DOS™). As such, the boot-controlling regions 152 of the disk subsystem 150 (which regions usually include the root directory C:\ and the automatic boot control files such as C:\AUTOEXEC-.BAT and C:\CONFIG.SYS that are immediately contained therein) are preferably identified in an Excluded Local Directories List of region 155. Alternatively or supplementally, the same regions 152 are NOT identified in an Included Local Directories List of region 155 so as to prevent undesired 'on-the-fly recryption' of files immediately contained in such boot-control regions 152.

Alternatively or additionally, such boot-control files 152 can be identified in an Excluded Local Files List of region 156. These are local files that are not subjected to OTF recryption because of such identification.

Just as it is desirable to suppress 'on-the-fly recryption' for the boot-control files 152, there may be other classes of files which are best left in a non-encrypted format on disk subsystem 150 for relatively long periods of time (e.g., for time periods substantially greater than the file usage time of any one or more application programs). These 'unsecured other files' are generally referenced as 153b in FIG. 1E. Often-used executable files (e.g., those having a '.exe' or '.com' extension) are an example of a file type that system administrators may wish to include in this category of unsecured other files 153b. Another example is a volume label 153a that may hold volume encryption governing information.

Like the boot-control files 152, the unsecured other local files 153b may be deliberately excluded from the access constraining operations of access-constraining algorithms 154 by storing such locally-resident files 153b in a directory (e.g., C:\U where the name 'U' is arbitrarily selected here to stand for 'unsecured') that is positively identified in an Excluded Directories List of region 155 and/or by not storing them in a directory (e.g., C:\S where the name 'S' is arbitrarily selected here to stand for 'secured') that is identified in an Included Directories List of region 155.

The boot-up of the Windows95™ OS or the like often creates a dynamically-linked and loaded environment. The bootup typically includes installation of virtual machine manager code (VMM code), virtual device drivers code (VxD's), Win16 operating system code, and Win32 operating system code into various privileged and nonprivileged areas (e.g., Ring-0, Ring-3) of system memory 140.

In the case where one or more Win32 threads are to execute within a corresponding process (there can be more than one Win32 process running simultaneously on local system 100, but each Win32 process executes in its own memory context—that is, in its own private Win32 process area), the virtual address space of system memory 140 may be subdivided to include: a) a private virtual machine area 141; (b) a private Win32 process area 142; (c) a shareable user space (global space) 144; and (d) a privileged space 145.

FIG. 1E shows the system memory 140 in a state where a virtual machine manager (VMM) has been loaded into the privileged space 145 together with one or more virtual device drivers (VxD's). The virtual machine manager (VMM) defines a privileged part of the operating system environment that application programs are supposed to—but do not necessarily—honor as being user-inaccessible. The virtual device drivers (VxD's) are operatively coupled to the VMM for responding to system status messages broadcast by the VMM.

FIG. 1E further shows the local system memory 140 in a state where first RAM-resident code 134 defining a Win32 operating system kernel (KERNEL_32) has been mapped from a corresponding disk region (not shown) into the shared user space 144. Unlike the VMM, the KRNL_32 module 134 defines a nonprivileged, understood to-be user-accessible part of the operating system environment, in other words, an API (application program interface).

In the particular illustrated state of FIG. 1E, after the loading of the OS kernel 134, second RAM-resident code 135 defining a Win32 graphical device interface (GDI_32) has been loaded from a corresponding disk region into a lower portion of the same shared user space 144 of memory 140. Thereafter, third code 136 defining a Win32 user interface (USR_32) has been loaded from disk into the shared user space 144. Following this, additional PE (portable-executable) modules have been loaded from various library areas (not shown) of disk subsystem 150 into the shared user space 144, such PE modules PE_MOD1 (137) and PE_MOD2 (138). Like, modules 137 and 138, each of the earlier-loaded blocks 134, 135 and 136 that reside in the shareable user space 144 has a portable-executable (PE) format and is expected to be in a non-encrypted, immediately usable form.

In the particular illustrated state of FIG. 1E, after the local OS kernel 134 and some other basic operating system modules such as GDI 135 and USR 136 have loaded, code for private application programs such as APP_#M (170) is shown to have been mapped from a respective disk region into the private Win32 process area 142. The module-occupied portion of the private Win32 process area 142 generally grows upwardly from lower memory as indicated by the upwardly pointing arrow drawn in space 142. Such upward expansion of used space is carried out under the caveat that the loader tries to accommodate the upload-destination preferences defined in the module disk-images when such free space is available. Thus, in general, the specific location within private Win32 process area 142 for each next loaded private module may depend on which private modules were previously loaded or unloaded.

During the uploading of each module's disk-image into system memory 140, cross references of each uploading module that point to locations outside of their respective module are generally resolved at upload-time if they had not been resolved previously (that is, if they had not been resolved statically by link-time).

Assume that at some point in the history of local system 100, a Win32-compliant, and executable application program named APP_#M, had been somehow link-loaded into subregion 170 of the private Win32 process area 142, and it is 'launched' such that it begins to execute within a given thread. Assume that, like many other application programs, launched APP_#M 170 is coded to access informational data ubiquitously, irrespective of whether that data is stored in a local information file or a remote information file. By way of example, we assume application program 170 will try to open (step 171) a local file identified as, 'C:\S\AA.XLS' which file pathname happens to identify the illustrated, encrypted file 161 of FIG. 1E.

Application program 170 is not aware that the file locally stored under the name, 'C:\S\AA.XLS' is currently encrypted or is otherwise access constrained. When it needs the information inside file 161, program 170 simply makes an OS-compliant attempt to access the desired file, in this case: 'C:\S\AA.XLS'. At some level of execution, a CALL is made to a file-OPEN service of the OS kernel (e.g., to a kernel service routine named for example, 'KRNL_FILE_OPEN') as indicated at 171. Such an interceptable call to 'KRNL_FILE_OPEN' is indicated by the drawn path 181 between boxes 171 and 134.

As further indicated at 172, after the file-OPEN request is granted, application program 170 will probably try to use what it expects to be the plaintext data 161d of the opened file by way of one or more file-READs and file-WRITEs (using a 'Handle' returned by the OS). The corresponding calls to OS kernel services are essentially CALLs to cluster or sector read/write services of the local OS kernel. Such interceptable calls to the primitive read/write services of the OS kernel ('Volume Read/Write' in the figure) are indicated by the drawn path 182 between boxes 172 and 134. As yet further indicated at 173, after application program 170 deems itself to be finished with its use of the data of the requested file 161, it will generally cause an interceptable CALL to a file-CLOSE service of the local OS kernel (e.g., to a kernel service named for example, 'KRNL_FILE_ CLOSE') to be generated at some level as indicated by the drawn path 183 between boxes 173 and 134.

Although it is not expressly shown, when the execution of application program 170 completes, the OS kernel 134 will be asked to 'terminate' that application program. In accordance with the disclosure, the interceptable CALL's to the file-OPEN and file-CLOSE services of the operating system are intercepted and acted upon to provide automatic and selective, access constraining operations. Such access constraining operations may include one or more of 'On-The-Fly (OTF) recryption' (also referred to here as 'Smart-Locking™'), bidirectional Bubble-protection, unidirectional Bubble-protection, and volume encryption. Such access constraining operations are expected to work ubiquitously on not only, the locally-resident files (those such as 161 that are native to, or at-home in, the local disk subsystem 150) but also on access-constrained files that generally reside external computers such remote file servers 50' or 50", and also on access-constrained files that generally reside in easily-removable media such as 106.

Interceptable CALL's to the program-LAUNCH and program-TERMINATE services (not shown) of the local operating system may also be intercepted and acted upon to provide specialized handling for certain kinds of application programs.

If volume-encryption is active in a particular or general case, the interceptable CALL's to the primitive read/write services of the operating system may further be transparently intercepted and acted upon in accordance with the disclosure to provide small plaintext samplings 175 in volatile memory in place of the on-disk phantom plaintext 161d. Triple arrow-headed symbol 174 respectively represents: (1) the apparent decryption of file data section 161b to phantom plaintext area 161d during the intercepted CALL to the file-OPEN service, (2a) the actual decryption of samplings of file data section 161b to real plaintext area 175 during the CALLs to read primitives of the OS, (2b) the actual encryption of samplings of real plaintext area 175 to file data section 161b during the CALLs to write primitives of the OS, and (3) the respective re-encryption of the phantom plaintext 161d back to area 161b during the intercepted CALL to the file-CLOSE service. Details respecting special handling for the program-LAUNCH and program-TERMINATE services may be found in the above-cited, U.S. Pat. No. 5,699,428 (SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL-TIME) and these need not be repeated here. Details respecting the provision of Bubble-protection and volume encryption may be found in the above-cited, U.S. patent application Ser. No. 09/047,316.

The disclosure herein is primarily directed to additional steps taken to process FILE_OPEN calls (171) and FILE_ CLOSE calls (173) that target external files which are remotely-resident and/or resident (at-home) on easily-removable media so that appropriate permission rules (155–157, 167, 158) are followed and confidential information (e.g., 161d) is not compromised. More specifically, when a FILE_OPEN call such as 171 is directed to a remotely-resident, and access constrained file (e.g., in 50'); or to an access constrained file that resides in easily-removable media (e.g., 106), it is important to try and prevent unauthorized entities from gaining intelligible access to, or tampering with sensitive information as the respective data moves between external and internal storage. One such movement can be that of confidential data moving along communications link 30' between the local client computer 100 and a remote server such as 50'. Another such movement can be that of confidential data moving through data conveyance means 131 between a more-secure, internal memory of the local client computer 100 and a less-secure, easily-removable and transportable media such as 106.

In a parallel and/or overlapping vein, when a FILE_ OPEN call such as 171 is directed to a remote file (in 50') and/or to a file in easily-removable media that holds Bubble-protected data, it is important to try and prevent unauthorized (rogue) programs from gaining access to such Bubble-protected data as the respective data moves between external and internal storage.

To realize some or all of these goals, and in accordance with the disclosure, a temporary internal copy is made (a Transparently and Temporarily Localized copy is made) in each user's local machine of the external file, and of its surrounding folder (e.g., 52 or 54 of FIG. 1B). The corresponding permission rules are also Transparently and Temporarily Localized in one way or another. In one embodiment, each access constrained folder has a corresponding Folder-Use record that identifies the permission rules which apply to that folder. The Folder-Use record of each TTL'ed folder is also Transparently and Temporarily Localized.

The original external file is referred to herein as a 'native' or 'resident' file. 'Native' indicates that the user thinks the file which the user is working on, continues to reside on a relatively permanent basis only in the external storage (in the remote server 50' and/or the easily-removable media 106). The 'temporarily-localized' copy is sometimes referred to herein also as the 'temporarily-imported' or 'temporarily-immigrated' version.

FIG. 1C schematically shows an example of the Transparent and Temporary Localizing process. Original version 74 of an always-encrypted and Bubble-protected *FILE_A* resides in folder 72 of on an external first media 70. (The bracketing of the file name inside double asterisks {*name*} indicates its information is hidden by encryption.) The first media 70 may be an easily-removable media such as 106 of FIG. 1E and/or one inside a remote file server such as 50 of FIG. 1B. The original and external version 74 of *FILE_A* is logically held within OTF/Bubble-folder 72. A Folder-Use record 76 corresponding to OTF/Bubble-folder 72 is held on external media 70 within a folders-tracking section 75. Connection 77 represents the logical link between record 76 and folder 72. This connection 77 designates all files within folder 72 as being OTF-covered and Bubble-protected. Governing permission rules for the respective OTF-recryption and Bubble-protection algorithms may be contained directly within record 76, or more preferably, record 76 may contain pointers to such governing permission rules (not shown). The latter approach allows same subsets of permission rules to be commonly used by many folders even if the folders do not all have the same totalities of permissions. (Also a same folder-use record 76 may be commonly used by many folders if desired.)

When an authorized user or an automated agent of that user identifies an external file such as 74 as the file which the user wishes to process inside local machine 81, a test is conducted to determine if the immediate holding folder 72 of that file is an access constrained (AC) one. In one embodiment, the test queries the external folders-tracking section 75 to see if it contains a folder-use record 76 that is logically linked (77) to the immediate holding folder 72. If there is no such folder-use record, it is concluded that the desired external file is not access constrained, and conventional file access operations are carried out thereafter. If on the other hand, such a corresponding folder-use record 76 is found, it is concluded that the desired external file 74 is access constrained, and a Transparent and Temporary Localizing (TTL) operation 90 is carried out in accordance with the disclosure.

Within the authorized user's local machine (e.g., 10 or 20 of FIG. 1B), a second media 80 is provided as a difficult-to-remove media inside of the relatively more-secure housing (e.g., 11 or 21 of FIG. 1B) of that local machine 81. In a first step of the TTL process, an internal holding folder 82 is created in second media 80 having a folder name that is the same as that of external holding folder 72. In a second step of the TTL process, an internal Folder-Use record 86 is created within a TTL'ed folders-tracking section 85 of the locally-secure media 80. Folder-Use record 86 is logically linked (87) to folder 82 so that items 82 and 86 are generally and respectively, logical duplicates of external folder 72 and external folder-use record 76. In one possible substep for this operation, transmission mechanism 90 is used to COPY external folder-use record 76 from first media 70 into second media 80 to thereby create internal folder-use record 86 inside section 85. The external folder-use record 76 is preferably covered by a digital signature. During the COPY substep, the digital signature is checked to make sure that the external folder-use record 76 has not been tampered with either while it resides on external media 70 or while it is in-transit through transmission mechanism 90. Some modifications to the COPIED folder-use record 86 may be made after the digital signature is successfully checked.

In a second step, external version 74 of *FILE_A* is COPIED over transmission mechanism 90 into internal folder 82 to thereby produce a 'temporarily-localized', internal version 84 of *FILE_A*. In a third step, internal software of the local machine (81) is fooled into using the internal version 84 of *FILE_A* instead of the external version 74 of *FILE_A* even though the internal software thinks at a relatively high level that it is accessing the external version 74. This fooling or intercepting mechanism is represented by connection 88. In one embodiment, this is done by switching the 'Handle' that the OPEN_FILE service of the OS returns such that the returned 'Handle' points to the temporarily-localized and internal version 84 instead of to the original, external version 74. In a fourth step, internal software of the local machine (81) uses internal OTF and/or Bubble-protection processes to process the internal version 84 of *FILE_A* instead of the external version 74. The internal OTF processing will generally include decrypting and temporarily exposing as plaintext, a needed portion of internal version 84 of FILE_A. This use of internal OTF and/or Bubble-protection processes is represented by box 89.

In a fifth step, internal software of the local machine (81) is fooled into believing it is closing external version 74 of *FILE_A* when that internal software issues a CLOSE_FILE request to its local OS. Instead, if internal version 84 has been modified, the modified internal version 84 of FILE_A is re-encrypted and there after copied over transmission mechanism 90 into external folder 72 to thereby create a new version of file 74 on media 70. Thereafter, each of the first and second files, 74 and 84 are CLOSED. Internal version 84 is DELETED. If the internal version 84 of the file has not been modified, then the COPY step is omitted. If other, internal and concurrent processes of local machine 81 think they are also concurrently using external file 74, the closing of the temporarily-localized version 84 is delayed until such other processes of local machine 81 think they are finished working on external file 74.

FIG. 1D shows a data structure of a Folder-Use record 60 in accordance with the disclosure that may be used for tracking folders whose files are access constrained (e.g., covered by one or both of OTF-recryption protection and Bubble protection). Header 61 of the Folder-Use record includes at least a first identifier 61*a* that identifies an immediate holding folder in the local machine which this, also-local Folder-Use record 60 is tagging as being an access constrained folder. At this point in the discussion, the term 'local' should be understood as either referring to what is inside system 100 or alternatively referring to all that is inside one of servers 50' and 50" (FIG. 1E). After all, from the internal perspective of one of machines 50' and 50", data held within their internal storage is 'local' to them and system 100 is the 'external' storage.

If the perspective is such that the illustrated Folder-Use record 60 corresponds to record 76 of FIG. 1C, then first identifier 61*a* corresponds to logical link 77. If the perspective is such that the illustrated Folder-Use record 60 instead corresponds to record 86 of FIG. 1C, then first identifier 61*a* corresponds to logical link 87.

Header 61 should further include an indicator such as at 61*b* for indicating whether all files of the immediately tagged folder are relatively-permanent residents (native) of the 'local' machine or not. If this Folder-Use record 60 corresponds to record 76 of FIG. 1C, then indicator 61*b* should indicate that the corresponding folder 72 is a 'native' of storage means 70. If instead, this Folder-Use record 60 corresponds to TTL'ed record 86 of FIG. 1C, then indicator 61*b* should indicate that the corresponding folder 82 is a 'temporarily-localized' folder rather than a 'native' folder. Files that are native to local machine 81 should be kept in another folder that has its own Folder-Use record with its indicator 61*b* appropriately checked to indicate NATIVE?-YES. It is now seen that although the above algorithm implied that Folder-Use record 86 is essentially a copy of Folder-Use record 76, at least with respect to the NATIVE?-YES/NO indicator 61*b* that will not be true. Folder-Use record 76 will be marked NATIVE?-YES. Folder-Use record 86 will be marked NATIVE?-NO.

Header 61 can further include an indicator such as at 61*c* for indicating; for the case where the immediately tracked folder holds non-native (temporarily-localized) files, whether the connection 90 to that external media 70 and the given external media 70 are still operationally available and thus are seen as being 'On-Line'. Obviously if the tracked folder holds TTL'ed files, it should be identified as being NATIVE?-NO. However that is not the end of the story. It should be recalled that local processes (89 in FIG. 1C) are being fooled into thinking they are working with the external file 74 (FIG. 1C) when in fact they are working with the temporarily-localized and internal version 84. Suppose access breaks down to one or both of connection 90 and external media 70 for whatever reason. If the illusion is to be faithfully maintained for the local processes (89), then when access breaks down to one or both of connection 90 and external media 70, the local processes (89) should be fooled into thinking that internal version 84 is no longer available even though it in fact is. Indicator 61*c* may be used for providing such an illusion-maintaining function.

In an alternate embodiment, all Folder-Use records (60) for a given connection 90 and external media 70 are stored in a respective one file or linked list (not shown) that is dedicated to that one media plus connection, and an equivalent for indicator 61*c* is placed in a header of the dedicated file/list such that it may apply to all records of that one dedicated file or linked list. When access breaks down to one or both of connection 90 and external media 70, the equivalent of indicator 61c is flipped to a state indicating the breakdown. This state is thereby inherited by all Folder-Use records of the one dedicated file or linked list (not shown).

A further identifier field 61d of header 61 is preferably included. In the case where the files of the immediately tracked folder are temporarily-localized (indicator 61b is marked NATIVE?-NO; or in other words 60 corresponds to 86), then the further identifier field 61d of header 61 may be filled with identification information for identifying the native source folder (e.g., 72) from which the non-native files (e.g., 84) of the immediately tracked folder (e.g., 82) were obtained. In one embodiment, each of identification fields 61a and 61d is filled with the full pathname of its subject folder, where the full pathname includes a machine_name and/or a volume_name. When Folder-Use record 86 (FIG. 1C) is created by copying from Folder-Use record 76, the information of field 61a may be simply copied into field 61d before 61a is updated. Alternatively, an in-Record flag (not shown) may swap the target and source identifying functions of fields 61a and 61d.

In the embodiment where all Folder-Use records (60) for a given connection 90 and external media 70 are stored in a respective one dedicated file or linked list (not shown), the machine_name and/or a volume_name of each of the source folders can be held in a header portion of the respective one dedicated file or linked list and inherited by each respective Folder-Use record (60) of that file/list. Each unique arrangement of connection 90 and external media 70 gets its own dedicated file or linked list of respective Folder-Use records (60).

Referring to field 61e, consider now the case where Folder-Use record 60 corresponds to tag 52a or 54b of FIG. 1B. The tracked folder (52 or 54 respectively) is an access constrained one that is native to machine 50. So field 61b (NATIVE?) will be checked as YES. That does not tell us however whether or not counterpart mirror versions of tag 52a/54a and tracked folder 52/54 are currently present in one or both of client machines 10 and 20. The latter piece of information may be useful in determining what is to be done in a variety of state-stressing situations. Let us suppose the administrator of server 50 wants to delete or modify one or more files within one or more of access constrained folders 52 and 54. That would be fine as long as those files are not currently being mirrored (by a TTL operation) in one or more of clients 10, 20, etc. But how can the server's administrator quickly determine if that is the case? One answer in accordance with the disclosure is to have each client 10, 20, etc. increment an initially zeroed counter in the mirrors-tracking field 61e each time that client Transparently and Temporarily Localizes a given file belonging to the folder tracked by Folder-Use record 60. Each client 10, 20, etc. further decrements the counter in the mirrors-tracking field 61e each time that client CLOSEs a TTL'ed file that is native to the folder being tracked by Folder-Use record 60. If the field 61e counter is zero, the server's administrator can quickly determine that no native files of that tracked-folder are partaking in a TTL'ed operation at the moment. If the field 61e counter is a relatively small number (e.g., 5 or less), the server's administrator may elect to check back in a short while to see if the count has gone to zero. If the field 61e counter is a relatively large number (e.g., 10 or more), the server's administrator may elect to broadcast a message to all clients (10, 20, etc.) asking them to stop using the TTL'ed files associated with the to-be-modified, native folder. Clients can check their field 61d to see if they fit the mold.

In general, Folder-Use records such as 60 may be used for many combinations of access constraining operations. They may apply to: OTF-covered files, Bubble-protected files or files that are both OTF-covered and Bubble-protected. Field 62 accordingly includes flags for indicating which of the many possible combinations is present. If the immediately tracked folder does not contain files that fit any of the access constrained designations, then generally speaking, there is no need for having the Folder-Use record 60 in the first place. It is possible however for there to be an empty folder that will eventually contain one or more files that qualify as being access constrained. In such a case, a correspondingly uncommitted, Folder-Use record 60 may be prepared ahead of time wherein none of the flags in field 62 are initially checked, but will be in the near term future. Field 62 may be used by the internal access-constraining processes 89 of the local machine 81 (FIG. 1C) to determine which one or more of access-constraining algorithms 154 such as OTF-recryption, bi-directional Bubble-protection, uni-directional Bubble-protection, volume encryption and so forth is to be applied to the temporarily-localized versions (e.g., 84) of the files held in the correspondingly tracked folder (e.g., 82).

Section 63 of the Folder-Use record 60 optionally contains OTF-control information. An example of such OTF-control information is shown at 66 to be constituted by an 'excluded files list' which points to a list or is such a list that identifies specific files within the immediately tagged folder (e.g., 82) that are not to undergo OTF-recryption. Another example of such OTF-control information is shown at 67 to be constituted by an 'excluded programs list' which points to a list or is such a list that identifies specific programs, whose used files are not to undergo OTF-recryption. (For example a tape backup program should not be requesting OTF-recryption operations.) Other variations of such OTF-control information are represented by subsection 68. Reference should be made to the above-cited, U.S. Pat. No. 5,699,428 to determine what other controls may be applied for selectively turning OTF-recryption operations on or off at specified times, specified geographic places, and/or for specific classes of files, programs and so forth.

Section 65 of the Folder-Use record 60 optionally contains Bubble-control information. An example of such Bubble-control information is shown at 96 to be constituted by 'files approval specifications'. These could identify specific or generic classes of files within the immediately tagged folder (e.g., 82) that are to have access thereto limited by Bubble-protection. Another example of such Bubble-control information is shown at 97 to be constituted by 'programs approval specifications'. These would identify specific or generic classes of programs which may target files within the immediately tagged folder (e.g., 82) and would specify how such program-initiated, access attempts are to be controlled by Bubble-protection. Other variations of such Bubble-control information are represented by subsection 98. Reference should be made to the above-cited, U.S. application Ser. No. 09/047,316 to determine what other controls may be applied for selectively controlling Bubble-protection operations according to temporal, geographic or other userID-independent criteria.

In addition to OTF-recryption control and bi-directional Bubble-protection control, files within the immediately tagged folder (e.g., 82) may be subject to further and or alternative kinds of non-user-ID, access constraining operations such as unidirectional Bubble-protection, volume encryption, and the like. These are generically represented by optional field 93. This field 93 can include subfields similar to those shown for field 63.

In addition to the non-user-ID, access constraining operations of fields 63, 65 and 93, files within the immediately tagged folder (e.g., 82) may be subject to further restrictions as to which subset of authorized users is to be given what kind of access permissions (e.g., read-only, read-write, label-modifying) for respective files. Such user access-ID based permissions controls are represented by section 69 of the illustrated example of a Folder-Use record 60. Reference should be made to the above-cited, U.S. Pat. No. 5,953,419 (CRYPTOGRAPHIC FILE LABELING SYSTEM FOR SUPPORTING SECURED ACCESS BY MULTIPLE USERS) to determine what specific controls may be specified for selectively controlling label-based, user access permissions.

Section 99 of the Folder-Use record 60 preferably contains a digital signature covering at least those parts of the native version (76) of the record that an administrator would not want to have tampered with during transmission over unsecured channels or storage on unsecured media. An example of what digital signature 99 might cover could be fields 61a, 61b, 62 and 63. As already explained, the digital signature 99 may be used to verify that the native version (76) of the Folder-Use record had not been tampered with either at the remote site 70 before a TTL operation or while in-transit (90) during a TTL operation. If desired, a new digital signature may be calculated and entered into region 99 of the localized version (86) of the Folder-Use record each time its localized information is updated. However such an operation is generally resource-wasting and not advantageous because the localized version (86) is already inside a relatively secure housing 81.

FIGS. 2A–2C provide a first flow chart depicting a machine-implemented, 'On-Open' intercept routine 200 in accordance with the disclosure. The On-Open intercept routine 200 may be carried out upon intercept of an Open-file request such as made for example at step 171 in FIG. 1E (or at step 15a in FIG. 1B) from an application program to the local operating system kernel 134/(14) of the local client computer 100/(10). The access-constraining algorithms 154 of disk subsystem 150 may be loaded into system memory 140 for causing the CPU 120 to carry out operations implementing the functions of the On-Open intercept routine 200. In one Win32 embodiment, part or all of the code for implementing the On-Open intercept routine 200 is loaded into the illustrated VxD section of FIG. 1E for execution as a virtual device driver.

Although the discussion for FIGS. 2A–2C considers the OPEN-file request as being directed to a nonvolatile memory subsystem such as a disk subsystem of a remote server (50), the broader concept may be seen as that of an initial access request being made for data from any kind of data-providing means (e.g., a remote database engine) that has individually identifiable data sets (e.g., database records) to which intelligible or other kinds of access is to be limited on the basis of one or more of the following: (1) whether the requesting program and/or requested data are pre-identified participants for OTF recryption given the time of request and the geographic locations of the request-making and/or request-receiving entities; (2) whether the requested data is to be made tamper-resistant by way of digital signature technology; and/or (3) whether and what kind of access-rights are provided for the logged-on user under whose activities, a data-requesting program is trying to access the requested data.

The On-Open intercept routine 200 is entered at step 201 upon interception of the Open-file request (or a like data-access request) sent to the local OS kernel either from the direct activity or a subactivity of an executing program (e.g., a word processing program) or of another component of the OS. In the case where the local OS kernel is a Win32 or like portable-executable (PE) module having dynamically link-loaded sections, the subclassing method disclosed in the above-cited U.S. Pat. No. 5,812,848 issued Sep. 22, 1998 may be used for carrying out the intercept. If the operating system kernel is of the more traditional, single-threaded type such as employed in MS-DOS™, then conventional thunking may be employed.

At step 202, a first test should be conducted to see if the targeted media or other source of the to-be-OPENed file is operative and connectively available. The media may not be available for any number of reasons including: (a) the media is a removable one and has been removed; (b) the file is in a server that is currently 'down' (inoperable); and (c) the file is in a remote server whose communications link 30 is currently 'down' (not working). If the to-be-OPENed file is unavailable for any such reasons, control passes to step 203. In step 203, all remote folder-use records (e.g., 166 of FIG. 1E, 60 of FIG. 1D) corresponding to the unavailable media or server or link should be found and updated to reflect the new media and/or link status as being unavailable. For example, in FIG. 1D, indicator 61c or its equivalent may be updated to indicate that the external media (70) and/or connection thereto (90) is currently not available. Box 61b will be flagged as NATIVE?-NO while box 61c will be flagged as ON/LINE?-NO. This state will warn all processes that later try to access remote files of the unavailable media/server/link (which files have been 'temporarily-localized') that the remote media may no longer be available. They may elect to check the actual status, and if true, refuse access to the 'localized' version of the corresponding file. Thus the illusion that the files are still 'external' rather than 'temporarily-localized' will be maintained. Next, at step 298, an exit is made out of the OPEN-file operation with a return message indicating that the media/server/link is unavailable and that the OPEN-file request cannot be serviced for this reason.

If the determination at test step 202 is instead that the media/-server/link of the remote file is available, control passes to step 204 by way of path 202y. In step 204, the machine-wide status of access-constraining algorithms (154) such as OTF-recryption, Bubble-protection, Volume Encryption, etc., is tested to see if any is currently active for machine wide operations. An example of a time period when all such access constraining operations may be intentionally deactivated on a machine-wide basis is during system boot-up. Temporary deactivation of such access-constraining algorithms 154 on a machine-wide basis may help to increase system speed and avoid complications due to their interactions with other, not yet initialized parts of the machine. If all the relevant access constraining operations (e.g., OTF-recryption and Bubble-protection) are deactivated, control responsively passes along path 204n to intercept-exit step 299. The intercept routine 200 is quickly exited by way of exit step 299 and control is passed back to the normal File-open service routine of the local OS kernel. This lets the latter kernel service complete a normal File-open procedure without further modification or delay.

In one Win32 embodiment, the On-Open intercept routine 200 is defined as a virtual device driver (VxD) that automatically loads when the system boots. When this VxD 200 loads (and other VxD's for which OTF recryption and/or other access constraining operations are undesirable also load), activating flags for the OTF recryption and/or other access constraining operations (154) are temporarily reset to 'inactive' so as to limit the amount of time spent loading these objects during system boot-up. The remainder portions of the executable code for the access-constraining algorithms 154 load later in the process after the virtual device drivers load. Initialization routines in the later-loaded code portions for the respective access-constraining algorithms 154 respectively initializes the OTF and/or other machine-wide status flags so as to thereby set those flags to the 'active' state. If for some reason, the remainder of one or more of the access-constraining algorithm executing codes (154) fail to load or execute their respective initialization routines, the respective, machine-wide status flags will remain in the default 'inactive' state and their respective constraint-initializing VxD's will be stopped by default from trying to interact with the not-loaded or faulty remainders of the OTF instruction and/or other access-constraining algorithms code 154.

If any access-constraining algorithm (154, e.g., OTF-recryption or Bubble-protection) is active on a machine-wide basis, control passes along path 204y to step 205. At this stage (we are not necessarily in a boot-up phase here), it is possible that before this intercept 201 started, another local process has already been intercepted and thereby or otherwise created a temporarily-localized version (e.g., 84 of FIG. 1C) of a file (any file) in the to-be-OPENed, external folder (e.g., 72 of FIG. 1C). If that is the case, the local computer should also already have a localized copy of the folder tracking/managing information (e.g., 52a of FIG. 1B, or 86 of FIG. 1C) that is needed for the currently to-be-OPENed file. Test step 205 determines whether the local computer already has a localized copy of the TTL'ed folder-tracking/managing information (e.g., a use-record 60) for the folder of the requested file. In an alternate embodiment, the use tracking/managing information may be on a file-by-file basis or on a database record-by-record basis. The square brackets around the words "folder of" in box 205 indicate that it is within the contemplation of the disclosure to use higher resolution tracking or lower resolution tracking beyond merely tracking permission rules for the immediate holding folder of the sought information file.

Even is it is true that the Folder-Use record 60 (or its equivalent) has already been localized, that does not inherently tell us if a localized copy of the requested, remote file is also already inside the local computer because the localized (non-native) version of the Folder-Use record 60 (or its equivalent) may have been fetched for supporting a different file of the same holding folder (72). This possibility will be dealt with later at step 230. If the desired Folder-Use record 60 (or its equivalent) has already been localized, control passes to step 212.

If however, test step 205 determines that the local computer does not yet have a localized copy (e.g., 86) of the external tracking/managing information (e.g., 76) for the desired, external, and access constrained folder, control passes to step 206. Step 206 may be carried out in at least two different ways depending on whether the intelligent file-request handler 51 (FIG. 1B) is present in the remote server 50 or whether the local file-request handler 29 is to be used exclusively. In both cases, an attempt is made to fetch the external, access constraint tracking/managing information (e.g., 52a, 76) corresponding to the to-be-OPENed, external file. If no such use-tracking/-managing information is available, control passes along path 206n to step 207.

In one embodiment, if path 206n is followed, the to-be-OPENed file is assumed to be a non-constrained file such as would be stored in unconstrained folder 53 of FIG. 1B essentially because a remote version of access constraint tracking/managing information (e.g., 76) has not been found corresponding to the to-be-OPENed, external file. In this possible embodiment, the answer to the query made at next step 207, "Is tracking information necessary?" will inherently be NO and path 207n will be followed back to intercept-exit 299.

In an alternate second embodiment, the answer to the query made at step 207, "Is tracking information necessary?" may be, "Yes if Bubble-protection is active on a machine-wide, otherwise No." Then, if Bubble-protection is determined to be inactive in step 207, control passes along path 207n to step 299 and the intercept 200 is quickly exited while the normal file OPEN process is allowed to continue.

On the other hand, if Bubble-protection is determined to be active in step 207, control passes along path 207y to step 215. It is assumed that there is a security breach of the Bubble-protection scheme because the remote tracking information is missing and appropriate steps such as 215 and 219 are taken, and also optionally step 218 as will be explained below.

In an alternate third embodiment, the answer to the query made at step 207, "Is tracking information necessary?" may be made to be programmably variable based on time of day and/or other variables such whether any one or more specific ones of access-constraining algorithms 154 is active. The responses to respective yes and no answers for each such condition may also be programmably mapped to include actions such as simply doing an intercept-exit 299 and/or issuing alert messages (step 218) and/or refusing the file-OPEN request (215) and/or taking other measures as deemed appropriate.

Within step 206, the local intercept routine 200 optionally determines with respect to the targeted, remote server 50 if an intelligent file-request handler such as 51 is present. If handler 51 is present, the job of trying to fetch the access constraints tracking/managing information (e.g., 52a) corresponding to the to-be-OPENed file is handed off to the remote handler 51. A request of predefined protocol is sent from local protocol handler 19 along path 31 and to handler 51 where the latter unit 51 takes over the remote-side of the job from there. Handler 51 will query the permission rules identifier/provider 55 and download the corresponding use-tracking/managing information (52a) to the local, On-Open intercept routine 200. With the intelligent file-request handler 51 present at the remote server, the local process 200 does not need to know where specifically inside machine 50, the permission-rules identifier/provider 55 is located and it does not need to know the data structure of the identifier/provider 55. Intelligent handler 51 may take care of such details. And in such a case, identifier/provider 55 does not need to be located in a universally-known location such as the root directory of remote file server 50. It can be hidden elsewhere. That may provide an additional level of security. Also, the query process can work much faster because it can be executed within the confines of remote file server 50 rather than relying on transmissions over a communications link such as 30.

On the other hand, if intelligent handler 51 is not present in the remote file source (950), the job of trying to locate and fetch or identify the applicable permission-rules (52a) is given to the local file-request handler 29 such as shown for client 20 of FIG. 1B. In such a case, identifier/provider 55 should be located in a universally-known location such as the root directory of remote file server 50. If it is not, local handler 29 may waste considerable time performing a search through the storage space of the remote machine/media 50/950 as handler 29 tries to find the location of the identifier/provider 55. With the location of identifier/provider 55 being either universally-known or otherwise found, the local file-request handler 29 carries out two-way communications over the communications link 30' for locating the corresponding use-tracking/-managing information (e.g., 52a, 60) of the to-be-OPENed file or determining that such information does not exist (as in the case of folder 53 for example).

If found, the use-tracking/managing information (52a, 60) of the to-be-OPENed file is downloaded over the server/client communications link (30, 90). The data of the downloaded tracking/managing information can be in plaintext form. However, it should be digitally signed (e.g., field 99 of FIG. 1D). In step 206, the On-Open intercept routine 200 authenticates the downloaded information by performing a signature check. If the digital signature does not conform with the downloaded information (52a, 60), it is assumed that there has been an attempt to tamper with the tracking/managing information (52a) either before or during download. In such a case, control passes along path 206$x$ to step 215 (to connection A2 and box 215) for appropriate handling.

If the downloaded information (52a) is authenticated by the digital signature check, then the authenticated plaintext of the downloaded information can now be stored into the local use-tracking/managing information area (166 in FIG. 1E, 85 in FIG. 1C) of the local machine. If, in one embodiment, the remote version (e.g., 52a) of the use-tracking/managing information is encrypted before it is sent over link 30' (or all the time while it is external), step 206 also performs the decryption locally prior to storing the corresponding plaintext in the local use-tracking/managing information area (e.g., 166). Control next passes along path 206$y$ to either step 212 or optional bypass 213.

Step 212 is an optional, bubble-protection step which may be bypassed by instead following dashed path 213. If bubble-protection step 212 is employed, the executing program or OS component which caused the On-Open intercept routine 200 to execute is tested for bubble-based approval or denial by a program approving/denying algorithm 154 (FIG. 1E). One such algorithm is disclosed in the above-cited U.S. application Ser. No. 09/047,316 filed Mar. 24, 1998. In addition to, or as an alternative to, bi-directional Bubble-protection, the protection may be unidirectional for Read-Only OPEN's or Write(Append)-Only OPEN's as opposed to bi-directional Read/Write OPEN's.

If bubble-protection step 212 results in a denial, control passes to step 215. A failed request semaphore is passed back to the program/component whose OPEN-file request was intercepted at step 201. A leveled security alert may be optionally posted in step 218 either locally at the computer monitor and/or over the network 30 to a system administrator. The posted alert may be automatically responded to in a variety of ways by system resources, as may be appropriate for a given situation and the level of alert that is posted. Alternatively, alert posting step 218 may be instead bypassed as indicated by the dashed, alternative path 217. An exit is made at step 219 from the failed OPEN-file request. Such a denial by the bubble-protection step 212 is useful for preventing an unauthorized application program or a downloaded applet or another unauthorized object from accessing the data of the file for which it caused the OPEN-file request to issue. This may occur irrespective of whether or not OTF recryption and/or other forms of access constraint are being used to limit intelligent access to the file data.

An approval by the bubble-protection step 212, or a bypass of such bubble-protection by using alternative path 213, next passes control along path 212$y$ to continuation point B1 of FIG. 2B. Control next flows through at least one, if not all, of subsequent OTF test steps 220, 222, 224, and 226.

One or more, but not all, of respective test steps 220, 222, 224, and 226 may be optionally bypassed by respective bypass paths 221, 223, 225, and 227, which are shown as dashed lines. The respective bypass paths 221, 223, 225, and 227 may be permanently or contingently established according to the desires of the system administrator. The sequential order of respective test steps 220, 222, 224, and 226 and may be optionally rearranged to improve performance speed if it is known that one type of check eliminates more possibilities more quickly than another. The faster, more far reaching check step would then be moved to an earlier portion of the sequential string of check steps 220, 222, 224, and 226.

At test step 220, if it is not bypassed by 221, a check is made of whether the name of the to-be-opened, file (irrespective of whether it is native or a Transparently and Temporarily Localized one) is pre-identified in a local list (such as 155 or 156 or an equivalent in area 158 of the local client computer 100) as being contained in a directory (folder) whose files are to be intentionally excluded from OTF processing. If the answer to the exclusion-from-OTF check step 220 is Yes, then control passes to step 228 wherein an after-TTL flag (ATTL) is set to switch to A1 as a next-step after 229 or 232 completes.

In step 229, it is determined whether the requested file is an external (e.g., remote) file that is access constrained. If the answer is NO, then no TTL operation has to be performed and the ATTL switch passes control onto A1 of FIG. 2A. From there, the On-Open intercept routine 200 is exited by way of step 299 and the normal file open process is allowed to continue.

If the answer to test step 228 is instead YES, then control passes to step 230 wherein it is determined whether the requested, external file is already localized in a physically secured storage area (e.g., 159) of the local machine.

If the answer to test step 230 is NO, then in next step 231a, the external and access constrained (AC) file is copied into a local TTL folder such as in region 159 of machine 100. Note that if the external AC file (e.g., 74) is encrypted, it is that encrypted version that moves through the copying path 90 for more secured storage inside a physically-secured part (82) of the local machine (81).

In step 231b, if the localized file came from a server or a storage drive that keeps track of which of its files is 'in use', then that server and/or storage drive is optionally sent a message to set its tracking mechanism to indicate that its copy of the file is 'in use'. This should block other clients from getting access with write permission for the same file. In optional next step 231c, the time of localization is recorded into a local, file-use record of the local machine. See correspondingly optional field 345 of FIG. 3B. This information may be used by garbage collecting mechanisms of the local machine. For example, if the file-opening program crashes and thereby fails to issue a counterpart, file-CLOSE command for the temporarily localized file copy, it is possible that old, localized versions of a file may accumulate in the TL folders (159). The garbage collecting mechanisms of the local machine may check the recorded time of localization, and if the duration of localization exceeds a specified maximum (e.g., 12 hours), the garbage collecting mechanisms may elect to delete the overstaying, guest file under the assumption that the file-opening program failed to properly issue a counterpart, file-CLOSE command. Of course, special override flags may be established for this where deemed appropriate.@

In next step 232, the 'handle' that the OS kernel service will return when (and if) the OPEN-file request is serviced, is manipulated so as to point to the localized version (84) of the requested file rather than to the external (e.g., remote 74) version of the requested file. A files-tracking list may be optionally updated at this point to indicate how many instances of the TTL'ed file (84) have been 'opened' without being subsequently and counterpart-wise closed. Note that if the original file-OPEN request was directed to an external server, that original file-OPEN request will now not get to the intended target. That is why step 231b should be inserted to cause the external server to set its file status to 'in use'.

If the answer to test step 230 had instead been YES, then copying steps 231a–231c would have been bypassed while the handle-changing step 232 would still have been carried out. Next control passes through the ATTL-guiding switch either to exit point A1 of FIG. 2A or to continuing step C1 of FIG. 2C. Thus far we have only considered the case where the ATTL flag is set to A1 in step 228. The C1 path will be considered after the flow of explanation passes through step 239.

If the result of test 220 is No, control is passed to test step 222 or alternatively to its bypass path 223. In test step 220 and like exclusion or inclusion tests described herein, it is preferable but not necessary to use the following criteria when determining whether the requested file is to be intentionally excluded from or included in OTF processing: The determining test preferably uses the full pathname of the native file (which file could be a local permanent resident or a visiting external file) where that pathname may include one or more of: device_name\; volume_name\; volume-root-designation\; root-subdirectory\; etc.

The determination of whether a file is 'contained' in a directory (as is expressed for example in boxes 220 and 222) can take on at least one of several different meanings: (a) the native file is directly named in the identified directory; or (b) the native file is directly named in either a subdirectory of the identified directory or in the identified directory itself; or (c) the native file is directly named in a subdirectory of the identified directory but not in the identified directory itself. Embodiments in accordance with any of these meanings or similar variations are contemplated here.

Attest step 222, if it is not bypassed by way of optional path 223, the Included Directories List(s) of memory region 155 (FIG. 1E) and equivalents in region 158 are consulted to see if the requested, native file is 'contained' in a directory identified by the consulted, Included Directories List(s). The term 'contained', as used in the context of the included-directory check step 222, can have any of the alternative meanings given above for the excluded-directory check step 220 irrespective of which meaning is chosen for step 220.

Although either of test steps 220 and 222 may be employed by itself to quickly exclude a directory-contained class of files from on-the-fly (OTF) recryption based on the native pathnames of those files, it is not outside the contemplation of the disclosure to use both of steps 220 and 222 rather than bypassing one of them. For example, a native directory may be temporarily listed in an Excluded-directories list and may thus be temporarily blocked from having its 'contained' native files automatically recrypted even though the same native directory or a subdirectory thereof is permanently listed on an Included-directories list that is consulted at subsequent step 222. In the illustrated embodiment of FIG. 2B, a YES response to query 220 transfers control to the ATTL-switch setting step 228 and thereby bypasses step 222.

If the answer to the included-directory check step 222 is NO, control similarly passes to the ATTL-switch setting step 228 and thereby bypasses lower steps 224 and 226 of the illustrated embodiment. If the answer to test step 222 is instead YES, control passes either to test step 224 or its corresponding bypass path 225. At test step 224, if its bypass path 225 is not optionally taken, the Excluded Files List(s) of memory region 156 (FIG. 1B) or equivalents in the TTL'ed-rules region 158 are consulted to see if the requested, native file is identified in at least one excluded-files list. The excluded-files lists of regions 156 and 158 can include so-called Permanent Exclusion Lists for native Files (PELOF, otherwise known as the 'Never-Encrypt List') and/or one or more of the so-called Temporary Exclusion Lists of native Files (TELOF's). The file-identifications made in each TELOF can be cleared en masse or selectively in response to various and corresponding events within or outside of system 100. For example, one TELOF may be automatically cleared of all its identifications at periodic intervals, such as once every hour or once a day. Another TELOF may be automatically cleared each time a prespecified application program terminates. And so forth. These variations put a limit on how long a particular one or more files is intentionally excluded from OTF-recryption and its information is thus made unintelligible to the application program that is trying to open it. It is also within the contemplation of the disclosure to have periodically cleared, Temporary Inclusion Lists of native Files (TILOF's) that are similarly tested. Such a variations would contrastingly put a limit on how long a particular one or more files is intentionally included in OTF-recryption (even though its directory may be excluded) and the information of such an intentionally included file is thus made intelligibly available to the application program that is trying to open it during the specified time slot.

If the answer at the excluded-file check step 224 is YES, then control passes to the ATTL-switch setting step 228 and thereby bypasses lower step 226 of the illustrated embodiment. If the answer is instead NO, control passes to test step 226, or optionally to its bypass path 227.

At OTF test step 226, if it is not bypassed by path 227, the Excluded Programs List of memory region 157 (FIG. 1B) and/or an equivalent in the TTL'ed-rules region 158 are consulted to see if the requesting application from which the present Open-file request evolved is listed or otherwise identified in such an Excluded-from-OTF Programs List (this being different than Bubble-protection). If the answer at the excluded-program check step 226 is YES, control passes to the ATTL-switch setting step 228 and thereby bypasses the alternate switch setting step 239 of the illustrated embodiment. Because the ATTL flag is set to 'A1', after the TTL-processing steps 229–232, the intercept routine 200 will be exited by way of step 299 (A1). If the answer for step 226 is NO, or bypass path 227 had been elected, control passes to the alternate switch setting step 239 of the illustrated embodiment wherein the ATTL flag is set to 'C1'. If this is the case, then after the TTL-processing steps 229–232, the intercept routine 200 will continue on to entry point C1 of FIG. 2C and thereafter to step 233.

To briefly reiterate the above description of test step 229, it is determined here whether the requested, file; irrespective of whether it is OTF-covered or not, is an external or a native (locally resident) file. At step 230 it is determined whether the external file has already been 'localized' by a previous invocation of step 231*a*. At step 232, the response of the intercepted file OPEN operation is modified so that it will return a HANDLE pointing to the temporarily-localized file (84) instead of to the external native version (74).

One way that such a HANDLE-swap can be accomplished is by modifying the pathname parameter in the original, OPEN_AND_GET-_HANDLE(pathname) request to a full pathname that points to the temporarily-localized version (84, FIG. 1C). From this step forward (except for the optional update of file tracking data inside step 232) and until a counter-associated, CLOSE(Handle) command is encountered, the OTF-recryption software does not need to be directly aware of the external origin (remote and/or from easily-removable media) of the targeted file. The OTF-covered file can be treated as if it were a permanent resident of the local and physically-secured internal storage 150 of the local machine 100.

By way of a more concrete example, if the original pathname in the OPEN_AND_GET_HANDLE(pathname) request was "\\SERVER50_NAME\VOLUME1\DIR2\SUBDIR3\FILE_NAME4", the new, modified pathname in the OPEN_AND_GET_HANDLE(pathname) request might be: "C:\OTF_REMOTE_LISTS\SERVER50_NAME\VOLUME1\DIR2\-SUBDIR3\FILE_NAME4". In other words, the same basic navigation path through directories and subdirectories may be preserved, but the higher level definition of the actual storage location can be that for the local drive "C:" rather than for the remote "\SERVER50_NAME". This latter approach enables the use of permission rules that span through a hierarchy of directories and subdirectories to apply to the localized structure in a substantially same way as they apply in the remote storage device. (Note that the higher level directories do not need to store all the files of the external storage device. They merely need to maintain the same hierarchical relationship.)

In an alternate embodiment, a hash code is derived from the original, full pathname of the native file, and this derived hash code is used as the pathname of the temporarily-localized file. In other words, the new, modified pathname in the OPEN_AND_GET_HANDLE(pathname) request might be: "C:\OTF_REMOTE_LISTS\hash_number", where hash number is a respective hash code derived from the original pathname. This alternate embodiment assumes that permission rules can be transformed so as to identify the targeted file or folder by hash number rather than full name. For example, pathnames in the permission rules may be automatically parsed out and hashed in the same way that the original, full pathname of the native file was hashed. Then a match of hashed numbers may indicate satisfaction of an access-approving or access-denying permission rule.

Within step 232, the optional updating of the local tracking may be used to indicate how many OPEN's have been processed for a same, TTL'ed file and to possibly further indicate which of plural processes provided such OPEN requests. Obviously if step 232 is entered into from step 231, the answer is just one process. However, if step 232 is entered into from the YES path of test 230, the count may be incremented for keeping track of additional processes that have provided OPEN_AND_GET_HANDLE(pathname) requests for the same external file. Random-access types of file-write and file-read permissions should be granted only to the first process that requests an OPEN and therein asks for random-access writing and reading permissions. Later corners may get only file-read permissions or file-append or pre-pend permissions as appropriate. In general, if a first process gets write permission then all later coming process should be locked out from access until the writer finishes its modifications and closes its control over the file. The optional file-tracking updates of step 232 can keep track of such access controls.

Assuming step 239 set the ATTL flag to C1, at later test step 233 (FIG. 2C), it is determined if a decrypted version (real or phantom plaintext) 161*d* of the file data (which data was either originally local or has been localized) has already been created. In one embodiment of step 233, a File-Use records region (not specifically shown) of local memory 150 (FIG. 1B) is scanned to see if a decrypted version (real or phantom—OTF does not know) of the file has already been created. In that embodiment, if a decrypted version of the file has already been created, an OTF File-Use record should have been created for that file. (See below step 241.)

In the same or another embodiment, a File-Tags list within memory (see above-cited U.S. Pat. No. 5,699,428) is further or alternately scanned to see if an apparently decrypted version of the file has already been created and opened due to an earlier request of the now-requesting application program. In that embodiment, if a decrypted version of the file has already been created because another application program had earlier requested intelligible access to the file, a File-Tag record should have been created for linking that file with the earlier in time, other application. (See below step 242.)

In the embodiment that employs both File-Use records and File-Tag records, a File-Tag record should be created for linking the identity of each 'using' application program (User-application) with the identity of each exposed, plaintext data of a confidential file that is considered to be now 'in-use' by that specific User-application. If for some reason, it is found within step 233 that a File-Use record exists, but there is no File-Tag record yet created for linking the current application program that is requesting a file-OPEN (or more specifically, for linking the corresponding User-application record) with the File-Use record of the to-be-opened file, such a File-Tag record should now be created within step 233 (or alternatively, shortly after in step 237). Moreover, if it is further found within step 233 (for the embodiment that employs both File-Use records and File-Tag records) that a User-application record (164) has not yet been created for linking the identity of the currently 'requesting' application program with the earlier-formed (possibly phantom) plaintext 161*d* of the decrypted file; such a User-application record should now created in step 233 (or alternatively, shortly after in step 237) and linked to the corresponding File-Tag record.

If the answer to the query: Plaintext apparently-available? in step 233 is YES, control passes to test step 236 where it is determined if the current file-OPEN request was issued at the behest of an OTF recryption module. In one embodiment, each File-Use record has a state-tracking section that indicates if an OTF module is currently processing the to-be-opened file. If it is (if OTF_Called? is true or YES), then step 237 is bypassed and the On-Open intercept routine 200 is exited via step 299 (A1) as indicated. This blocks undesirable recursion when the OTF-recryption code itself tries to open a file.

If the response to OTF_Called? is false (No), then in following step 237 a File-use Count is incremented. The File-use Count may be stored in nonvolatile memory 150. In one embodiment, the File-use Count data is stored within the already created File-Use record. (See field 331 of FIG. 3A) If a corrective update of the File-tag records had not taken place in above step 233 (because the earlier creation of the apparently decrypted plaintext was at the behest of a different application program), then in one embodiment the addition of a new File-tag record for the current application program takes place in step 237.

If the answer at the plaintext-available? test in step 233 is NO, control passes to step 234 or to its optional bypass path 235. The positioning of the plaintext-available? test 233 and of response steps 234–237 in the process flow above next-described steps 234–238 presumes a single-user environment. For performance's sake, once that single user has demonstrated in a first instance that he or she has valid access rights (by way of an earlier, successful execution through ensuing steps 234 and/or 238), that user is deemed to continue to have access rights.

In an alternate, multi-user environment, steps 233–236–237 would be instead placed in the flow path at the position 'X–' between steps 238 and 240; and entry point C1 would feed directly into step 234 and its optional bypass 235. In such a latter case, each user's access rights would be tested with each attempt at a file-OPEN rather than just the first time any one user tries to access the file. In one embodiment, a multi-user file label such as disclosed in the above-cited U.S. Pat. No. 5,953,419 (CRYPTOGRAPHIC FILE LABELING SYSTEM FOR SUPPORTING SECURED ACCESS BY MULTIPLE USERS) may be used. Such a file label may further have a section for defining a default alert response if an attempt to access the file is made and subsequently rejected by an access constraining algorithm 154.

Within test step 234, if it is not optionally bypassed by path 235, a so-called 'security label' area 161a (FIG. 1E) of the requested file is read and tested. The 'security label', if utilized, is usually located at or near the beginning of each encrypted file. If the file's security label is found to be valid and in accordance with a prespecified format, control passes to step 238.

If the area in the requested file is one that is required to have a valid 'security label' but does not have such a properly placed and/or formatted security label, control passes to path 238n and from there to failed-OPEN point A2. Point A2 relays control back to step 215 of FIG. 2A. Step 215 then forces a return of a 'failed' File-open message to the calling application and exits the On-Open intercept routine 200 by way of optional step 218 and/or then step 219. In response, the operating system kernel 134 refuses to open the requested file and returns a 'failed file-open' message back to the requesting application program 170.

In an alternate embodiment (represented by dashed line 234a), rather than responding by flowing to step 215/A2 (Force a Failed Open) on a No response to the check, Valid_Security Label? in step 234, the On-Open intercept routine 200 is instead exited by way of step 299 (A1). This alternate embodiment (234a) assumes that a file without a valid security label is inherently a plaintext file and as a result, is not intended to participate in OTF recryption even though its holding folder may indicate otherwise.

In the specific embodiment where the security label 161a of each requested file is structured in accordance with the above-cited application of Shawn Lohstroh et al., (CRYPTOGRAPHIC FILE LABELING SYSTEM FOR SUPPORTING SECURED ACCESS BY MULTIPLE USERS) the multi-user security label has a first field that defines the type of decryption algorithm to be used for obtaining a plaintext version of the remainder of the file. By way of example, one of a plurality of algorithms such as: (1) the Data Encryption Standard (DES), (2) RSA RC4™, and (3) Blowfish may be specified by this first field.

The multi-user security label further includes a list that defines a valid user identification number for each authorized user. The OS or another interacting software module is expected to furnish a matching user identification number (User ID) with each file-OPEN request. If it does not, test 238 fails. In an alternate single-user embodiment, the user's identification number (User ID) is defined during system boot-up and/or initialization. The security software writes a username/password dialog box onto the system monitor (918) during initialization. After the user fills in the appropriate information, the security software looks up a corresponding User ID in a pre-recorded on-disk list and saves it. If there is none, the security software saves a null ID. Thereafter, the security software checks the saved User ID in test 238 against the list in the multi-user security label. If there is no match, test 238 fails.

For each user identification number defined within the multi-user security label, there is also a corresponding, encrypted key string recorded within the multi-user security label. A plaintext version of this encrypted key string defines the decryption key that is needed for decrypting the data portion 161b of the file below the multi-user security label. The corresponding plaintext is protected from tampering in by being covered by a respective digital signature 161c.

The encrypted key string within the multi-user security label may be formed by encrypting the plaintext of the needed, file-decryption key using the authorized user's public key pursuant to a so-called public-key/private-key encryption system. (RSA is an example of such a public-key/private-key encryption system.) Accordingly, the private key of the same authorized user must be obtained in order to decrypt the encrypted key string corresponding to that user's identification number (User ID). Once the encrypted key string is decrypted with the private-key, and the plaintext of the decryption key is obtained, the data portion 161b of the present file can be decrypted with the thus obtained plaintext version of the file-decryption key and the digital signature 161c can be thereafter checked (in step 255) against the real or phantom plaintext version 161d. If such a security labeling system is not used, then bypass path 235 may be instead taken.

At step 238 a check is made of the requesting user's right to access the requested file. Such a right's check can be carried out in multiple ways. If a file security labeling system is used, the user identification number of the current file requester (obtained from the OS) can be compared against a list of authorized users within the file's security label to see if there is a match. Also if the multi-user file label system such as disclosed in the above-cited U.S. Ser. No. 08/642,217 (CRYPTOGRAPHIC FILE LABELING SYSTEM FOR SUPPORTING SECURED ACCESS BY MULTIPLE USERS) is used, that inherently performs a user's rights test when the user is asked to supply his or her private key. Alternatively or additionally, other, user-identification-based security tests can be performed in step 238 as deemed appropriate to determine whether the requesting user alone or in combination with other factors such as time and the identification of the requesting application program has valid access rights.

If the result at the user access-rights verification step 238 is negative (No), then control is passed to point A2 and thereafter to step 215 where the intercept routine forces a 'failed file-open' to occur. If the result at the access-rights verification step 238 is instead positive (Yes), then control passes to a decrypting process such as that of steps 240–260 and a decrypted version 161d of the requested file data is made available to the authorized user. If volume-encryption is being used as an additional protection, the OTF software is not aware of the same because volume-encryption occurs at a more primitive level (e.g., sector reads and writes). The OTF software is fooled into believing there is a real plaintext version of the file data even though that data 161*d* may instead be phantom when volume-encryption is active.

In steps 240 through 260, a preferred file-renaming procedure is undertaken in order to avoid re-encryption of apparently decrypted plaintext 161*d* where not necessary. Alternative approaches to provide for the decryption of the file data can of course be used instead. At the start of step 240, in portion 241, a new File-Use record is preferably created and its File-Use Count is initialized to 1. (Execution of substep 241 is optional and may be bypassed if File-use records are not being employed. They are not necessary.)

Thereafter, at portion 242, if a File-Tag record had not been previously created for linking the identity of the calling application program with the identity of the requested file, such a File-Tag record is preferably now created and inserted in a File-Tags linked-list. (Like the case of substep 241, execution of substep 242 is optional and may be bypassed.) Thereafter, at portion 243, the original name (e.g., 'C:\TTL-ED-FOLDERS\-SERVER50_NAME\VOLUME1\DIR2\ SUBDIR3\FILE_NAME4') of the requested file (e.g., an OTF-recryption covered one in region 159 of FIG. 1E) should be saved. The name is preferably saved in a form where it remains part of an original pathname of the file and that original pathname is stored (see item 310 of FIG. 3A) in a just-created File-Use record. The name may be alternatively stored in any other convenient, nonvolatile memory area for safekeeping. Also, a 'current state' field of the file's corresponding File-Use record (see item 320 of FIG. 3A) should be set to indicate a 'Rename Still in Progress' state for that file.

Thereafter, at portion 244 (FIG. 2C), the original stored data of the requested file is renamed. This is done by accessing the disk subsystem directory 151 and overwriting the original file name (e.g., 'C:\TTL-ED-FOLDERS\SERVER50_NAME\VOLUME1\DIR2\ SUBDIR3\FILE_NAME4') with a unique new file name (e.g., 'JAN_1_2000.001').

In one embodiment, the unique new file name is selected as follows. The current time and/or current date is used to generate a unique alpha-numeric string (e.g., 'JAN_1_2000.001') conforming to the file-naming protocol of the operating system (e.g., in MS-DOS™ the string would conform to the 8.3 format, while in Microsoft Windows98™ the string may be a 'long' file name). The generated string is compared against all other file names listed in the corresponding directory of the requested file. If there is a collision (a pre-existing same name), a numeric portion of the generated string is incremented or decremented by a small value such as one (±1) and the collision test and revise procedure is repeated until there is no collision. Then the non-colliding unique alpha-numeric string (e.g., 'JAN_1_2000.002') is used as the new name for the original stored data.

Thereafter, at portion 245, the renamed original file (e.g., 'JAN_1_2000.002') is opened for reading. To prevent the recursion problem mentioned above, namely, that the File-open request sent by the intercept program 200 at step 240 (e.g., OPEN(JAN_1_2000.002)) will itself generate multiple invocations of the same intercept program 200, any of the quick-exit methods depicted by steps 220, 222, 224 and 226 may be used. In one embodiment, the Open-file intercept routine 200 is permanently listed on the excluded programs list 157 (FIG. 1E) to thereby force a Yes answer for the excluded-program check step 226 of FIG. 2B. When step 240 outputs one or more open-file requests to the OS kernel 134, the open is therefore carried out with minimal delay.

Alternatively, or additionally, because in step 236, a 'current state' field (320) of the corresponding File-Use record is checked to see if the file is being currently processed by an OTF module; if for some reason the earlier check points do not block the intercept of the OTF-originated OPEN from proceeding too far, when step 236 of the secondly invoked Open is executed, it forces an exit without increment through step 236 (because OTF_Invoked if found to be true).

The 'current state' field should be reset to the 'OTF Handling Complete' state at the completion of step 260. 'OTF Handling Complete' produces a false (No) answer for the OTF-Invoked? test of step 236.

As next indicated at portion 246, a new local file is created and opened for writing thereto. The new file is given the original filename (e.g., 'C:\TTL-ED-FOLDERS\ SERVER50_NAME\VOLUME1\DIR2\SUBDIR3\-FILE_ NAME4') that had been saved at step 243.

Upon entrance into section 250, the indicator 'Decrypt Still in Progress' is set true. In portion 251 of section 250, encrypted text is read from the renamed, local and original file (e.g., 'JAN_1_2000.002'), it is decrypted (252), and the resulting plaintext is written (253) either actually or phantomly (if volume-encryption is active) into the new file ('C:\...\SUBDIR3\FILE_NAME4'). The decryption method may be in accordance with a wide variety of encryption/decryption methods including, but not limited to, DES, RSA RC4™, and Blowfish. The appropriate decryption key may be obtained using a variety of security methods including the above-mentioned method of encrypting the decryption key with the authorized user's public encryption key.

Step 255 is optional as indicated by the dashed, alternate path 254. If step 255 is used, a digital signature test is performed on the real or alternatively phantom (if volume-encryption is active) plaintext version 161*d*. The digital signature may be stored in section 161*d* (FIG. 1E). As known in the art, digital signature may be performed by applying a private encrypting key (such as under asymmetric RSA) to the to-be-signed data or to a hash of such data. A corresponding public key is afterwards used to authenticate the signature by comparing the decrypted signature (the version decrypted with the public key) respectively against the stored data or a hash thereof. In one embodiment, the last authorized user to edit the file is defined as the master of the file 161 and his/her private/public key pair is used respectively to sign and authenticate the plaintext. In an alternate embodiment, the private/public key pair of the system administrator is used respectively to sign and authenticate the plaintext. The private/public key pair of another entity may yet alternatively be used to respectively to sign and authenticate the plaintext.

If signature test 255 is passed, control is afterwards transferred by path 255*y* to step 260. If signature test 255 fails, control is next given by path 255*f* to point A2 which exits by way of step 215 (refusal of the file-open request).

At the start of subsequent step 260, the 'current state' field for the file may be reset to an 'Update of Directory Attributes Still in Progress' state. Then within step 260 the renamed original file (e.g., 'JAN_1_2000.002') is closed (261). The new file that contains the apparently decrypted plaintext is also closed (262). At the end of step 260, return path 269 passes control to the routine exit step 299 and the operating system is allowed to continue with what the OS thinks is a normal file-open procedure. In this case, the normal file-open procedure will open the just-created, apparently-plaintext, and new but localized file rather than the renamed and originally encrypted version of the file (e.g., 'JAN__1__ 2000.002') and rather than, if applicable, the original remote source of the file data (e.g., '\\SERVER50_ NAME\VOLUME1\DIR2\SUBDIR3\-FILE_NAME4').

The calling application program APP_#M 170 (of FIG. 1E) or 15 (of FIG. 1B) will be unaware of the fact that the file information it had requested was originally in a remote storage location, was originally encrypted, had been Transparently and Temporarily Localized (TTL'ed) and had been decrypted by the local OTF software after having being sent in its encrypted format through the communications link 30. If volume-encryption is active, the OTF software will be unaware of the fact that the file named 'C:\...\SUBDIR3\- FILE_NAME4' had not been created in plaintext form on nonvolatile storage (e.g., hard disk) even though the OTF software thinks that had been done. Instead, the nonvolatilely-stored file, 'C:\...\SUBDIR3\FILE_NAME4' will be covered by the volume key, where the volume key may be secured in a predefined place such as the volume label (153*a* of FIG. 1E) or elsewhere.

Referring back to FIG. 1E, in section 172 of application program APP_#M, the generated, and apparently-plaintext information within the new 'C:\...\FILE_NAME4' file created at step 253 (FIG. 2C) is processed in accordance with instructions contained within application program section 172. If volume-encryption is active, primitive read and write operations will be intercepted and the actually-decrypted data will be placed in volatile memory area 175 rather than in nonvolatile area 161*d*.

When application program APP_#M 170 finishes using the apparently-plaintext information, program 170 will usually generate a request for a File-CLOSE operation as indicated at 173. The response to such a file-CLOSE request 173 will be detailed shortly.

In one case of such usage, where APP_#M 170 is the only application that has requested an opening of the encrypted file (e.g., a TTL'ed encrypted file originally stored in region 159 and thereafter copied into a region such as 161), and the usage of the apparently-plaintext information at 172 did not involve any modification of the plaintext information, the response to the File-CLOSE request 173 may preferably include a scorching of the apparently-plaintext file and a changing of the name of the renamed original file (see step 240) back to its original, localized name (e.g., change 'JAN__1__2000.002' back to 'C:\...\DIR2\SUBDIR3\FILE_NAME4'). In this way, unnecessary and time consuming re-encryption is avoided.

Before moving on to the file-CLOSE response, a preferred data structure for a File-Use record 300 will be described with reference to FIGS. 3A–3B. A File-Use record 300 may be used by the OTF-recryption software for keeping track of what stages within OTF-processing a given file is in. The same File-Use record 300 may also or alternatively be used by TTL-ing (Transparently and Temporarily Localizing) software for keeping track of what stages within TTL-processing a given file is in. Such a File-Use record 300 should be stored in a local file-tracking and managing portion of the local machine (e.g., 100) that is executing the TTL-ing and/or OTF-recryption software (e.g., 154, 220–260).

Server 50 (FIG. 1B) is not the only possible source of a file that is to-be-used in a local machine such as 10. Instead a desired, confidential file may reside in client 20 while a first authorized user is working at client 10 and a second authorized user is working at client 20. In such a case, the File-Use record 300 which is originally stored only within client 20 may have to be copied into client 10 and revised therein so that the copied File-Use record 300 becomes a part of the file-tracking/managing information for localized files in client 10. In so far as the first local client computer 10 is concerned the 'remote' version of the correspondingly TTL'ed file sits in second client 20.

Record 300 is subdivided into a plurality of major sections including a local-storage locating section 310 for identifying the 'local' storage location of the tracked file by way of its pathname or otherwise. If the record 300 is inside the file-tracking/managing information portion (52*a*) of server 50, the pathname of locating section 310 might read, '\\SERVER50_NAME\- VOLUME1\DIR2\SUBDIR3\FILE_NAME4'. On the other hand, if the record 300 is inside the file-use records area 166 of client 100 (FIG. 1E) and this client 100 has employed localizing step 231 (FIG. 2B), this pathname 310 may read as, 'C:\TTL-ED-FOLDERS\SERVER50_NAME\ VOLUME1\DIR2\SUBDIR3\-FILE_NAME4'. This file-identifying name is generally the same as that given to the localized file before the rename operation of step 244 begins. The HANDLE that points to the same, local or localized pathname 310 ultimately becomes the identifier of the decrypted plaintext after execution of step 260 (FIG. 2C) and the return through the local OS completes.

Another section 320 of the File-use record describes the current state of the native or alternatively, localized file. The file named by 310 can be in a still, fully-encrypted status, or it can be in a partially decrypted state, or it can be fully decrypted, this depending on what progress has been made by the OTF-recryption algorithms as they work on the file named by 310.

A first portion 321 of the record section 320 indicates whether the file identified in 310 is currently being processed by an OTF module. A first state-code may be established in portion 321 for indicating that renaming of the original file and assignment of the original name to a to-be-decrypted local file is still in progress. A second state-code may indicate that decryption (step 250) is still in progress. A third state-code may indicate that a scorching (total erasure) of the plaintext within the decrypted, local file is now in progress. A fifth state-code may indicate that file specifying attributes within the system directory 151 are now being updated to reflect a new location or status for the file named in 310. A sixth state-code may indicate that OTF modules are not presently processing the file identified by section 310 and that this file is therefore available for usage by any authorized application program that may wish to read from, or write to the file. An example of such application program usage is execution of code section 172 of FIG. 1E.

A second (optional) portion 322 of the current file-state section 320 may indicate whether a file security label of appropriate format has been found inside the file identified by section 310. Second portion 322 can include a flag indicating that user access rights have been verified by checking the file security label and/or by checking a recryption rules file corresponding to the local directory of the file named in 310 and/or by checking another kind of access constraining rules file corresponding to the local directory of the file named in 310.

Another flag in portion 322 can indicate whether the specifications within the files security label match the specifications within the rules file of the local directory in which the file is stored. At various times, the recryption or other access constraining rules files of a local directory may be altered by the system administrator. The system software may be asked to thereafter modify the security labels of all the files contained in that directory so they again match the specifications of the local permissions rules files. If an unauthorized new file is later brought into that directory, its presence in the directory can be detected automatically by detecting the mismatch of its file label and the access constraining rules file of the local directory into which that new file has been added. This feature allows system administrators to keep a tight reign on which confidential files can be moved into what directory (folder) while still remaining decryptable or otherwise accessible.

A third portion 323 of section 320 indicates whether or not the plaintext of the file named in section 310 has been modified by a user. If it has, re-encryption of the modified plaintext data may be necessary once all local applications have finished using that decrypted plaintext. The re-encrypted file may then be written to nonvolatile local storage, and thereafter if appropriate, de-localized (re-externalized).

A third section 330 of the File-Use record tracks the usage of the fully decrypted version of the file by various application programs.

Referring briefly to FIG. 3D, it can be seen that multiple application programs may be simultaneously using a same decrypted version of a given, local file. In the example shown in FIG. 3D, a 'localized' and decrypted FILE-C is indicated to be 'in use' simultaneously by three different, local application programs, APP_1, APP_2, and APP_3.

Returning to FIG. 3A, third section 330 includes a File-Use Count field 331. This field 331 is incremented each time a local application program issues a file-OPEN request for the file named in section 310. The File-Use Count increment occurs in the aforementioned step 237. However, the count is not incremented as indicated at 236 (FIG. 2C) if the file-OPEN request is invoked by an OTF procedure.

A second portion 332 (optional) of the file-usage tracking section 330 contains a pointer to a bidirectionally linked (doubly linked) list of records where each such record contains a pathname for a respective, local application program that is currently 'using' the plaintext of the file named in section 310 and the User ID of the user that is using that instance of the application program. The linked list may optionally included idle time specifications for each such application instance and flags for indicating whether excessive idle time for each such application program is to invoke a temporary security lockout. The idle time indicates the latest span of non-use by the specified user for that application and for the 'secured' file that is named in section 310. If the idle times of all or a selected subset of the using applications (and/or specific users) exceeds a predetermined threshold, the security system may elect to optionally lock out these application instances from access to the plaintext. This can be done by listing such application programs or their users on a temporary exclusion list. The user would be asked to enter a password before access is regranted by removing the named programs and/or the user's ID from the temporary exclusion list. Portion 333 may contain a flag indicating that an idle time lockout is active.

At each local client, keyboard activity could be periodically monitored and a security screen-saver can be pasted onto the monitor screen to temporarily cover up what was being displayed if a predefined idle-time is exceeded. The user is then asked to enter a password before further access through the keyboard is regranted and the screen-saver is removed from the screen.

Another portion 334 (optional) of the usage tracking section may indicate whether a delay of a post-close decryption has been requested. Such a delay is granted for example, to 'special applications' listed in one of the special-use lists 167 (FIG. 1E).

Yet another portion 335 (optional) of the usage tracking section may contain a pointer to a bidirectionally linked list of records that define post-close events whose occurrences are to be waited for before re-encryption or scorching of the decrypted version of the file named in section 310 begins.

A fourth section 340 of the File-use record may be used to keep track of the origin of each confidential file to which local access has been requested. One portion 341 of section 340 may be used for storing the new name (e.g., 'JAN_1_2000.002') of the renamed, and native or, alternatively localized, original version of the file.

A second portion 342 may be used for storing the pathname or an equivalent of the original, remote file in cases where the tracked file originated from such a remote location. If second portion 342 is empty, that may be used to indicate that the file named in portion 310 is a 'native' or originally local file belonging to the local machine as opposed to being a TTL'ed file.

A third portion 343 may be used for storing information about the type of media on which the currently renamed, and native or localized file originally sat on. Various codes may be used to indicate whether the point of origin was local (the file is a internal native of the local machine) or external (the file is a transparently imported one that came from transportable media or over a network link). The codes may further indicate whether the media that served as the point of origin was a read/write type (RW) or a Read-only type. Even though the file identified by 310 probably sits on an RW media type (e.g., hard disk), writing permission should be withheld if section 343 indicates the point of origin was a Read-only type. This is done to preserve the illusion to the user that he/she is working with the remote version of the file even though in reality the machine is using a temporarily localized version of the file.

The codes of third portion 343 may further indicate whether the media that served as the point of origin was of a fixed-in-place kind or a removable media (e.g., a floppy diskette or Zip™ diskette {Zip™ is a trademark of Iomega Corp.}). If the point of origin was a removable media, yet another part of third portion 343 may further indicate whether the media is still believed to be in place or is believed to be currently removed. This last section is one that may be updated by step 203 (FIG. 2A) for all files of a given media when an Open-attempt to that media is made on behalf of one specific file and it is found that the media is no longer available. In this way, the last known, unavailability status of the given media is broadcast to all file-use records at the time such unavailability is detected.

A fourth portion 344 may be used for storing information about the type of communications link (30) if any that was used to transfer the currently renamed, and localized file to the local machine from the place it originally sat on. Various codes may be used to indicate whether the communications link is trusted (secure) or untrusted (open) and what level of security is in place for that link. The codes may be further used to indicate whether the communications link is currently operational (the link is 'up') or not operating (the link is 'down'). If the link is 'down', access to the localized version of the file should be blocked at the local machine in order to maintain the illusion to the user that he/she is working with the remote version of the file even though in reality the machine is using a localized version of the file.

Figure 3B:
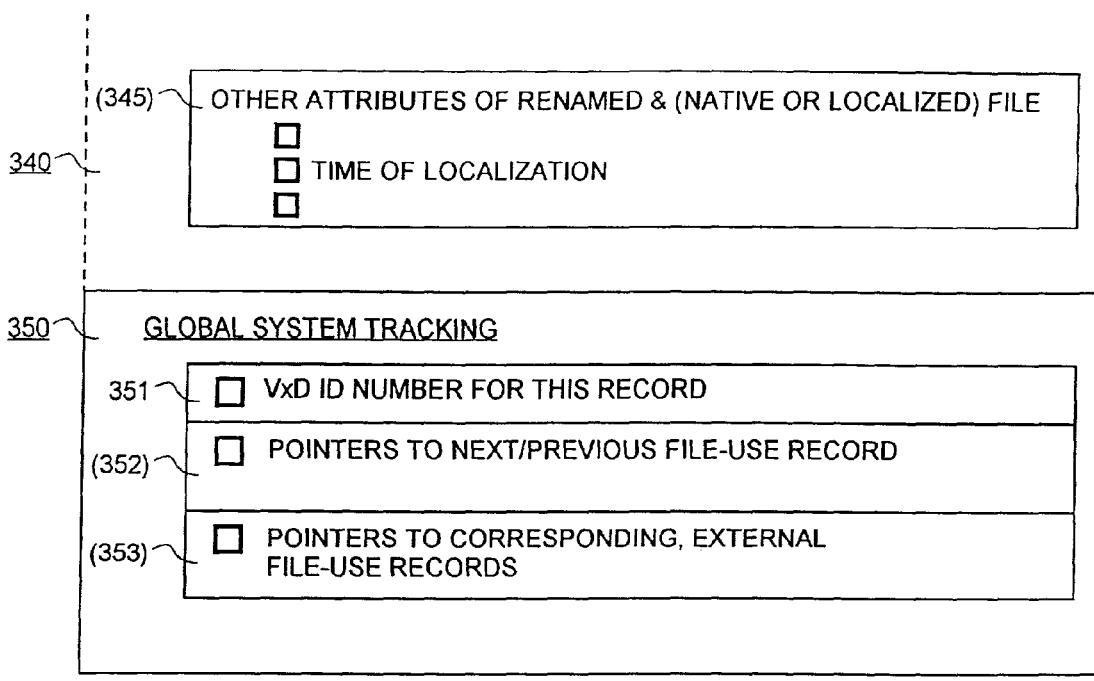

Referring to FIG. 3B, a further portion 345 (optional) of the origin tracking section may be used for storing other attributes of the renamed original file such as time of localization (for garbage collection purposes), file size, last-revision date, user-permissions, and so forth. These other attributes may be compared to the attributes of the decrypted file named in section 310 to see if corresponding attributes of the system directory 151 need to be updated after a file-CLOSE is requested by a file-using application program. Of course, various ones of these file attributes 345 for the renamed file may be alternatively or additionally updated in the system directory 151 by actions of the intercept routine if so desired. This may however slow the turnaround time of the intercept routine.

A fifth section 350 of the File-Use records may be used for global system tracking. One portion 351 of the global system tracking section may contain a virtual device driver identification number that is used by virtual device drivers (VxD's) for passing identification of the present file between different levels of the operating system (e.g., between ring 3 and ring 0). Another portion 352 (optional) of the global system tracking section 350 may be used for storing pointers to the next and/or previous File-Use record of a linked list of such File-Use records (such an optional structure is indicated by symbol 396 in FIG. 3D). Another portion 353 (optional) of the global system tracking section 350 may be used for storing pointers to corresponding File-Use records (300') in external machines or media that respectively define the relatively-local file-usage states in their respective locales for a corresponding version of the same file that is being tracked by File-Use record 300.

Figure 3C:
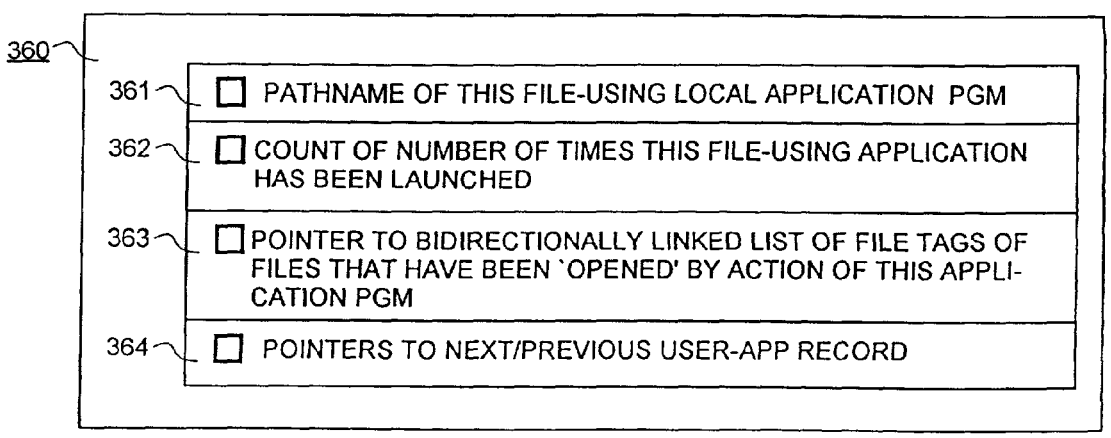
FIG. 3C shows the data structure of a User-Application record that may be used in accordance with the disclosure.

Referring to FIG. 3C, a possible data structure for a User-Application record 360 in accordance with the disclosure is shown. Just as the File-Use record 300 tracks various attributes of an 'in-use' native or localized file which is access constrained, the user-application record 360 keeps track of what native or localized files a given, local application program is using and how many instances of the application have been launched. A first section 361 of the User-Application record stores the pathname of the file-using, local application program for which this record 360 has been created. The user-application record 360 should of course be physically-secured inside the local machine.

A second section 362 keeps count of the number of times that the present file-using application has been launched locally and not correspondingly terminated. In a multi-threaded environment, multiple instances of a given application program may be launched. As some of the launched application program terminate, others of the launched instances may still be using a decrypted copy of a given, native of localized file. It is desirable to keep track when the last instance of the identified application program finishes using such files so that the files are not prematurely re-encrypted and/or prematurely closed and de-localized (if not native). Such multiple launches of each application program are indicated by symbols 377–379 in FIG. 3D.

A third section 363 of the User-Application record 360 contains a pointer to a bidirectionally linked list that identifies the files that have been opened by action of the present application program. Such a pointer is indicated by symbol 371 in FIG. 3D. As seen in the example of FIG. 3D, in one embodiment, pointer 363 points to a bidirectionally linked list of File-Tag records and these in turn point to respective File-Use records (391–394 of FIG. 3D). These constructs will be explained below.

A fourth section 364 of the User-Application record contains pointers to the next and/or previous User-Application record in a list of such records. Such bidirectional next/previous pointers are indicated by symbol 376 in next-described FIG. 3D.

FIG. 3D shows a schematic 380 of a sample logical interconnection between a plurality of User-Application records 381–383 and a plurality of File-Use records 391–394. The logical interconnect is defined by various File-tag records 384–390 that are selectively inserted into and removed from respective linked lists. The respective linked lists are pointed to by header pointers 371, 372 and 373.

A bidirectionally linked list of four File-Use records 391, 392, 393, 394 is shown as an example at the bottom of FIG. 3D. Such linkage of the File-Use records is optional. Symbol 396 represents the bidirectional linkage between File-Use record 391 and File-Use record 392. Records in linked list 391–394 may be ordered alphabetically according to the pathnames of section 310 (FIG. 3A) or otherwise as desirable. For example, the records may be listed first according to point of origin (local or external) and then according to alphabet. Note that the tracked files include both native and temporarily localized ones.

A bidirectionally linked list of three User-Application records 381, 382, 383, is shown as an example at the top of FIG. 3D. Symbol 376 represents the bidirectional linkage between User-Application record 381 and User-Application record 382. Records in linked list 381–383 may be ordered alphabetically according to the pathnames of section 361 (FIG. 3C) or otherwise as desirable. The number of records in each of lists 381–383 and 391–394 may of course vary with time and usage.

Pointer 371 within User-application record 381 defines a first interconnect tree by pointing to a first bidirectionally linked list of the File-Tag records defined by records 384 and 387, Each File-Tag record (e.g., 384) contains a first pointer (e.g., 375) to a corresponding File-Use record (e.g., 391) belonging to a file that is currently 'in-use' by the application program (e.g., User-Application APP_1) of the User-application record 381 at the head of the first interconnect tree. For performance reasons, each File-Tag record (e.g., 384) further contains an optional second pointer such as back-to-head pointer 374 for pointing directly from that File-tag record to the User-application record at the head of the respective interconnect tree.

In the illustrated example, native FILE_A is indicated to be 'in use' only by User-Application APP_1 as a result of the logical interconnect defined to exist by File-Tag record 384 between File-Use record 391 and User-Application record 381. Transparently imported (localized) FILE_C, on the other hand, is indicated to be 'in use' by three applications as indicated at 395 because of the logical interconnects defined by respective File-Tag records 387, 388 and 386.

As with pointer 371, pointer 372 within User-Application record 382 points to the head of a second doubly-linked list of File-Tag records, 385, 388 and 390. These File-Tag records in turn identify the files that are being currently used by user-application APP_2. In the illustrated example, this second linked list names the 'in use' files to be: FILE_B (as indicated at 385), FILE_C (as indicated at 388) and FILE_D (as indicated at 390). In similar fashion, pointer 373 of user-application record 383 points to a third bidirectionally linked list and thereby identifies the files that are being currently used by user-application APP_3 as being: FILE_C (as indicated at 386) and FILE_D (as indicated at 389). The respective multiple arrows, 377, 378 and 379, on top of the symbols for respective User-Application records 381, 382 and 383 indicate the number of instances of each given application that have been launched.

The combination of the File-Use records 391–394 and the User-Application records 381–383 may be used to track the state of each plaintext copy of confidential data and to determine if it is appropriate to remove that plaintext local copy by scorching or re-encryption. As seen from the number of launches (e.g., five) indicated by arrow heads 377 over User-Application record 381 of FIG. 3C, although FILE_A is 'in-use' only by user-application APP 1, there are multiple instances of application APP_1 that have been simultaneously launched and a termination of one such instance does not justify removing (eliminating) the plaintext of native FILE_A because other instances of APP_1 may still need to use that same plaintext. The number-of-launches count 362 (FIG. 3C) in User-Application record 381 may be used to determine if it is appropriate to remove the plaintext of FILE_A. The launch count 362 of a given User-Application record is generally not enough by itself though because the corresponding one application program may not be the only application using that file.

As seen in the case of TTL'ed FILE_C for example, the plaintext of FILE_C is 'in-use' by all three user-applications, APP_1, APP_2, and APP_3 as indicated by the pointers 395 entering the top of the symbol for File-Use record 393. There is only one instance of user-application APP_3 using FILE_C as indicated by the single arrow symbol at 379. When the one instance of APP_3 terminates, there may still be a number of instances of APP_1 or APP 2 that are still using the plaintext of FILE_C. This concept will be revisited within next-described FIGS. 4A–4D.

FIGS. 4A–4D define a second machine-implemented process 400 in accordance with the disclosure for responding to the intercepts of file-CLOSE requests.

Like reference numerals in the '400' century series are used in FIGS. 4A–4E for elements of similar nature numbered in the '200' series in FIGS. 2A–2B and as such only an abbreviated explanation is needed here. As in the case of a file-OPEN, the CLOSE request is intercepted and control passes to step 401. In step 402 availability of the file's home media and/or communications link and/or home server is tested. Steps 403 and 498 handle media availability errors in a manner similar to that of earlier-described steps 203 and 298. In step 404, if no access constraining operation is active, a quick return to the normal file-CLOSE sequence is made by way of path 404n and intercept exit step 499. In test step 405, the expectation is that constraints-tracking information will already be locally available for the to-be-closed file if such tracking information is necessary. There is no fetching step equivalent to step 206. Instead, at step 407, if it is determined that the lack of constraints-tracking information simply means the file is not an access constrained one, then path 407n is followed to the intercept-exit 499. If it is instead determined that the lack of constraints-tracking information is an error because such information was necessary, then path 407y leads to the error-handling step 415 (by way of link D2).

At error-handling step 415, the request is refused and a failed operation signal is returned to the application program that caused the file-CLOSE request to be made. Optionally, if bypass 417 is not active, an appropriate security alert is posted to the network for receipt by prespecified administrators or others and/or for automated or manual reaction to such a security alert.

Permissions-controlled blocking of the file-CLOSE operation is optional as is indicated by bypass path 413. If step 412 is entered, then appropriate permissions rules may be tested to see if the requesting program and/or time of request and/or location or machine from which the request originates is authorized for completing the file-CLOSE operation on the targeted file (or folder). If the answer is Yes, then path 412y passes control on to step 420 (in FIG. 4B) by way of link E1. If the answer to test 412 is No, then step 415 is entered instead.

Figure 4B:
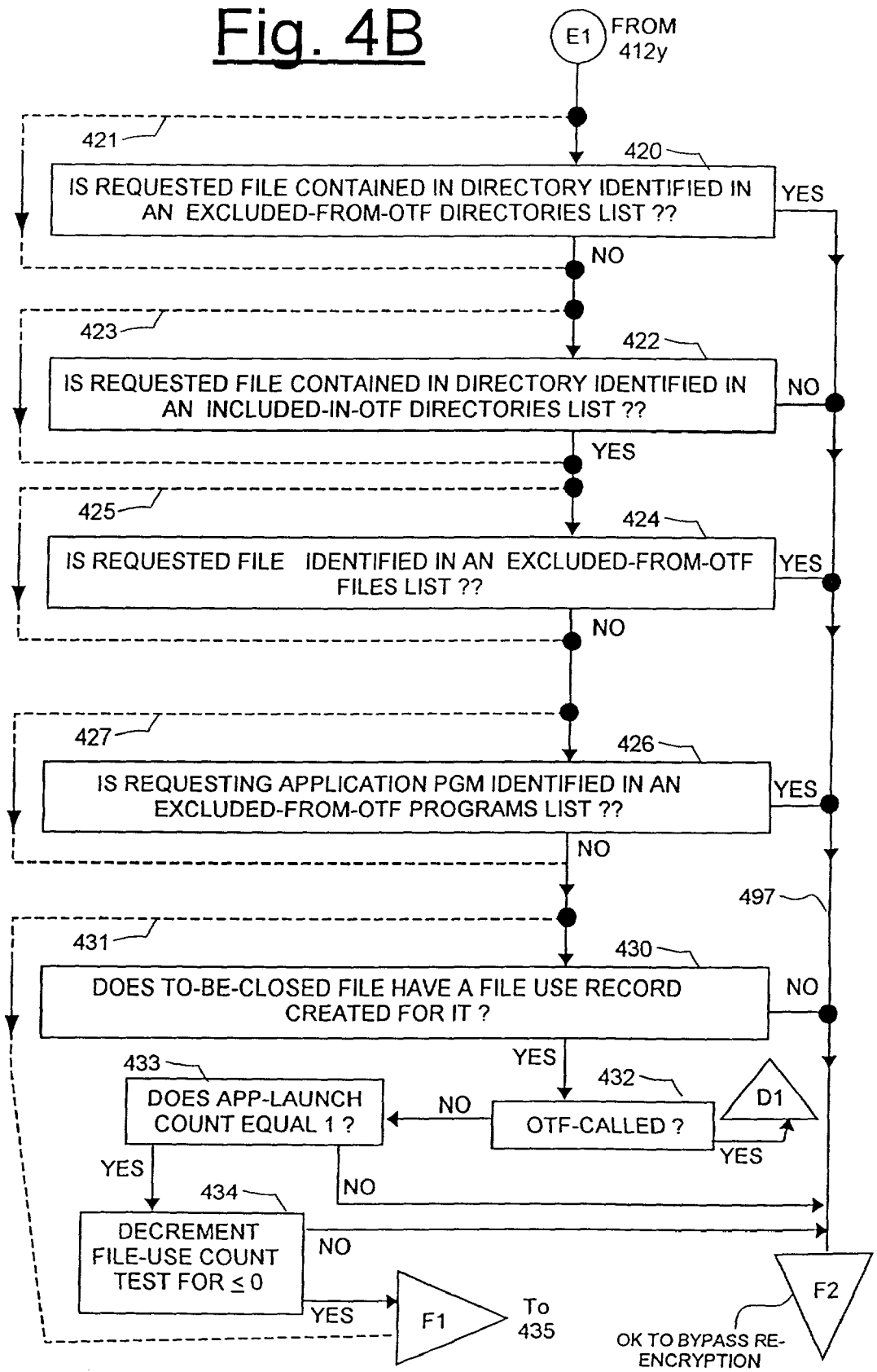

In FIG. 4B, one or more, but not all, of respective test steps 420, 422, 424 and 426 may be optionally bypassed by respective bypass paths 421, 423, 425 and 427. The respective bypass paths 421, 423, 425 and 427 may be permanently or contingently established according to the desires of the system administrator. The sequential order of respective test steps 420, 422, 424 and 426 may be optionally rearranged to improve performance speed in accordance with system specifics. If the answers to the respective, excluded-from-OTF checks is affirmative, the intercept routine 400 will ultimately be exited in a relatively quick manner by way of exit step 499 (link D1) and control will be passed back to the file-CLOSE service routine of the OS kernel so as to allow the latter to complete the normal File-CLOSE procedure without further modification or delay due to re-encryption. This quick return will occur after control passes through path 497 to entry point F2 of FIG. 4C.

FIG. 4B begins to diverge from what is disclosed in FIG. 2B after steps 426/427 and thus the remainder is described in more detail. In the embodiment that uses File-Use records and/or User-Application records and/or File-Tag records, steps 430–432–433–434 are executed prior to step 435. Otherwise bypass path 431 may be followed.

In step 430 it is determined whether the to-be-closed file (native or localized) has a File-Use record created for it. If it does not (No), then the to-be-closed file is assumed to being not tracked by the 'On-The-Fly recryption' process and the On-Close intercept routine 400 will be exited without performing re-encryption by way of exit path 497 (to F2 of FIG. 4C).

If the answer to the Has_File-Use_Record? check 430 is Yes, control passes to step 432. In step 432 it is determined whether the file-CLOSE request was issued at the behest of an OTF module, such as at the behest of step 250 (FIG. 2C). The 'current state' field 321 of the File-Use record may checked to answer this question. If the answer to the OTF_invoked? check 432 is Yes, the intercept routine 400 is exited by way of exit step 499 (via link D1).

On the other hand, if the answer to the OTF_invoked? check 432 is No, then in the following step 433, the number-of-launches count 362 in the User-Application record of the requesting application is tested to see if this file-CLOSE request is coming from the very last instance of that User-Application. If No, path 497 is taken (re-encryption will be bypassed). If the answer to the Last-instance? test 433 is Yes, that indicates the last instance of the named requester is trying to close the file (native or localized) and that the file thereafter will no longer be 'in use' by the named User-Application. Consequently, in following step 434, the File-Use Count 331 of the corresponding File-Use record is decremented and tested to see if a zero or negative count has been reached. (If negative, the File-Use Count is first reset to zero. In practice, the File-Use Count should not go below zero if all modules are operating correctly.) If No, path 497 is taken (re-encryption will be bypassed).

If the answer to the File-Use Count Equal/Less-than Zero? check 434 is instead Yes, that indicates there are no more other current users of any name that have not yet issued a file-CLOSE on the local plaintext data for which the current file-CLOSE is being requested. This information is passed forward to the Last-Instance_of_Last-User? test 435 (FIG. 4C) so that test 435 knows this file-CLOSE request is coming from the last instance of the very last current user of the file.

The fact that the file-CLOSE request is coming from the last instance of the very last current user does not mean that the plaintext data should now be re-encrypted or scorched. It could be that the same or another application program will soon try to open the same-named file. Or it could be, that for reasons of performance speed, it is desirable to postpone re-encryption until after some predefined, post-CLOSE event (e.g., termination of a master application program). As such, in one embodiment (not bypassed by alternate path 437) control passes thereafter to test step 436.

In step 436 it is determined whether the file for which a file-CLOSE request has been received from a last instance of a last current user nonetheless should be kept in plaintext form because it belongs to a 'special' application program. The special-use lists 167 (FIG. 1E) may be checked to see if they identify the requestor as a 'special' file-using program for which the re-encryption portion of 'On-The-Fly recryption' is to be delayed until after a prespecified post-CLOSE event takes place (e.g., termination of the same or another application program), and/or to see if the to-be-closed file is identified as a 'special' file for which the re-encryption portion of 'on-the-fly recryption' is to be similarly delayed until after a prespecified post-CLOSE event takes place (e.g., termination of a listed and cross referenced 'master' application program).

If the answer to the Special-file/requestor check step 436 is Yes, control is passed such that the On-Close intercept routine 400 may be exited without performing re-encryption, that is, control continues by way of path 497 (F2) to switch-setting step 496. In step 496, an encryption bypass flag (E-BYPASS) is set to True (Y). The setting of E-BYPASS=Y due to a Yes result in test step 436 does not mean that the plaintext of the to-be-closed file can remain forever in plaintext form. A post-CLOSE event should be scheduled to later re-enter the process through entry point 'Z1', set E-BYPASS=N in step 495, and thereafter complete the on-CLOSE clean-up when the prespecified post-CLOSE event takes place.

In step 438 it is determined whether the plaintext of the to-be-closed (native or localized) file has been modified or not. This answer can be obtained from the operating system. Alternatively or additionally, file-WRITE requests can be intercepted, and if the WRITE is directed to a file having a File-Use record, portion 323 (FIG. 3A) can be set true to indicate that the corresponding plaintext has been modified. In step 438, such a portion 323 may be alternatively checked to see if it has been set true.

Figure 4D:
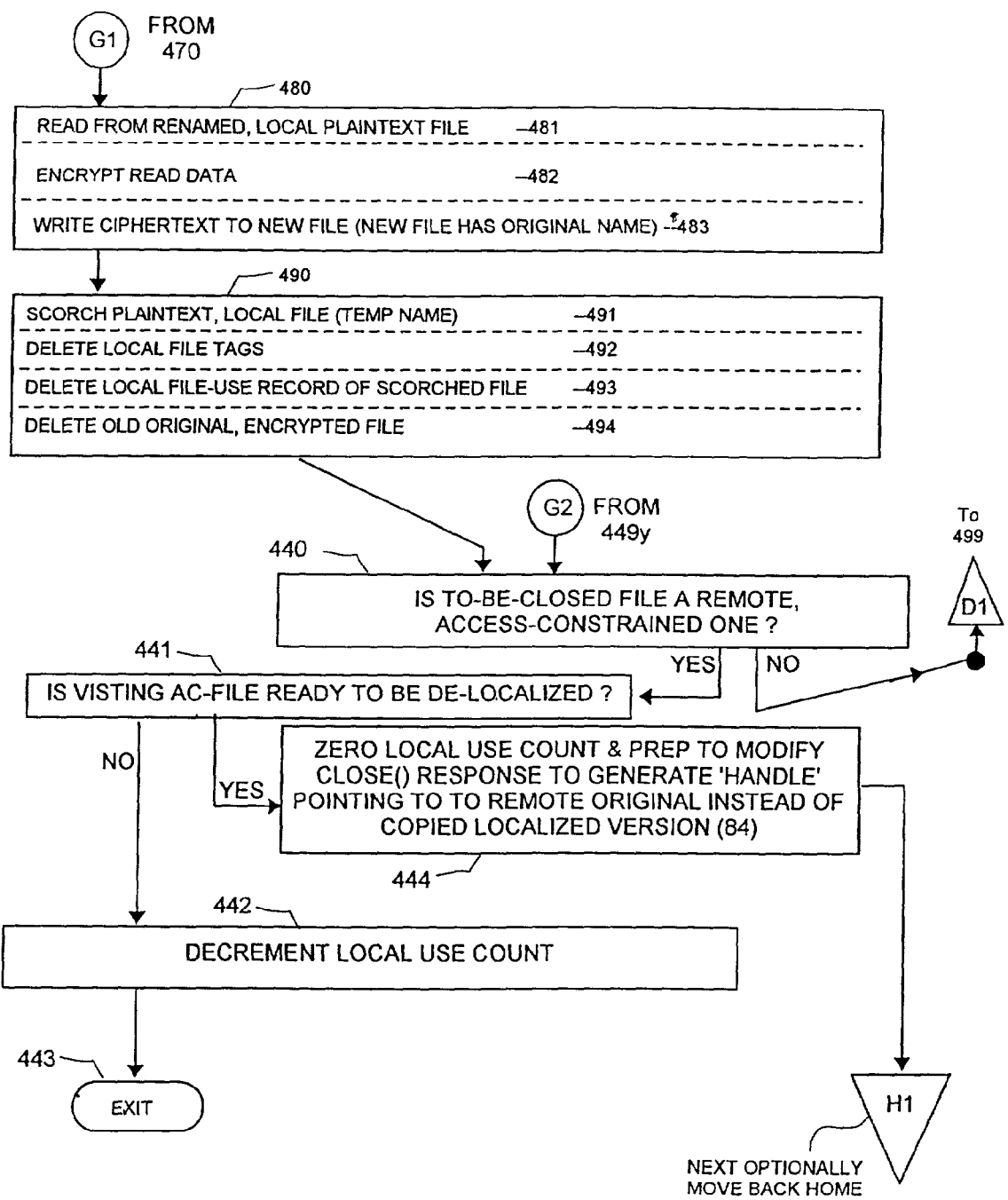

If the answer to the Plaintext Modified? test 438 is instead Yes, control passes to step 448. Here a modifications-need switch (MODS) is set to True (Y). In a following step 449, the E-BYPASS switch is tested. If false, control passes to step 450. If E-BYPASS is instead True (E-BYPASS does equal Y), then control passes to step 440 (FIG. 4D, via path G2).

Referring to step 450, if control passed to here, it means that the plaintext of the to-be-closed file has been modified. The modified plaintext version now needs to be encrypted and the renamed, still-encrypted original is usually deleted in this same time period. In portion 451 of step 450, the plaintext and local file (which currently has the original file name, e.g., 'AA.XLS') is given a new, unique temporary name (e.g., 'JAN__1__2000.003'). The above-described unique-name picking algorithm may be used. In portion 452 of step 450, a new, empty file is created and is given the original name (e.g., 'AA.XLS') of the now-modified and decrypted file.

In a multi-threaded environment, the renaming attempts of step 450 might fail due to a synchronism problem such as the plaintext version still being deemed to be in-use by the operating system. In such a case the renaming attempt will temporarily fail and merely needs to be retried at a later time. Such a failure is checked for at test step 455, and if there was a failure (Succeeded?=No), in step 458 the successful portion of the rename attempt is undone and task Z2 is posted onto a system command queue for a retry at a later time. The intercept routine 400 is thereafter temporarily exited by way of exit step 459 for re-entry back at Z2 when the system queue gets to task Z2.

If the answer to the Renamings Succeeded? check 455 is Yes, as it ultimately should be, control passes to step 460. In portion 461 of step 460, the plaintext, modified file (e.g., now named 'JAN__1__2000.002') is opened for reading. In portion 462, the new destination file (e.g., now named 'AA.XLS') is opened for writing thereinto.

In step 470, preparations are made for encrypting the native or localized plaintext. In portion 471, encryption control parameters are obtained from the system security managing software. Such parameters can include a specification of the type of encryption algorithm to be used (e.g., DES, RSA RC4™, or Blowfish) and a specification of the encryption key to be used. In one embodiment such specifications may be obtained from a Transparently and Temporarily Localized recryption rules file in region 158 (FIG. 1E) of the local machine. If a security label system is being used, then in portion 472 the appropriate security label is written into the new, initially-empty destination file. Security label information may be copied from the old encrypted original (e.g., currently re-named as 'JAN__1__2000.002') and/or it may be derived from the data stored in the recryption rules file 158 (FIG. 1E).

Step 480 (FIG. 4D) responsively carries out the actual encryption. In portion 481, the modified plaintext data is read from the plaintext file (e.g., now named 'JAN__1__2000.003'). In portion 482, the so-read data is encrypted in accordance with the obtained encryption control parameters. And in portion 483, the resulting ciphertext is written into the new destination file (e.g., now named 'AA.XLS' but can be in a TTL'ed folder or a native folder).

As with other OTF modules, during the execution of various parts of the On-Close intercept routine 400, the 'current state' field 321 of the corresponding File-Use record is updated at the appropriate times to indicate when renaming is in progress, or re-encryption is in progress, or clean-up activities such as the scorching of the plaintext and the updating of the system's directory structure 151 are in progress.

Step 490 contains the post-encrypt, clean-up activities of FIG. 4D. In portion 491, the plaintext file (e.g., now named 'JAN__1__2000.003') is scorched. In portion 492, the corresponding File-Tag records, if any are left (there shouldn't be any), are deleted from their respective linked lists. In portion 493, the corresponding File-Use record is deleted. And, in portion 494, the old encrypted original (e.g., currently named 'JAN__1__2000.002') is optionally deleted. (If the system administrator wants to retain older files for some length of time, then the system administrator may cause the appropriate book keeping to occur at this time for linking the retained old file (e.g., named 'JAN__1__2000.002') with the newly encrypted file (e.g., now named 'AA.XLS').)

If the re-encrypted file is a native of the local machine, this is essentially the end of the intercept. In step 440 the query, 'Is to-be-CLOSEd file a remote, access constrained one?' is answered No and control passes via link D1 back to step 499. The OS completes the close file operation, with its handle pointing to the file bearing the original name (e.g., 'AA.XLS'). The OS does not know that the re-encryption and scorching occurred within the intercept.

On the other hand, if the re-encrypted file is a Transparently and Temporarily Localized one that happens to visiting the local machine, that file may now have to be sent back to its true home (a remote server and/or external media). The result to test 440 will be Yes and control will pass to step 441. Here it is determined whether the TTL'ed file is now ready to be de-localized (sent back to its true home). Typically the answer will be Yes. However there may be special use situations where the system administrator wants to keep the file localized rather than letting it go back home. The administrator may wish to keep track of a count of how many times the visa for the localized file is extended and thereafter contracted with a CLOSE operation. This may be done in step 442. Step 443 is a special exit which bypasses a normal close of the local file. Practitioners may of course further embellish on what happens next in such special situations.

Assuming that the result to test 441 is Yes, control now passes to step 444. Here the local use count is reset if such a count is being kept. The 'handle' for the CLOSE operation is changed to point to the remote instance of the file rather than the local one. Ultimately, when the CLOSE completes, the OS will be closing the remote instance and thereby freeing that remote instance for access by other authorized users. However, before that happens, the local machine may decide to move a revised version of the file to the external home position.

In subsequent step 445 (FIG. 4E) it is determined whether the localized version has been modified. If NO, then the local copy may be deleted in step 446 and the CLOSE operation may then be completed by the OS via link D1 and intercept exit step 499. (Note this process may be temporarily modified by the system administrator to bypass step 446 if it is determined that the TTL'ed copy will be shortly needed again.) If test step 445 determines that the localized version has been modified (MODS=Y), then the external instance of the file is overwritten by the TTL'ed copy before the OS is allowed to finish the CLOSE operation. Note that for files where Smart-Locking™ is employed, the TTL'ed copy will already have been re-encrypted by steps 470 and 480. Thus, a plaintext version of confidential information will not have to be sent out over unsecured channels.

Figure 4E:
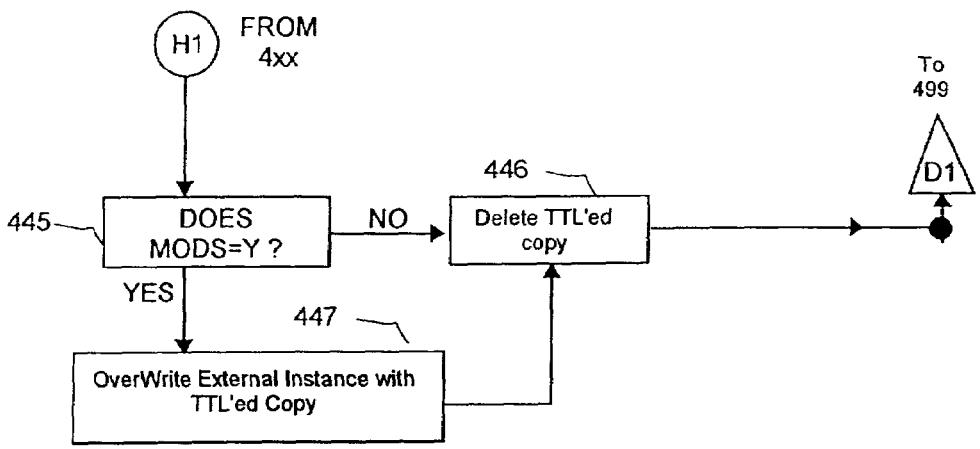
Figure 4E:
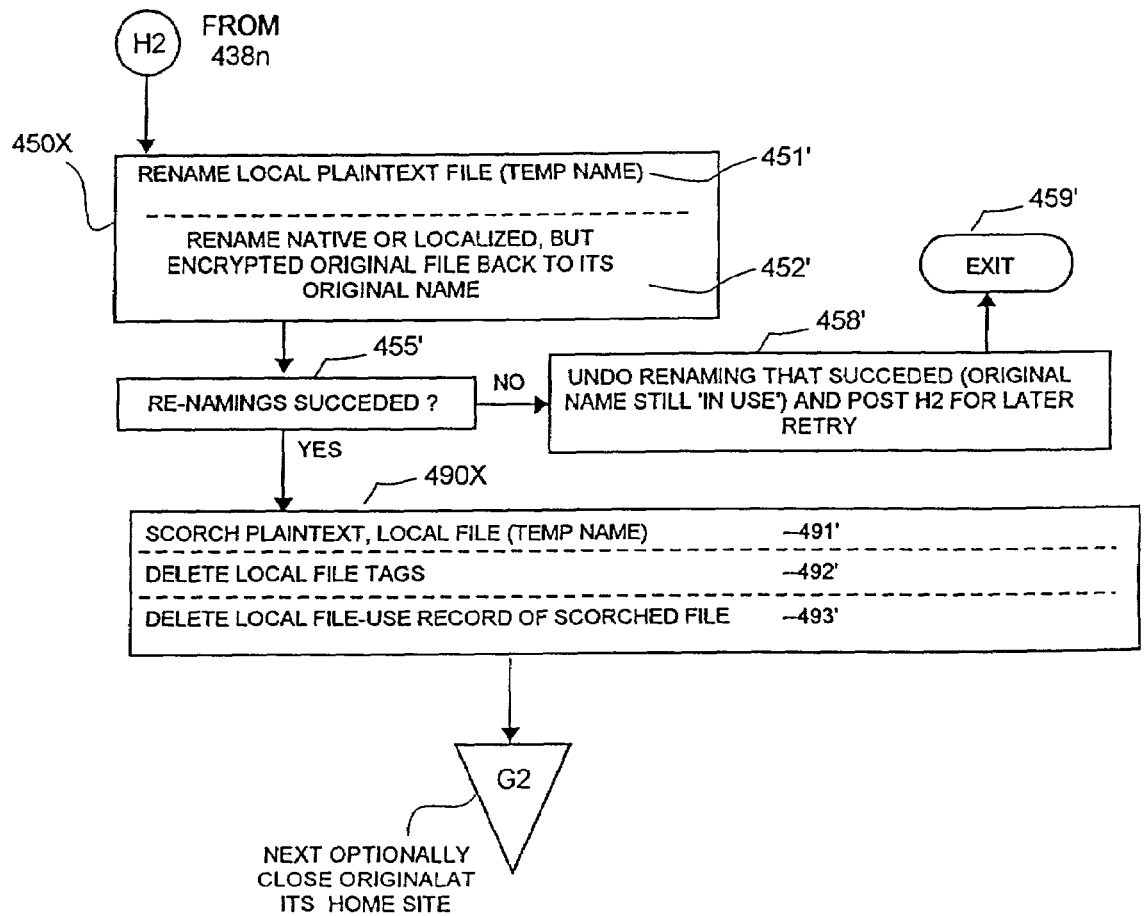

Returning to step 438 (FIG. 4C), if the answer to the Plaintext Modified? test is No, control passes to step 439 where the MODS flag is set to False (N) and control then flows via link H2 to step 450X (FIG. 4E). Referring to FIG. 4E, point H2 is entered with the understanding that the plaintext version of the to-be-closed, native or localized file has not been modified. Rather than re-encrypting the plaintext version, the renamed, but still-encrypted local version is retrieved and the plaintext version of it is scorched (step 490X).

As will be understood by those skilled in the art, there are a number of different levels to which one may take the file 'scorching' step 491 (FIG. 4D) and/or 491' (FIG. 4E) depending on various tradeoffs that are to be made between desired performance speed and acceptable levels of security. If relatively little security is acceptable, 'scorching' may entail no more than asking the operating system to 'delete' the file. In many cases the latter leaves the file data intact and assigns the disk storage space to 'free space' such that eventually, the deleted data will be overwritten by other data as the disk's free space is consumed. If a relatively higher level of security is desired, 'scorching' may include the step of first overwriting the corresponding disk storage area with a masking bit pattern such as '01010101 . . . ' before deleting the file. If even higher levels of security are desired, before 'deleting' the file, 'scorching' may entail multiple overwrites across the corresponding disk storage area with each overwrite using a different bit pattern so as to more assuredly remove traces of the original bit pattern.

In portion 451' of step 450X (FIG. 4E), the plaintext local file (which currently has the original file name, e.g., 'AA.XLS') is given a new, unique temporary name (e.g., 'JAN_1_2000.004'). The above-described unique-name picking algorithm may be used. In portion 452' of step 450X, the still-encrypted original file (which currently has the earlier picked unique name, e.g., 'JAN_1_2000.002') is given back its original name (e.g., 'AA.XLS').

In a multi-threaded environment, the renaming attempts of step 450X might fail due to synchronism problems as described for step 450 of FIG. 4C. Such a failure is checked for at test step 455', and if there was a failure (Succeeded?=No), in step 458' the successful portion of the rename attempt is undone and task H2 is posted onto a system command queue for a retry at a later time. The intercept routine 400 is thereafter temporarily exited by way of exit step 459'.

If the answer to the Renamings Succeeded? check 455' is Yes, control passes to step 490X. In portion 491' of step 490X, the plaintext file (e.g., now named 'JAN_1_2000.002') is scorched. In portion 492', the File-Tag records (e.g., 387, 388, 386) if any, that still remain and point to the File-Use record of the scorched plaintext, are deleted from their respective linked lists. The back-to-head pointers 374 may be used in this step to speed the scan through the linked list of each User-Application record (381–383, see FIG. 3D). In portion 493', the corresponding File-Use record is deleted. This step is carried out to indicate that there is no longer a plaintext version of the confidential information that needs tracking. Of course, some or all of these clean-up steps may carried out at a later time by use of an appropriately-scheduled, garbage collection task. The intent here is to illustrate what clean-up steps may need to be taken rather than indicating a specific time for them.

Thereafter, link G2 is taken back to step 440 of FIG. 4D. As before, if the file that is being CLOSEd is a local native, the exit continues via link D1 to intercept exit step 499. If the file that is being CLOSEd is instead a TTL'ed one, the CLOSE file operation is redirected to the external home (e.g., remote server) for that file, this being optionally preceded by an overwrite (step 447) of the home site.

Figure 5A:
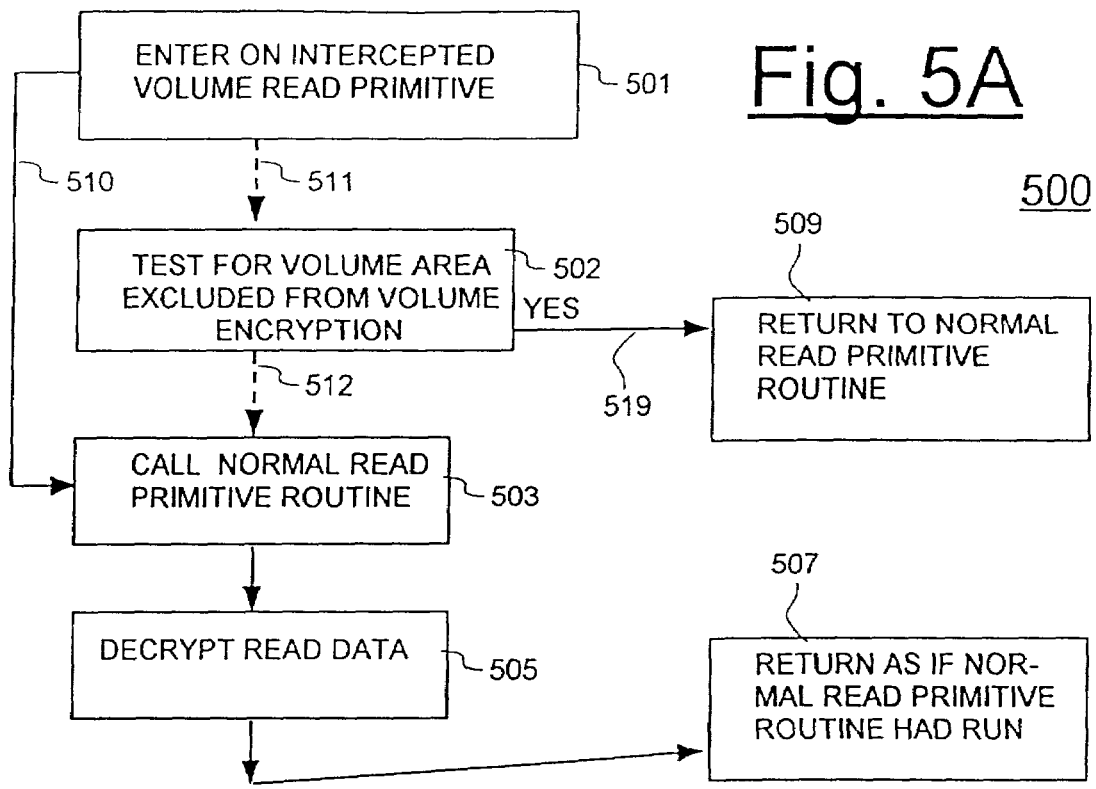
FIGS. 5A–5B show volume-encryption operations.
Figure 5B:
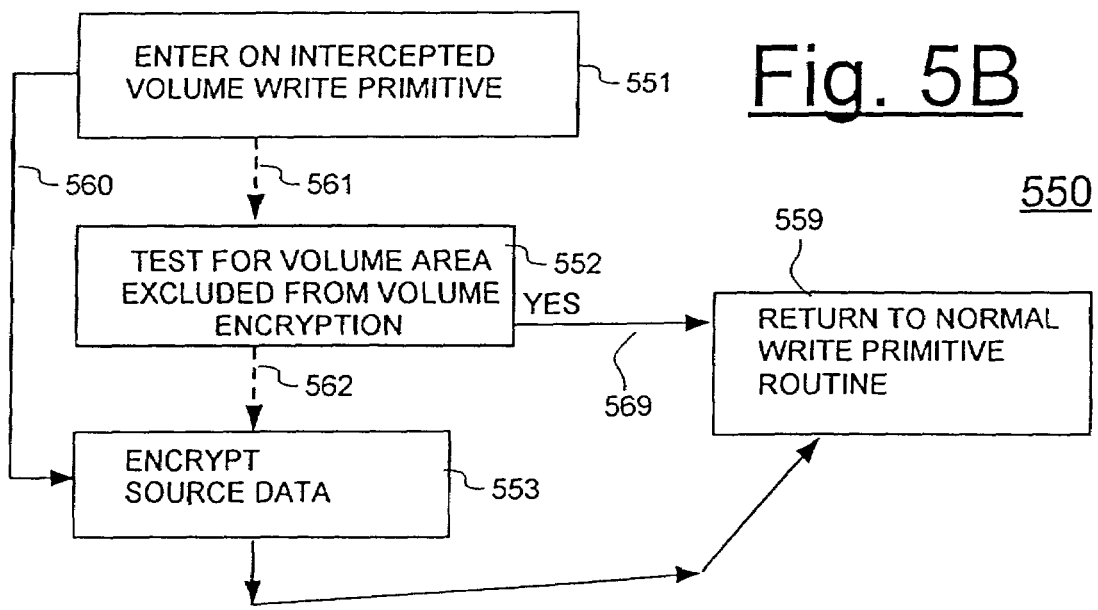

FIGS. 5A–5B show how volume encryption may be carried out in accordance with the disclosure. Similar diagrams are provided in above-cited U.S. Ser. No. 09/047,316 and as such they do not need to be described in excessive detail. Briefly, FIG. 5A shows the intercept for a primitive read operation (e.g., 182 of FIG. 1E). Unbeknownst to the calling application program, a cluster-by-cluster, or sector-by-sector, or a like decryption of a read, file primitive is carried out in step 505 before step 507 returns the decrypted data to the calling application program. Steps 502 and 509 allow for a cluster-by-cluster, or sector-by-sector, or alike performed exclusion from the general, volume decryption process. In counterpart, 5B shows the intercept for a primitive write operation. Unbeknownst to the calling application program, a cluster-by-cluster, or sector-by-sector, or a like primitive-based encryption of file data that is to be written at the primitive level, is generally carried out in step 553 before step 559 forwards the data to the file recording process. Step 552 allows for a primitive-level exclusion from the general, volume encryption process. Testing at the primitive level (steps 502, 552) can consume undesirable amounts of time and is therefore usually not recommended.

Figure 6A:
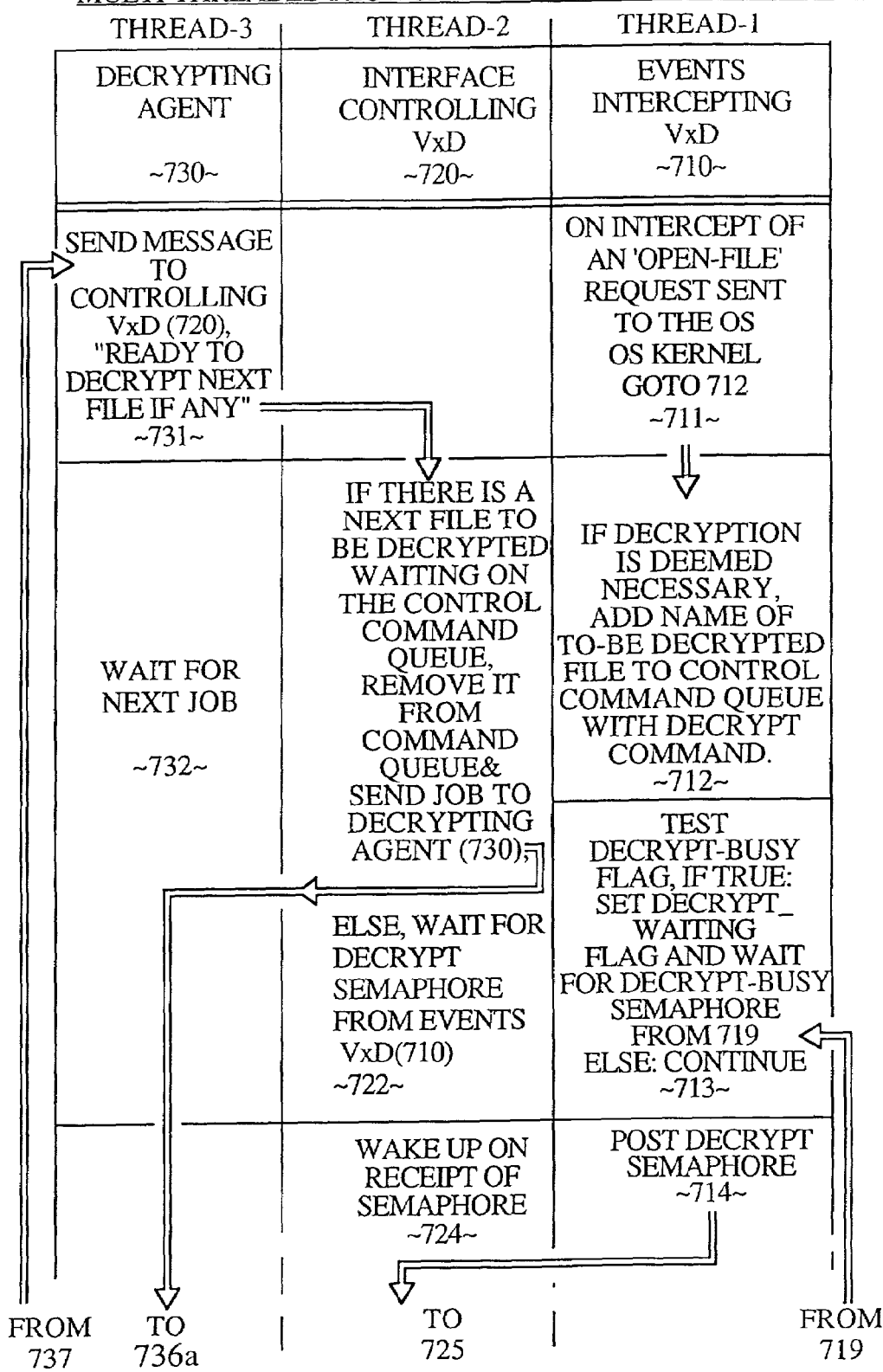
FIGS. 6A–6B illustrate how the file-OPEN intercept works in a multi-threaded environment.
Figure 6B:
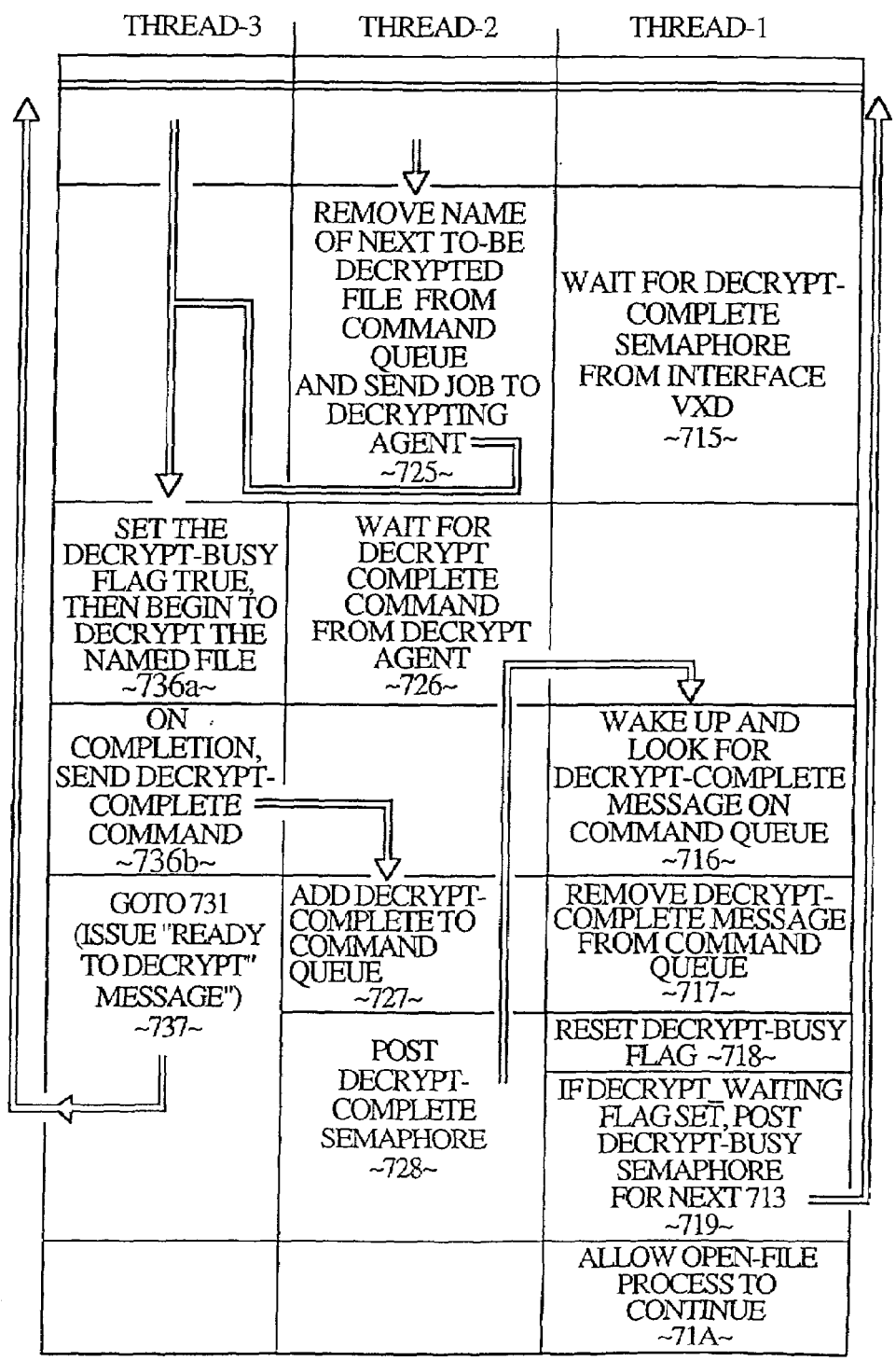

FIGS. 6A–6B show how multi-threaded decryption and encryption may be carried out in accordance with the disclosure. Similar diagrams are provided in above-cited U.S. Pat. No. 5,699,428 and as such they do not need to be described in excessive detail. Briefly, jobs are queued for a recryption agent. Semaphores are passed from the intercepted application threads to the agent, informing the agent of when it is safe to begin encrypting or decrypting a next job on its queue. Semaphores are passed from the agent to the intercepted application threads, informing them of when it is safe to pick up data that has finished being encrypted or decrypted.

The present disclosure is to be taken as illustrative rather than as limiting the scope, nature, or spirit of the subject matter claimed below. Numerous modifications and variations will become apparent to those skilled in the art after studying the above disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering the extrapolations.

By way of example, it is understood that a computer-readable medium (e.g., 106, FIG. 1E) or another form of a software product or machine-instructing means (including but not limited to, a hard disk (150), a compact disk, a flash memory stick, a downloading of manufactured instructing signals over a network (e.g., 30) and/or like software products) may be used for instructing an instructable machine (e.g., 120) to carry out such TTL'ing of remote files (159) and of their respective AC-control rules (158), followed by later de-localization (441) in accordance with the disclosure. As such, it is within the scope of the disclosure to have an instructable machine carry out, and/to provide a software product adapted for causing an instructable machine to carry out a machine-implemented method comprising: (a) first determining if a requested file is a resident of a remote or removable media and if it is access-constrained (AC); (b) second determining if a localized version of the requested file and its AC-rules already exists in th local machine, and if not making a localized copy the non-native file and of its non-native AC-rules, where the copying of the non-native AC-rules includes a signature check; (c) using the localized copies of the file and its AC-rules for carrying out file access operations, including intelligible access to the information of an encrypted file if authorization to do so is present; (d) after local use of the TTL'ed file is complete, scorching the local copy if it had not been modified, or de-localizing a modified version of the file if authorized and permitted modification had taken place, and sending the modified version (which may be appropriately encrypted prior to transmission) back to its native home (e.g., a remote server 50', 50" or an easily-removable media, i.e. 106).

By way of a further example of extensions with the scope of this disclosure, in a database system where data is routinely accessed (read from and/or written to) as integral units of finer granularity than 'files'; for example, where data is routinely accessed as 'database records' rather than as integral files, the recryption intercept routines may be modified to respond at the appropriate level of finer granularity. For example, the access-constraint enforcing intercept routines may be modified to respond to database_record-OPEN and database_record-CLOSE requests rather than responding to respective file-OPEN and file-CLOSE requests.

By way of further example, although it is implied above that encryption and decryption are carried out by the CPU 120 or another like processor means in response to the OTF instruction code 163, it is within the contemplation of the disclosure to alternatively or supplementally use dedicated hardware (and/or firmware) mechanisms for carrying out part or all of one or both the encrypting and decrypting functions. The dedicated hardware can be in the form of a special purpose function board or chip that is operatively coupled to the system bus 110 for carrying out the respective encrypting and decrypting functions.

Similarly other software-implemented functions can be carried out with dedicated hardware as desired. For example, part or all of the data for the collection 165 of encryption and decryption keys and algorithms can be stored in a secured ROM chip or in a secured CD-ROM platter that is operatively coupled to the system bus 110 rather than in the disk subsystem 150. Part or all of the data for the collection 165 of encryption and decryption keys and algorithms can be stored in a separate file-server computer and can be downloaded over a network 105 and through the system I/O module 130 to the system memory 140 on an as needed basis. The various confidential files 161–162, the exclusion and inclusion lists 155–157, the special-use lists 167, and even the access constraining instruction code 154 can be similarly stored in other means and brought into system memory 140 on an as needed basis through various mechanisms such as system I/O module 130 and data conveyance means 131.

Although clean-up of TTL'ed rules 158 (FIG. 1E) and TTL'ed folders 159 has not described in detail, it is within the contemplation of the disclosure that such clean up may take place by way of regularly scheduled, garbage collection, background tasks. It is within the capability of ordinary artisans to devise such garbage collection, background tasks and select appropriate algorithms for avoiding deletion of TTL'ed folders having TTL'ed files that are probably still in use. The folder-use tracking records of region 166 may be used to assist in intelligent garbage collection.

Given the above disclosure of general concepts and specific embodiments, the scope of protection sought is to be defined by the claims appended hereto.

What is claimed is:

1. A machine readable medium storing instructions for instructing an instructable machine to carry out an access-constraining method for filed that reside either inside or outside the instructable machine, where the instructable machine has an internal, data-providing means that can provide data from an identified one of internal or external, plural digital data files in response to interceptable file-access requests, where each of said files is identifiable by a file name, said machine-implemented, access-constraining method being for protecting data and/or information of said files from unauthorized access by way of unauthorized ones of identifiable programs and/or at the behest of unauthorized, identifiable users, said internal/external access-constraining method comprising:
- (a) intercepting data access attempts made by access requesting programs for data in an identified one of files residing on an identified internal, removable, or external media;
- (b) first testing for each intercepted data access attempt, to verify that the identified media on which the requested file resides is currently available, and if not, updating local records which track the current availability of the identified media to indicate the current non-availability of the media;
- (c) second testing for each intercepted data access attempt, to determine if access constraining control information is already available internally for the identified file;
- (d) if said second testing shows that the access constraining control information is not available in an internal and physically-secure storage area, attempting to securely import the missing, access constraining control information from the removable, or external media of primary residence of the identified file;
- (e) if said import attempt shows that the missing, access constraining control information is unavailable, determining explicitly or implicitly if the missing information is necessary for allowing the intercepted access-request to complete normally to provide a grant of the request, and if the missing information is necessary, blocking the intercepted access-request from completing normally and thereby blocking the provision of said grant in response to the intercepted access-request.

2. The instructions conveying means of claim 1 and further wherein said step (d) of attempting to securely import the missing, access constraining control information includes at least one of:
- (d.1) verifying a digital signature covering corresponding access constraining control information that is held in said removable, or external media of primary residence of the identified file and imported into said instructable machine;
- (d.2) decrypting imported digital data that represents the corresponding access constraining control information of the identified file; and
- (d.3) storing a digital-signature authenticated and/or decrypted, plaintext version of the missing, access constraining control information in said internal and physically-secure storage area of the instructable machine.

3. The instructions conveying means of claim 1 and wherein said internal/external access-constraining method further comprises:
- (f) third testing for each intercepted data access attempt, to determine if the identified file is an access constrained one which resides on removable, or external media, and if so to determine whether a localized copy of the identified file is present in the instructable machine;
- (g) if said third testing shows that the localized copy is not present, importing a copy of the identified file into said internal and physically-secure storage area of the instructable machine.

4. The instructions conveying means of claim 3 and wherein said internal/external access-constraining method further comprises:
- (h) recording the time of said importing of the copy of the identified file so that said time of localization can be later used by garbage collection mechanisms of the instructable machine to remove localized copies that have remained localized beyond a predefined time limit.

5. The instructions conveying means of claim 3 and wherein said internal/external access-constraining method further comprises:
- (h) determining if the just-localized file copy imported in step (g) is one whose primary data is encrypted;
- (i) attempting to decrypt the encrypted primary data of the just-localized file copy if the determining step (h) shows that such encrypted data is present; and
- (j) blocking the intercepted access-request from completing normally and thereby blocking the provision of said grant in response to the intercepted access-request if the attempted decryption of step (i) is unsuccessful.

6. The instructions conveying means of claim 5 and wherein said internal/external access-constraining method further comprises:
- (k) attempting to verify a digital signature covering the decrypted primary data of step (i); and
- (l) blocking the intercepted access-request from completing normally and thereby blocking the provision of said grant in response to the intercepted access-request if the signature verification of step (k) is unsuccessful.

7. The instructions conveying means of claim 5 and wherein said internal/external access-constraining method further comprises:
- (k) volume encrypting the decrypted primary data of step (i) and storing the volume encrypted data to nonvolatile storage;
- wherein the decrypted primary data is kept within the instructable machine exclusively in volatile storage thereof.

8. A machine readable medium storing instructions for instructing an instructable machine to carry out an nonresident file-closing method for files that reside removably or outside the instructable machine, where the instructable machine has an internal, data-providing means that can provide data from an identified one of internal or external, plural digital data files in response to interceptable file-open requests, where each of said files is identifiable by a file name, said machine-implemented, file-closing method being for protecting data and/or information of said nonresident files from unauthorized access by way of unauthorized ones of identifiable programs and/or at the behest of unauthorized, identifiable users, said nonresident file-closing method comprising:
- (a) intercepting file-closing attempts made by access-completing parts of access-requesting programs, where the original access requests were for data in an identified one of files residing on an identified internal, removable, or external media;
- (b) first testing for each intercepted file-closing attempt, to verify that the identified media on which the to-be-closed file resides is currently available, and if not, updating local records which track the current availability of the identified media to indicate the current non-availability of the media;
- (c) second testing for each intercepted file-closing attempt, to determine if access constraining control information is available internally for the identified file;
- (d) if said second testing shows that the access constraining control information is not available in an internal and physically-secure storage area, determining explicitly or implicitly if the missing, access constraining control information must be locally present for allowing the intercepted file-closing request to complete normally, and if the missing information is necessary, blocking the intercepted file-closing request from completing normally in response to the intercepted file-closing request.

9. The instructions conveying means of claim 8 and wherein said nonresident file-closing method further comprises:
   (e) third testing the locally-present, access constraining control information for the to-be-closed file to determine if the access constraining rules for the identified file permit a current attempt to close the file; and
   (f) blocking the intercepted file-closing request from completing normally if said third testing step (e) indicates the locally-present, access constraining control information for the to-be-closed file do not permit a current attempt to close the file.

10. The instructions conveying means of claim 9 and wherein the nonresident file-closing method further comprises:
   (e) in response to a denial of the requested file-closing, posting a correspondingly security alert message.

11. The instructions conveying means of claim 9 and wherein said nonresident file-closing method further comprises:
   (g) determining if the to-be-closed file is a special-use one such that, even if there are no other local, application programs still using the localized file copy, still footing the file-closing requesting application program into to thinking the nonresident original of the identified file has been closed, even though said nonresident original has not yet been closed because it is later slated for special-use by an application program that has not yet started using the localized file copy.

12. The instructions conveying means of claim 9 and wherein said nonresident file-closing method further comprises:
   (g) determining if other local, application programs are still using the localized file copy, and if so, fooling the file-closing requesting application program into to thinking the nonresident original of the identified file has been closed, even though said nonresident original has not yet been closed.

13. The instructions conveying means of claim 12 and wherein the nonresident file-closing method further comprises:
   (h) if no other local, application programs are still using the localized file copy, determining if the localized file copy has been modified locally; and
   (i) if said determining step (h) shows that the localized file copy has not been modified locally, allowing the intercepted file-closing request to complete normally, thereby causing a file-close action to occur for the nonresident file identified in a counterpart, file-opening request.

14. The instructions conveying means of claim 13 and wherein the nonresident file-closing method further comprises:
   (j) if said determining step (h) shows that the localized file copy has been modified locally, overwriting the modified local copy to the nonresident, original location before allowing the intercepted file-closing request to complete normally, thereby causing a file-close action to occur for the nonresident file identified in a counterpart, file-opening request only after the nonresident file has been updated in accordance with the locally-made modifications.

15. The instructions conveying means of claim 13 and wherein the nonresident file-closing method further comprises:
   (j) in conjunction with said step (i) of allowing the requested file-close action to occur for the nonresident file, deleting the localized file copy.

16. The instructions conveying means of claim 15 and wherein the nonresident file-closing method further comprises:
   (k) in conjunction with said step (i) of allowing the requested file-close action to occur for the nonresident file, determining if any other, temporarily localized filed copies (TTL'ed files) are logically associated with the localized copy of the access constraining rules of the to-be-closed file, and if not, deleting the localized copy of the access constraining rules of the to-be-closed file.

17. In an automated machine for executing one or more application programs, where the application programs access file data of a plurality of locally and externally stored files by causing interceptable file-OPEN requests and file-CLOSE requests to be sent to an operating system of said machine, and where data within a subset of the plurality of stored files is encrypted or otherwise access constrained; an automatic access constraining control mechanism comprising:
   (a) OPEN intercept means for intercepting said interceptable file-OPEN requests;
   (b) selective OPEN continuance means, responsive to the OPEN intercept means, for determining whether an intercepted file-OPEN request is requesting an open of a file for which the request is to be denied based on associated access constrain rules;
   (c) local-use tracking means, responsive to the selective OPEN continuance means, for determining whether a localized copy of a to-be-opened, nonresident file, and a localized copy of nonresident access constraining rules associated with the to-be-opened, nonresident file, are already present in the machine, and if so, for allowing the intercepted file-OPEN request to continue on its way to the operating system such that the localized file copy will be accessed if so permitted by the localized copy of nonresident access constraining rules;
   (d) CLOSE intercept means for intercepting said interceptable file-CLOSE requests; and
   (e) selective CLOSE continuance means, responsive to the OPEN intercept means, for determining whether an intercepted file-CLOSE request is requesting a closing of a file for which the CLOSE request is to be denied based on associated access constrain rules.

* * * * *